(12) United States Patent
Amundson et al.

(10) Patent No.: US 9,412,314 B2
(45) Date of Patent: *Aug. 9, 2016

(54) METHODS FOR DRIVING ELECTRO-OPTIC DISPLAYS

(75) Inventors: Karl R. Amundson, Cambridge, MA (US); Robert W. Zehner, Belmont, MA (US); Ara N. Knaian, Newton, MA (US); Benjamin Zion, State College, PA (US)

(73) Assignee: E Ink Corporation, Billerica, MA (US)

( * ) Notice: Subject to any disclaimer, the term of this patent is extended or adjusted under 35 U.S.C. 154(b) by 1793 days.

This patent is subject to a terminal disclaimer.

(21) Appl. No.: 12/411,643

(22) Filed: Mar. 26, 2009

(65) Prior Publication Data

US 2009/0179923 A1 Jul. 16, 2009

Related U.S. Application Data

(60) Division of application No. 10/879,335, filed on Jun. 29, 2004, now Pat. No. 7,528,822, and a continuation-in-part of application No. 10/814,205, filed on Mar. 31, 2004, now Pat. No. 7,119,772, and a (Continued)

(51) Int. Cl.
*G09G 3/34* (2006.01)
*G02F 1/167* (2006.01)

(52) U.S. Cl.
CPC ................ *G09G 3/344* (2013.01); *G02F 1/167* (2013.01)

(58) Field of Classification Search
CPC .................... G09G 3/344; G02F 1/167; G02F 2001/1672–2001/1678

USPC .................................. 345/107, 96, 204, 690
See application file for complete search history.

(56) References Cited

U.S. PATENT DOCUMENTS

| | | | |
|---|---|---|---|
| 3,756,693 A | 9/1973 | Ota | |
| 3,767,392 A | 10/1973 | Ota | |
| 3,792,308 A | 2/1974 | Ota | |
| 3,870,517 A | 3/1975 | Ota et al. | |
| 3,892,568 A | 7/1975 | Ota | |
| 3,972,040 A | 7/1976 | Hilsum et al. | |

(Continued)

FOREIGN PATENT DOCUMENTS

| | | |
|---|---|---|
| EP | 0186519 | 7/1986 |
| EP | WO9967678 A2 | 12/1999 |

(Continued)

OTHER PUBLICATIONS

Wood, D., "An Electrochromic Renaissance?" Information Display, 18(3), 24 (Mar. 2002) Mar. 1, 2002.

(Continued)

*Primary Examiner* — Stephen Sherman
(74) *Attorney, Agent, or Firm* — David J. Cole

(57) ABSTRACT

An electro-optic display, having at least one pixel capable of achieving any one of at least four different gray levels including two extreme optical states, is driven by displaying a first image on the display, and rewriting the display to display a second image thereon, wherein, during the rewriting of the display, any pixel which has undergone a number of transitions exceeding a predetermined value without touching an extreme optical state, is driven to at least one extreme optical state before driving that pixel to its final optical state in the second image.

5 Claims, 31 Drawing Sheets

Related U.S. Application Data continuation-in-part of application No. 10/065,795, filed on Nov. 20, 2002, now Pat. No. 7,012,600.

(60) Provisional application No. 60/481,040, filed on Jun. 30, 2003, provisional application No. 60/481,405, filed on Sep. 22, 2003, provisional application No. 60/320,070, filed on Mar. 31, 2003, provisional application No. 60/320,207, filed on May 5, 2003, provisional application No. 60/481,669, filed on Nov. 19, 2003, provisional application No. 60/481,675, filed on Nov. 20, 2003, provisional application No. 60/557,094, filed on Mar. 26, 2004, provisional application No. 60/319,007, filed on Nov. 20, 2001, provisional application No. 60/319,010, filed on Nov. 21, 2001, provisional application No. 60/319,034, filed on Dec. 18, 2001, provisional application No. 60/319,037, filed on Dec. 20, 2001, provisional application No. 60/319,040, filed on Dec. 21, 2001.

(56) References Cited

U.S. PATENT DOCUMENTS

| | | |
|---|---|---|
| 4,041,481 A | 8/1977 | Sato |
| 4,418,346 A | 11/1983 | Batchelder |
| 4,430,648 A | 2/1984 | Togashi et al. |
| 4,450,440 A | 5/1984 | White |
| 4,741,604 A | 5/1988 | Kornfeld |
| 4,746,917 A | 5/1988 | Di Santo et al. |
| 4,833,464 A | 5/1989 | Di Santo et al. |
| 4,947,157 A | 8/1990 | Di Santo et al. |
| 4,947,159 A | 8/1990 | Di Santo et al. |
| 5,066,946 A | 11/1991 | Di Santo et al. |
| 5,223,115 A | 6/1993 | Di Santo et al. |
| 5,247,290 A | 9/1993 | Di Santo et al. |
| 5,254,981 A | 10/1993 | Di Santo et al. |
| 5,266,937 A | 11/1993 | Di Santo et al. |
| 5,293,528 A | 3/1994 | Di Santo et al. |
| 5,302,235 A | 4/1994 | Di Santo et al. |
| 5,412,398 A | 5/1995 | Di Santo et al. |
| 5,467,107 A | 11/1995 | Di Santo et al. |
| 5,467,217 A | 11/1995 | Check, III et al. |
| 5,499,038 A | 3/1996 | Di Santo et al. |
| 5,654,732 A | 8/1997 | Katakura |
| 5,684,501 A | 11/1997 | Knapp et al. |
| 5,689,282 A | 11/1997 | Wolfs et al. |
| 5,717,515 A | 2/1998 | Sheridon |
| 5,739,801 A | 4/1998 | Sheridon |
| 5,745,094 A | 4/1998 | Gordon, II et al. |
| 5,760,761 A | 6/1998 | Sheridon |
| 5,777,782 A | 7/1998 | Sheridon |
| 5,805,149 A | 9/1998 | Yuki et al. |
| 5,808,783 A | 9/1998 | Crowley |
| 5,866,284 A | 2/1999 | Vincent |
| 5,872,552 A | 2/1999 | Gordon, II |
| 5,892,504 A | 4/1999 | Knapp |
| 5,896,117 A | 4/1999 | Moon |
| 5,930,026 A | 7/1999 | Jacobson |
| 5,933,203 A | 8/1999 | Wu et al. |
| 5,961,804 A | 10/1999 | Jacobson |
| 5,963,456 A | 10/1999 | Klein et al. |
| 5,978,052 A | 11/1999 | Ilcisin et al. |
| 6,002,384 A | 12/1999 | Tamai et al. |
| 6,017,584 A | 1/2000 | Albert |
| 6,034,807 A | 3/2000 | Little et al. |
| 6,054,071 A | 4/2000 | Mikkelsen, Jr. |
| 6,055,091 A | 4/2000 | Sheridon |
| 6,055,180 A | 4/2000 | Gudesen |
| 6,057,814 A | 5/2000 | Kalt |
| 6,064,410 A | 5/2000 | Wen et al. |
| 6,067,185 A | 5/2000 | Albert et al. |
| 6,081,285 A | 6/2000 | Wen |
| 6,097,531 A | 8/2000 | Sheridon |
| 6,118,426 A | 9/2000 | Albert |
| 6,120,588 A | 9/2000 | Jacobson |
| 6,120,839 A | 9/2000 | Comiskey |
| 6,124,851 A | 9/2000 | Jacobson |
| 6,128,124 A | 10/2000 | Silverman |
| 6,130,773 A | 10/2000 | Jacobson |
| 6,130,774 A | 10/2000 | Albert |
| 6,137,467 A | 10/2000 | Sheridon |
| 6,144,361 A | 11/2000 | Gordon, II |
| 6,147,791 A | 11/2000 | Sheridon |
| 6,154,190 A | 11/2000 | Yang |
| 6,172,798 B1 | 1/2001 | Albert |
| 6,177,921 B1 | 1/2001 | Comiskey |
| 6,184,856 B1 | 2/2001 | Gordon, II |
| 6,211,998 B1 | 4/2001 | Sheridon |
| 6,225,971 B1 | 5/2001 | Gordon, II |
| 6,232,950 B1 | 5/2001 | Albert |
| 6,236,385 B1 | 5/2001 | Nomura et al. |
| 6,239,896 B1 | 5/2001 | Ikeda |
| 6,241,921 B1 | 6/2001 | Jacobson |
| 6,249,271 B1 | 6/2001 | Albert et al. |
| 6,252,564 B1 | 6/2001 | Albert |
| 6,262,706 B1 | 7/2001 | Albert |
| 6,262,833 B1 | 7/2001 | Loxley |
| 6,271,823 B1 | 8/2001 | Gordon, II |
| 6,300,932 B1 | 10/2001 | Albert |
| 6,301,038 B1 | 10/2001 | Fitzmaurice |
| 6,312,304 B1 | 11/2001 | Duthaler |
| 6,312,971 B1 | 11/2001 | Amundson |
| 6,320,565 B1 | 11/2001 | Albu et al. |
| 6,323,989 B1 | 11/2001 | Jacobson |
| 6,327,072 B1 | 12/2001 | Comiskey |
| 6,330,054 B1 | 12/2001 | Ikami |
| 6,348,908 B1 | 2/2002 | Richley et al. |
| 6,359,605 B1 | 3/2002 | Knapp et al. |
| 6,373,461 B1 | 4/2002 | Hasegawa et al. |
| 6,376,828 B1 | 4/2002 | Comiskey |
| 6,377,387 B1 | 4/2002 | Duthaler |
| 6,392,678 B2 | 5/2002 | Nakamura |
| 6,392,785 B1 | 5/2002 | Albert |
| 6,392,786 B1 | 5/2002 | Albert |
| 6,407,763 B1 | 6/2002 | Yamaguchi et al. |
| 6,413,790 B1 | 7/2002 | Duthaler |
| 6,421,033 B1 | 7/2002 | Williams |
| 6,422,687 B1 | 7/2002 | Jacobson |
| 6,445,374 B2 | 9/2002 | Albert |
| 6,445,489 B1 | 9/2002 | Jacobson |
| 6,459,418 B1 | 10/2002 | Comiskey et al. |
| 6,462,837 B1 | 10/2002 | Tone |
| 6,473,072 B1 | 10/2002 | Comiskey |
| 6,480,182 B2 | 11/2002 | Turner |
| 6,498,114 B1 | 12/2002 | Amundson |
| 6,504,524 B1 * | 1/2003 | Gates et al. .......... 345/107 |
| 6,506,438 B2 | 1/2003 | Duthaler |
| 6,512,354 B2 | 1/2003 | Jacobson |
| 6,515,649 B1 | 2/2003 | Albert |
| 6,518,949 B2 | 2/2003 | Drzaic |
| 6,521,489 B2 | 2/2003 | Duthaler |
| 6,531,997 B1 | 3/2003 | Gates |
| 6,535,197 B1 | 3/2003 | Comiskey |
| 6,538,801 B2 | 3/2003 | Jacobson |
| 6,545,291 B1 | 4/2003 | Amundson |
| 6,580,545 B2 | 6/2003 | Morrison |
| 6,639,578 B1 | 10/2003 | Comiskey |
| 6,650,462 B2 | 11/2003 | Katase |
| 6,652,075 B2 | 11/2003 | Jacobson |
| 6,657,612 B2 | 12/2003 | Machida et al. |
| 6,657,772 B2 | 12/2003 | Loxley |
| 6,664,944 B1 | 12/2003 | Albert |
| D485,294 S | 1/2004 | Albert |
| 6,672,921 B1 | 1/2004 | Liang |
| 6,680,725 B1 | 1/2004 | Jacobson |
| 6,683,333 B2 | 1/2004 | Kazlas |
| 6,693,620 B1 | 2/2004 | Herb |
| 6,704,133 B2 | 3/2004 | Gates et al. |
| 6,710,540 B1 | 3/2004 | Albert |
| 6,721,083 B2 | 4/2004 | Jacobson |
| 6,724,519 B1 | 4/2004 | Comiskey |
| 6,727,881 B1 | 4/2004 | Albert |
| 6,738,050 B2 | 5/2004 | Comiskey |

(56) References Cited

U.S. PATENT DOCUMENTS

| | | | |
|---|---|---|---|
| 6,750,473 B2 | 6/2004 | Amundson |
| 6,753,844 B2 | 6/2004 | Machida et al. |
| 6,753,999 B2 | 6/2004 | Zehner |
| 6,762,744 B2 | 7/2004 | Katase |
| 6,788,449 B2 | 9/2004 | Liang |
| 6,816,147 B2 | 11/2004 | Albert |
| 6,819,471 B2 | 11/2004 | Amundson |
| 6,822,782 B2 | 11/2004 | Honeyman |
| 6,825,068 B2 | 11/2004 | Denis |
| 6,825,829 B1 | 11/2004 | Albert |
| 6,825,970 B2 | 11/2004 | Goenaga |
| 6,831,769 B2 | 12/2004 | Holman |
| 6,839,158 B2 | 1/2005 | Albert |
| 6,842,167 B2 | 1/2005 | Albert |
| 6,842,279 B2 | 1/2005 | Amundson |
| 6,842,657 B1 | 1/2005 | Drzaic |
| 6,864,866 B2 | 3/2005 | Aoki |
| 6,864,875 B2 | 3/2005 | Drzaic |
| 6,865,010 B2 | 3/2005 | Duthaler |
| 6,866,760 B2 | 3/2005 | Paolini, Jr. |
| 6,870,657 B1 | 3/2005 | Fitzmaurice |
| 6,870,661 B2 | 3/2005 | Pullen |
| 6,900,851 B2 | 5/2005 | Morrison |
| 6,922,276 B2 | 7/2005 | Zhang |
| 6,950,220 B2 | 9/2005 | Abramson |
| 6,956,557 B2 | 10/2005 | Machida et al. |
| 6,958,848 B2 | 10/2005 | Cao et al. |
| 6,967,640 B2 | 11/2005 | Albert et al. |
| 6,980,196 B1 | 12/2005 | Turner |
| 6,982,178 B2 | 1/2006 | LeCain |
| 6,987,603 B2 | 1/2006 | Paolini, Jr. |
| 6,995,550 B2 | 2/2006 | Jacobson |
| 7,002,728 B2 | 2/2006 | Pullen |
| 7,012,600 B2 | 3/2006 | Zehner |
| 7,012,735 B2 | 3/2006 | Honeyman |
| 7,023,420 B2 | 4/2006 | Comiskey |
| 7,030,412 B1 | 4/2006 | Drzaic |
| 7,030,854 B2 | 4/2006 | Baucom |
| 7,034,783 B2 | 4/2006 | Gates |
| 7,038,655 B2 | 5/2006 | Herb |
| 7,071,913 B2 | 7/2006 | Albert et al. |
| 7,075,502 B1 | 7/2006 | Drzaic |
| 7,110,163 B2 | 9/2006 | Webber |
| 7,116,318 B2 | 10/2006 | Amundson |
| 7,119,772 B2 | 10/2006 | Amundson |
| 7,126,743 B2 | 10/2006 | Knapp et al. |
| 7,170,670 B2 | 1/2007 | Webber |
| 7,193,625 B2 | 3/2007 | Danner |
| 7,202,847 B2 | 4/2007 | Gates |
| 7,223,672 B2 | 5/2007 | Kazlas |
| 7,230,604 B2 | 6/2007 | Machida et al. |
| 7,236,291 B2 | 6/2007 | Kaga et al. |
| 7,256,766 B2 | 8/2007 | Albert |
| 7,259,744 B2 | 8/2007 | Arango |
| 7,312,794 B2 | 12/2007 | Zehner |
| 7,312,916 B2 | 12/2007 | Pullen |
| 7,321,459 B2 | 1/2008 | Masuda |
| 7,327,511 B2 | 2/2008 | Whitesides |
| 7,339,715 B2 | 3/2008 | Webber |
| 7,365,733 B2 | 4/2008 | Duthaler et al. |
| 7,525,719 B2 | 4/2009 | Yakushiji |
| 7,561,324 B2 | 7/2009 | Duthaler |
| 7,667,684 B2 | 2/2010 | Jacobson |
| 7,688,297 B2 | 3/2010 | Zehner |
| 7,893,435 B2 | 2/2011 | Kazlas |
| 8,129,655 B2 | 3/2012 | Jacobson |
| 8,466,852 B2 | 6/2013 | Drzaic |
| 2001/0026226 A1 | 10/2001 | Yoneda et al. |
| 2002/0021483 A1* | 2/2002 | Katase ............ 359/267 |
| 2002/0060321 A1 | 5/2002 | Kazlas |
| 2002/0090980 A1 | 7/2002 | Wilcox |
| 2002/0113770 A1 | 8/2002 | Jacobson |
| 2002/0196219 A1 | 12/2002 | Matsunaga |
| 2003/0058223 A1 | 3/2003 | Tracy |
| 2003/0102858 A1 | 6/2003 | Jacobson |
| 2004/0051934 A1 | 3/2004 | Machida |
| 2004/0105036 A1 | 6/2004 | Danner |
| 2004/0119681 A1 | 6/2004 | Albert |
| 2004/0120024 A1 | 6/2004 | Chen |
| 2004/0190115 A1 | 9/2004 | Liang |
| 2004/0239593 A1 | 12/2004 | Yamada |
| 2004/0246562 A1 | 12/2004 | Chung |
| 2005/0012980 A1 | 1/2005 | Wilcox |
| 2006/0087479 A1 | 4/2006 | Sakurai |
| 2006/0087489 A1 | 4/2006 | Sakurai |

FOREIGN PATENT DOCUMENTS

| | | |
|---|---|---|
| EP | 1500971 A1 | 1/2005 |
| EP | 1536271 | 6/2005 |
| JP | 03091722 | 4/1991 |
| JP | 03096925 A | 4/1991 |
| JP | 05173194 A | 7/1993 |
| JP | 06233131 A | 8/1994 |
| JP | 09015559 | 1/1997 |
| JP | 09016116 A | 1/1997 |
| JP | 09185087 A | 7/1997 |
| JP | 09230391 A | 9/1997 |
| JP | 11075144 | 3/1999 |
| JP | 11113019 A | 4/1999 |
| JP | 2000221546 | 8/2000 |
| JP | 2003122312 | 4/2003 |
| WO | WO9910870 | 3/1999 |
| WO | WO0005704 | 2/2000 |
| WO | WO0036560 | 6/2000 |
| WO | WO0038000 | 6/2000 |
| WO | WO0067110 | 11/2000 |
| WO | WO0107961 | 2/2001 |
| WO | WO0127690 | 4/2001 |

OTHER PUBLICATIONS

O'Regan, B. et al., "A Low Cost, High-efficiency Solar Cell Based on Dye-sensitized colloidal TiO2 Films", Nature, vol. 353, Oct. 24, 1991, 773-740 Oct. 24, 1991.

Bach, U., et al., "Nanomaterials-Based Electrochromics for Paper-Quality Displays", Adv. Mater. 14(11), 845 (2002) May 5, 2002.

Kitamura, T., et al., "Electrical toner movement for electronic paper-like display", Asia Display/IDW '01, p. 1517, Paper HCS1-1 (2001) Dec. 31, 2001.

Yamaguchi, Y., et al., "Toner display using insulative particles charged triboelectrically", Asia Display/IDW '01, p. 1729, Paper AMD4-4 (2001) Dec. 31, 2001.

Hayes-R.A., "Video-Speed Electronic Paper Based on Electrowetting", Nature, vol. 425, Sep. 25, pp. 383-385 (2003) Sep. 25, 2003.

Antia, M., "Switchable Reflections Make Electronic Ink", Science, 285, 658 (1999) Dec. 31, 1999.

Chen, Y., et al., "A Conformable Electronic Ink Display using a Foil-Based a-Si TFT Array", SID 01 Digest, 157 (Jun. 2001) Jun. 30, 2001.

Comiskey, B., et al., "An electrophoretic ink for all-printed reflective electronic displays", Nature, 394, 253 (1998) Dec. 31, 1998.

Comiskey, B., et al., "Electrophoretic Ink: A Printable Display Material", SID 97 Digest (1997), p. 75 Dec. 31, 1997.

Drzaic, P., et al., "A Printed and Rollable Bistable Electronic Display", SID 98 Digest (1998), p. 1131 Dec. 31, 1998.

Duthaler, G., et al., "Active-Matrix Color Displays Using Electrophoretic Ink and Color Filters", SID 02 Digest, 1374 (2002) Dec. 31, 2002.

Hunt, R.W.G., "Measuring Color", 3d. Edn, Fountain Press (ISBN 0 86343 387 1), p. 63 (1998) Dec. 31, 1998.

Jacobson, J., et al., "The last book", IBM Systems J., 36, 457 (1997) Dec. 31, 1997.

Jo, G-R, et al., "Toner Display Based on Particle Movements", Chem. Mater, 14, 664 (2002) Dec. 31, 2002.

(56) References Cited

OTHER PUBLICATIONS

Kazlas, P., et al., "12.1 SVGA Microencapsulated Electrophoretic Active Matrix Display for Information Appliances", SID 01 Digest, 152 (Jun. 2001) Jun. 30, 2001.

Mossman, M.A., et al., "A New Reflective Color Display Technique Based on Total Internal Reflection and Substractive Color Filtering", SID 01 Digest, 1054 (2001) Dec. 31, 2001.

Pitt, M.G., et al., "Power Consumption of Microencapsulated Electrophoretic Displays for Smart Handheld Applications", SID 02 Digest, 1378 (2002) Dec. 31, 2002.

Poor, A., "Feed forward makes LCDs Faster", available at "http://www.extremetech.com/article2/0,3973,10085,00.asp" Sep. 24, 2001.

Shiffman, R.R., et al., "An Electrophoretic Image Display with Internal NMOS Address Logic and Display Drivers," Proceedings of the SID, 1984, vol. 25, 105(1984) Dec. 31, 1984.

Singer, B., et al., "An X-Y Addressable Electrophoretic Display," Proceedings of the SID, 18, 255 (1977) Dec. 31, 1977.

Weber, R., "Image Stability in Active-Matrix Microencapsulated Electrophoretic Displays", SID 02 Digest, 126 (2002) Dec. 31, 2002.

Kehner, R. et al., "Drive Waveforms for Active Matrix Electrophoretic Displays", SID 03 Digest, 842 (2003) Dec. 31, 2003.

L.G. Philips, Product Specification for Liquid Crystal Display LB121S1-A2 (ESPACENET Archive No. XP002443278) Dec. 6, 1999.

\* cited by examiner

US 9,412,314 B2

METHODS FOR DRIVING ELECTRO-OPTIC DISPLAYS

REFERENCE TO RELATED APPLICATIONS

This application is a divisional of application Ser. No. 10/879,335, filed Jun. 24, 2004 (Publication No. 2005/0024353, now U.S. Pat. No. 7,528,822), which claims benefit of the following Provisional Applications: (a) Ser. No. 60/481,040, filed Jun. 30, 2003; (b) Ser. No. 60/481,053, filed Jul. 2, 2003; and (c) Ser. No. 60/481,405, filed Sep. 22, 2003.

The aforementioned application Ser. No. 10/879,335 is also a continuation-in-part of application Ser. No. 10/814,205, filed Mar. 31, 2004 (Publication No. 2005/0001812, now U.S. Pat. No. 7,119,772), which itself claims benefit of the following Provisional Applications: (d) Ser. No. 60/320,070, filed Mar. 31, 2003; (e) Ser. No. 60/320,207, filed May 5, 2003; (f) Ser. No. 60/481,669, filed Nov. 19, 2003; (g) Ser. No. 60/481,675, filed Nov. 20, 2003; and (h) Ser. No. 60/557,094, filed Mar. 26, 2004.

The aforementioned copending application Ser. No. 10/814,205 is also a continuation-in-part of application Ser. No. 10/065,795, filed Nov. 20, 2002 (Publication No. 2003/0137521, now U.S. Pat. No. 7,012,600), which itself claims benefit of the following Provisional Applications: (i) Ser. No. 60/319,007, filed Nov. 20, 2001; (j) Ser. No. 60/319,010, filed Nov. 21, 2001; (k) Ser. No. 60/319,034, filed Dec. 18, 2001; (l) Ser. No. 60/319,037, filed Dec. 20, 2001; and (m) Ser. No. 60/319,040, filed Dec. 21, 2001.

This application is also related to application Ser. No. 10/249,973, filed May 23, 2003 (now U.S. Pat. No. 7,193,625), which is a continuation-in-part of the aforementioned application Ser. No. 10/065,795. Application Ser. No. 10/249,973 claims priority from Provisional Application Ser. No. 60/319,315, filed Jun. 13, 2002 and Ser. No. 60/319,321, filed Jun. 18, 2002. This application is also related to application Ser. No. 10/063,236, filed Apr. 2, 2002 (Publication No. 2002/0180687, now U.S. Pat. No. 7,170,670).

The entire contents of these copending applications, and of all other U.S. patents and published and copending applications mentioned below, are herein incorporated by reference.

BACKGROUND OF INVENTION

This invention relates to methods for driving electro-optic displays. The methods of the present invention are especially, though not exclusively, intended for use in driving bistable electrophoretic displays.

The term "electro-optic" as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the patents and published applications referred to below describe electrophoretic displays in which the extreme states are white and deep blue, so that an intermediate "gray state" would actually be pale blue. Indeed, as already mentioned the transition between the two extreme states may not be a color change at all.

The terms "bistable" and "bistability" are used herein in their conventional meaning in the imaging art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in published U.S. Patent Application No. 2002/0180687 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "impulse" is used herein in its conventional meaning in the imaging art of the integral of voltage with respect to time. However, some bistable electro-optic media act as charge transducers, and with such media an alternative definition of impulse, namely the integral of current over time (which is equal to the total charge applied) may be used. The appropriate definition of impulse should be used, depending on whether the medium acts as a voltage-time impulse transducer or a charge impulse transducer.

Several types of electro-optic displays are known. One type of electro-optic display is a rotating bichromal member type as described, for example, in U.S. Pat. Nos. 5,808,783; 5,777,782; 5,760,761; 6,054,071; 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed to applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. No. 6,301,038, International Application Publication No. WO 01/27690, and in U.S. Patent Application 2003/0214695. This type of medium is also typically bistable.

Another type of electro-optic display, which has been the subject of intense research and development for a number of years, is the particle-based electrophoretic display, in which a plurality of charged particles move through a suspending fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspending medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801; 6,545,291; 6,580,545; 6,639,578; 6,652,075; 6,657,772; 6,664,944; 6,680,725; 6,683,333; 6,704,133; 6,710,540; 6,721,083; 6,724,519; and 6,727,881; and U.S. Patent Applications Publication Nos. 2002/0019081; 2002/0021270; 2002/0053900; 2002/0060321; 2002/0063661; 2002/0063677; 2002/0090980; 2002/0106847; 2002/0113770; 2002/0130832; 2002/0131147; 2002/0145792; 2002/0171910; 2002/0180687; 2002/0180688; 2002/0185378; 2003/0011560; 2003/0011868; 2003/0020844; 2003/0025855; 2003/0034949; 2003/0038755; 2003/0053189; 2003/0102858; 2003/0132908; 2003/0137521; 2003/0137717; 2003/0151702; 2003/0189749; 2003/0214695; 2003/0214697; 2003/0222315; 2004/0008398; 2004/0012839; 2004/0014265; 2004/0027327; 2004/0075634; and 2004/0094422; and International Applications Publication Nos. WO 99/67678; WO 00/05704; WO 00/38000; WO 00/38001; WO00/36560; WO 00/67110; WO 00/67327; WO 01/07961; WO 01/08241; WO 03/092077; WO 03/107315; WO 2004/017135; and WO 2004/023202.

Many of the aforementioned patents and applications recognize that the walls surrounding the discrete microcapsules in an encapsulated electrophoretic medium could be replaced by a continuous phase, thus producing a so-called "polymer-dispersed electrophoretic display" in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned 2002/0131147. Accordingly, for purposes of the present application, such polymer-dispersed electrophoretic media are regarded as sub-species of encapsulated electrophoretic media.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; and other similar techniques.) Thus, the resulting display can be flexible. Further, because the display medium can be printed (using a variety of methods), the display itself can be made inexpensively.

A related type of electrophoretic display is a so-called "microcell electrophoretic display". In a microcell electrophoretic display, the charged particles and the suspending fluid are not encapsulated within capsules but instead are retained within a plurality of cavities formed within a carrier medium, typically a polymeric film. See, for example, International Application Publication No. WO 02/01281, and U.S. Patent Application Publication No. 2002/0075556, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Nos. 6,130,774 and 6,172,798, and U.S. Pat. Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode.

The bistable or multi-stable behavior of particle-based electrophoretic displays, and other electro-optic displays displaying similar behavior (such displays may hereinafter for convenience be referred to as "impulse driven displays"), is in marked contrast to that of conventional liquid crystal ("LC") displays. Twisted nematic liquid crystals act are not bi- or multi-stable but act as voltage transducers, so that applying a given electric field to a pixel of such a display produces a specific gray level at the pixel, regardless of the gray level previously present at the pixel. Furthermore, LC displays are only driven in one direction (from non-transmissive or "dark" to transmissive or "light"), the reverse transition from a lighter state to a darker one being effected by reducing or eliminating the electric field. Finally, the gray level of a pixel of an LC display is not sensitive to the polarity of the electric field, only to its magnitude, and indeed for technical reasons commercial LC displays usually reverse the polarity of the driving field at frequent intervals. In contrast, bistable electro-optic displays act, to a first approximation, as impulse transducers, so that the final state of a pixel depends not only upon the electric field applied and the time for which this field is applied, but also upon the state of the pixel prior to the application of the electric field.

Whether or not the electro-optic medium used is bistable, to obtain a high-resolution display, individual pixels of a display must be addressable without interference from adjacent pixels. One way to achieve this objective is to provide an array of non-linear elements, such as transistors or diodes, with at least one non-linear element associated with each pixel, to produce an "active matrix" display. An addressing or pixel electrode, which addresses one pixel, is connected to an appropriate voltage source through the associated non-linear element. Typically, when the non-linear element is a transistor, the pixel electrode is connected to the drain of the transistor, and this arrangement will be assumed in the following description, although it is essentially arbitrary and the pixel electrode could be connected to the source of the transistor. Conventionally, in high resolution arrays, the pixels are arranged in a two-dimensional array of rows and columns, such that any specific pixel is uniquely defined by the intersection of one specified row and one specified column. The sources of all the transistors in each column are connected to a single column electrode, while the gates of all the transistors in each row are connected to a single row electrode; again the assignment of sources to rows and gates to columns is conventional but essentially arbitrary, and could be reversed if desired. The row electrodes are connected to a row driver, which essentially ensures that at any given moment only one row is selected, i.e., that there is applied to the selected row electrode a voltage such as to ensure that all the transistors in the selected row are conductive, while there is applied to all other rows a voltage such as to ensure that all the transistors in these non-selected rows remain non-conductive. The column electrodes are connected to column drivers, which place upon the various column electrodes voltages selected to drive the pixels in the selected row to their desired optical states. (The aforementioned voltages are relative to a common front electrode which is conventionally provided on the opposed side of the electro-optic medium from the non-linear array and extends across the whole display.) After a pre-selected interval known as the "line address time" the selected row is deselected, the next row is selected, and the voltages on the column drivers are changed to that the next line of the display is written. This process is repeated so that the entire display is written in a row-by-row manner.

It might at first appear that the ideal method for addressing such an impulse-driven electro-optic display would be so-called "general grayscale image flow" in which a controller arranges each writing of an image so that each pixel transitions directly from its initial gray level to its final gray level. However, inevitably there is some error in writing images on an impulse-driven display. Some such errors encountered in practice include:

(a) Prior State Dependence; With at least some electro-optic media, the impulse required to switch a pixel to a new optical state depends not only on the current and desired optical state, but also on the previous optical states of the pixel.

(b) Dwell Time Dependence; With at least some electro-optic media, the impulse required to switch a pixel to a new optical state depends on the time that the pixel has spent in its various optical states. The precise nature of this dependence is not well understood, but in general, more impulse is required that longer the pixel has been in its current optical state.

(c) Temperature Dependence; The impulse required to switch a pixel to a new optical state depends heavily on temperature.

(d) Humidity Dependence; The impulse required to switch a pixel to a new optical state depends, with at least some types of electro-optic media, on the ambient humidity.

(e) Mechanical Uniformity; The impulse required to switch a pixel to a new optical state may be affected by mechanical variations in the display, for example variations in the thickness of an electro-optic medium or an associated lamination adhesive. Other types of mechanical non-uniformity may arise from inevitable variations between different manufacturing batches of medium, manufacturing tolerances and materials variations.

(f) Voltage Errors; The actual impulse applied to a pixel will inevitably differ slightly from that theoretically applied because of unavoidable slight errors in the voltages delivered by drivers.

General grayscale image flow suffers from an "accumulation of errors" phenomenon. For example, imagine that temperature dependence results in a 0.2 L* (where L* has the usual CIE definition:

$$L^* = 116(R/R0)^{1/3} - 16,$$

where R is the reflectance and R0 is a standard reflectance value) error in the positive direction on each transition. After fifty transitions, this error will accumulate to 10 L*. Perhaps more realistically, suppose that the average error on each transition, expressed in terms of the difference between the theoretical and the actual reflectance of the display is ±0.2 L*. After 100 successive transitions, the pixels will display an average deviation from their expected state of 2 L*; such deviations are apparent to the average observer on certain types of images.

This accumulation of errors phenomenon applies not only to errors due to temperature, but also to errors of all the types listed above. As described in the aforementioned 2003/0137521, compensating for such errors is possible, but only to a limited degree of precision. For example, temperature errors can be compensated by using a temperature sensor and a lookup table, but the temperature sensor has a limited resolution and may read a temperature slightly different from that of the electro-optic medium. Similarly, prior state dependence can be compensated by storing the prior states and using a multi-dimensional transition matrix, but controller memory limits the number of states that can be recorded and the size of the transition matrix that can be stored, placing a limit on the precision of this type of compensation.

Thus, general grayscale image flow requires very precise control of applied impulse to give good results, and empirically it has been found that, in the present state of the technology of electro-optic displays, general grayscale image flow is infeasible in a commercial display.

Almost all electro-optic medium have a built-in resetting (error limiting) mechanism, namely their extreme (typically black and white) optical states, which function as "optical rails". After a specific impulse has been applied to a pixel of an electro-optic display, that pixel cannot get any whiter (or blacker). For example, in an encapsulated electrophoretic display, after a specific impulse has been applied, all the electrophoretic particles are forced against one another or against the capsule wall, and cannot move further, thus producing a limiting optical state or optical rail. Because there is a distribution of electrophoretic particle sizes and charges in such a medium, some particles hit the rails before others, creating a "soft rails" phenomenon, whereby the impulse precision required is reduced when the final optical state of a transition approaches the extreme black and white states, whereas the optical precision required increases dramatically in transitions ending near the middle of the optical range of the pixel.

Various types of drive schemes for electro-optic displays are known which take advantage of optical rails. For example, FIGS. 9 and 10 of the aforementioned 2003/0137521 (reproduced below), and the related description at Paragraphs [0177] to [0180], describe a "slide show" drive scheme in which the entire display is driven to both optical rails before any new image is written. Such a slide show drive scheme produces accurate grayscale levels, but the flashing of the display as it is driven to the optical rails is distracting to the viewer. It has also been suggested (see the aforementioned U.S. Pat. No. 6,531,997) that a similar drive scheme be employed in which only the pixels, whose optical states need to be changed in the new image, be driven to the optical rails. However, this type of "limited slide show" drive scheme is, if anything, even more distracting to the viewer, since the solid flashing of a normal slide show drive scheme is replaced by image dependent flashing, in which features of the old image and the new image flash in reverse color on the screen before the new image is written.

Obviously, a pure general grayscale image flow drive scheme cannot rely upon using the optical rails to prevent errors in gray levels since in such a drive scheme any given pixel can undergo an infinitely large number of changes in gray level without ever touching either optical rail.

In one aspect, this invention seeks to provide methods for achieving control of gray levels in electro-optic displays which achieve stability of gray levels similar to those achieved by slide show drive schemes but which do not suffer from the distracting flashing of slide show drive schemes. Preferred methods of the present invention can give the viewer a visual experience similar to that provided by a pure general grayscale image flow drive scheme.

In another aspect, this invention seeks to provide methods for achieving fine control of gray levels in displays driven by pulse width modulation.

When driving an active matrix display having a bistable electro-optic medium to write gray scale images thereon, it is desirable to be able to apply a precise amount of impulse to each pixel, so as to achieve accurate control of the gray scale displayed. The driving method used may rely modulation of the voltage applied to each pixel and/or modulation of the "width" (duration) for which the voltage is applied. Since voltage modulated drivers and their associated power supplies are relatively costly, pulse width modulation is commercially attractive. However, during the scanning of an active matrix display using such pulse width modulation, conventional driver circuitry only allows one to apply a single voltage to any given pixel during any one scan of the matrix. Consequently, pulse width modulation driving of active matrix displays is effected by scanning the matrix multiple times, with the drive voltage being applied during none, some or all of the scans, depending upon the change desired in the gray level of the specific pixel. Each scan may be regarded as a frame of the drive waveform, with the complete addressing pulse being a superframe formed by a plurality of successive frames. It should be noted that, although the drive voltage is only applied to any specific pixel electrode for one line address time during each scan, the drive voltage persists on the pixel electrodes during the time between successive selections of the same line, only slowly decaying, so that the pixel is driven between successive selections of the same line.

As already mentioned, each row of the matrix needs to be individually selected during each frame so that for high resolution displays (for example, 800×600 pixel displays) in practice the frame rate cannot exceed about 50 to 100 Hz; thus each frame typically lasts 10 to 20 ms. Frames of this length lead to difficulties in fine control of gray scale with many fast switching electro-optic medium. For example, some encapsulated electrophoretic media substantially complete a switch between their extreme optical states (a transition of about 30 L* units) within about 100 ms, and with such a medium a 20 ms frame corresponds to a gray scale shift of about 6 L* units. Such a shift is too large for accurate control of gray scale; the human eye is sensitive to differences in gray levels of about 1 L* unit, and controlling the impulse only in graduations equivalent to about 6 L* units is likely to give rise to visible artifacts, such as "ghosting" due to prior state dependence of the electro-optic medium, and pulses needed to ensure that the waveform used is DC balanced (see the applications mentioned in the "Cross Reference to Related Applications" section above). More specifically, ghosting may be experienced because, as discussed in some of the aforementioned patents and applications, the variation of gray level with applied impulse is not linear, and the total impulse needed for any specific change in gray level may vary with the time at which the impulse is applied and the intervening gray levels. For example, in a simple 4 gray level (2 bit) display having gray levels 0 (black), 1 (dark gray), 2 (light gray) and 3 (white), driven by a simple pulse width modulation drive scheme, these non-linearities may result in the actual gray level achieved after a notional 0-2 transition being different from the gray level achieved after a notional 1-2 transition, with the production of highly undesirable visual artifacts. This invention provides methods for achieving fine control of gray levels in displays driven by pulse width modulation, thus avoiding the aforementioned problems.

SUMMARY OF INVENTION

Accordingly, in one aspect, this invention provides a method for driving an electro-optic display having at least one pixel capable of achieving any one of at least four different gray levels including two extreme optical states. The method comprises:

displaying a first image on the display; and rewriting the display to display a second image thereon, wherein, during the rewriting of the display any pixel which has undergone a number of transitions exceeding a predetermined value, the predetermined value being at least one, without touching an extreme optical state, is driven to at least one extreme optical state before driving that pixel to its final optical state in the second image.

This method may hereinafter for convenience be referred to as the "limited transitions method" of the present invention.

In one form of this limited transitions method, the rewriting of the display is effected such that, once a pixel has been driven from one extreme optical state towards the opposed extreme optical state by a pulse of one polarity, the pixel does not receive a pulse of the opposed polarity until it has reached the opposed extreme optical state.

Also, in the limited transitions methods, the predetermined value (predetermined number of transitions) is not greater than N/2, where N is the total number of gray levels capable of being displayed by a pixel. The limited transitions method may be effected using a tri-level driver, i.e., the rewriting of the display may be effected by applying to the or each pixel any one or more of voltages −V, 0 and +V. The limited transitions method may also be DC-balanced, i.e., the rewriting of the display may be effected such that, for any series of transitions undergone by a pixel, the integral of the applied voltage with time is bounded.

In the limited transitions method of the present invention, the rewriting of the display may be effected such that the impulse applied to a pixel during a transition depends only upon the initial and final gray levels of that transition. Alternatively, the method may be adapted to take account of other states of the display, as described in more detail below. In one preferred form of the limited transitions method, for at least one transition undergone by the at least one pixel from a gray level R2 to a gray level R1, there is applied to the pixel a sequence of impulses of the form:

−TM(R1,R2) IP(R1)-IP(R2) TM(R1,R2)

where "IP(Rx)" represents the relevant value from an impulse potential matrix having one value for each gray level, and TM(R1,R2) represents the relevant value from a transition matrix having one value for each R1/R2 combination. (For convenience, impulse sequences of this type may hereinafter be abbreviated as "−x/ΔIP/x" sequences.) Such −x/ΔIP/x sequences may be used for all transitions in which the initial and final gray levels are different. Also, in such −x/ΔIP/x sequences, the final "x" section may occupy more than one half of the maximum update time. The TM(R1,R2) or x values may be chosen such that the sign of each value is dependent only upon R1; in particular, these values may be chosen to be positive for one or more light gray levels and negative for one or more dark gray levels so that gray levels other than the two extreme optical states are approached from the direction of the nearer extreme optical state.

The aforementioned −x/ΔIP/x sequences may contain additional pulses. In particular, such sequences may comprise an additional pair of pulses of the form [+y][−y], where y is an impulse value, which may be either negative or positive, the [+y] and [−y] pulses being inserted into the −x/ΔIP/x sequence. The sequence may further comprise a second additional pair of pulses of the form [+z][−z], where z is an impulse value different from y and may be either negative or positive, the [+z] and [−z] pulses being inserted into the −x/ΔIP/x sequence. The −x/ΔIP/x sequences may further comprise a period when no voltage is applied to the pixel. This "no voltage" period may occur between two elements of the −x/ΔIP/x sequence, or within a single element thereof. The −x/ΔIP/x sequences may include two or more "no voltage" periods.

When using the aforementioned −x/ΔIP/x sequences, the display may comprise a plurality of pixels divided into a plurality of groups, and the transition may be effected by (a) selecting each of the plurality of groups of pixels in succession and applying to each of the pixels in the selected group either a drive voltage or a non-drive voltage, the scanning of all the groups of pixels being completed in a first frame period; (b) repeating the scanning of the groups of pixels during a second frame period; and (c) interrupting the scanning of the groups of pixels during a pause period between the first and second frame periods, this pause period being not longer than the first or second frame period.

In the limited transitions method, the rewriting of the display may be effected such that a transition to a given gray level is always effected by a final pulse of the same polarity. In particular, gray levels other than the two extreme optical states may be approached from the direction of the nearer extreme optical state.

This invention also provides a method for driving an electro-optic display having a plurality of pixels divided into a plurality of groups. This method comprises:
(a) selecting each of the plurality of groups of pixels in succession and applying to each of the pixels in the selected group either a drive voltage or a non-drive voltage, the scanning of all the groups of pixels being completed in a first frame period;
(b) repeating the scanning of the groups of pixels during a second frame period; and
(c) interrupting the scanning of the groups of pixels during a pause period between the first and second frame periods, this pause period being not longer than the first or second frame period.

This method may hereinafter for convenience be referred to as the "interrupted scanning" method of the present invention.

In such an interrupted scanning method, typically the first and second frame periods are equal in length. The length of the pause period may be a sub-multiple of the length of one of the first and second frame periods. The interrupted scanning method may include multiple pause periods; thus the method may comprise scanning the groups of pixels during at least first, second and third frame periods, and interrupting the scanning of the groups of pixels during at least first and second pause periods between successive frame periods. The first, second and third frame periods may be substantially equal in length, and the total length of the pause periods be equal to one frame period or one frame period minus one pause period. Typically, in the interrupted scanning method, the pixels are arranged in a matrix having a plurality of rows and a plurality of columns with each pixel defined by the intersection of a given row and a given column, and each group of pixels comprises one row or one column of the matrix. The interrupted scanning method is preferably DC balanced, i.e., the scanning of the display is preferably effected such that, for any series of transitions undergone by a pixel, the integral of the applied voltage with time is bounded.

In another aspect, this invention provides a method for driving an electro-optic display having a plurality of pixels, the pixels being driven with a pulse width modulated waveform capable of applying a plurality of differing impulses to each pixel. This method comprises:
(a) storing data indicating whether application of a given impulse to a pixel will produce a gray level higher or lower than a desired gray level;
(b) detecting when two adjacent pixels are both required to be in the same gray level; and
(c) adjusting the impulses applied to the two pixels so that one pixel is below the desired gray level, while the other pixel is above the desired gray level.

This method may hereinafter for convenience be referred to as the "balanced gray level" method of the present invention.

In this method, the pixels may be divided into two groups such that each pixel has at least one neighbor of the opposite group, and different drive schemes be used for the two groups.

Each the methods of the present invention as described above may be carried out with any of the aforementioned types of electro-optic media. Thus, the methods of the present invention may be used with electro-optic displays comprising an electrochromic or rotating bichromal member electro-optic medium, an encapsulated electrophoretic medium, or a microcell electrophoretic medium. Other types of electro-optic media may also be employed.

DETAILED DESCRIPTION

Figure 1:
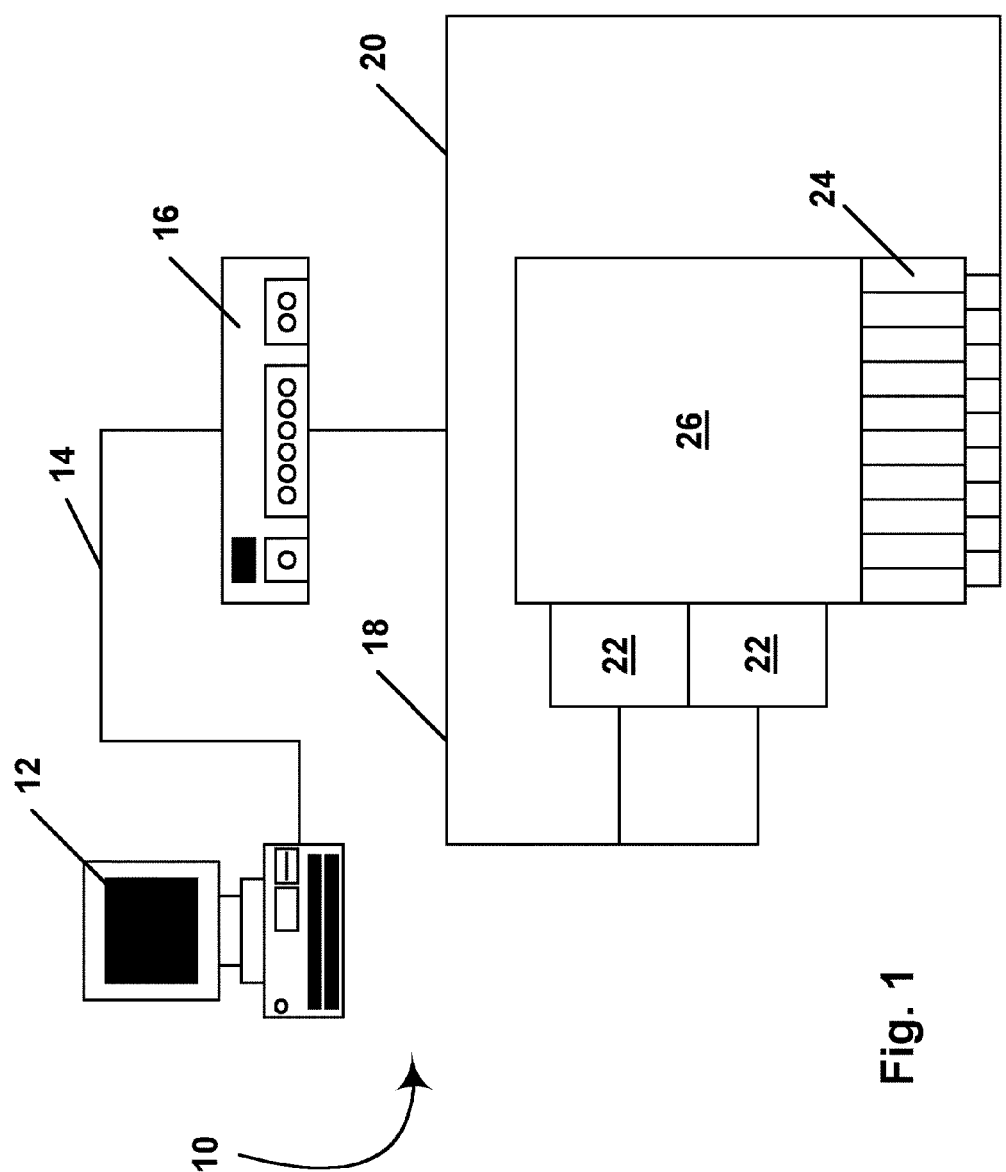
FIG. 1 is a schematic representation of an apparatus of the present invention, a display which is being driven by the apparatus, and associated apparatus, and is designed to show the overall architecture of the system.

From the foregoing, it will be apparent that the present invention provides several different improvements in methods for driving electro-optic displays. In the description below, the various different improvements provided by the present invention will normally be described separately, although it will be understood by those skilled in the imaging art that in practice a single display may make use of more than one of these major aspects; for example, a display which uses the limited transitions method of the present invention may also make use of the interrupted scanning method. Furthermore, since the improvements provided by the present invention can be applied to a wide variety of methods for driving electro-optic displays described in the applications mentioned in Paragraphs [0001] to [0004] hereof, including such features as temperature compensation and the like, it is deemed desirable, before setting out the details of the present improved methods, to given a general introduction describing these prior art methods.

General Introduction

As already mentioned, the methods of the present invention relate to driving electro-optic displays, typically having a plurality of pixels, each of which is capable of displaying at least three gray levels. The present methods may of course be applied to electro-optic displays having a greater number of gray levels, for example 4, 8, 16 or more.

Also as already mentioned, driving bistable electro-optic displays requires very different methods from those normally used to drive liquid crystal displays ("LCD's"). In a conventional (non-cholesteric) LCD, applying a specific voltage to a pixel for a sufficient period will cause the pixel to attain a specific gray level. Furthermore, the liquid material is only sensitive to the magnitude of the electric field, not its polarity. In contrast, bistable electro-optic displays act as impulse transducers, so there is no one-to-one mapping between applied voltage and gray state attained; the impulse (and thus the voltage) which must be applied to a pixel to achieve a given gray state varies with the "initial" gray state of the relevant pixel. Furthermore, since bistable electro-optic displays need to be driven in both directions (white to black, and black to white) it is necessary to specify both the polarity and the magnitude of the impulse needed.

At this point, it is considered desirable to define certain terms which are used herein in accordance with their conventional meaning in the display art. Most of the discussion below will concentrate upon one or more pixels of a display undergoing a single gray scale transition (i.e., a change from one gray level to another) from an "initial" state to a "final" state. Obviously, the initial state and the final state are so designated only with regard to the particular single transition being considered and in most cases the pixel with have undergone transitions prior to the "initial" state and will undergo further transitions after the "final" state. As explained below, some methods of the invention take account not only of the initial and final states of the pixel but also of "prior" states, in which the pixel existed prior to achieving the initial state. Where it is necessary to distinguish between multiple prior states, the term "first prior state" will be used to refer to the state in which the relevant pixel existed prior to the initial state, the term "second prior state" will be used to refer to the state in which the relevant pixel existed prior to the first prior state, and so on. The term "non-zero transition" is used to refer to a transition which effects a change of at least one unit in gray scale; the term "zero transition" may be used to refer to a "transition" which effects no overall change in gray scale of the selected pixel (although the gray level of the pixel may vary during the transition, the final gray level of the pixel after the transition is the same as the initial gray level thereof prior to the transition; also, of course, other pixels of the display may be undergoing non-zero transitions at the same time). As discussed in more detail below, prior states which may be taken into account in the methods of the present invention are of two types, namely "gray level" prior states (i.e., states determined a specific number of non-zero transitions prior to the transition being considered) and "temporal" prior states (i.e., states determined a specific time prior to the transition being considered).

As will readily be apparent to those skilled in image processing, a method of the present invention may take account of only of the initial state of each pixel and the final state, and such a method may make use of a look-up table, which will be two-dimensional. However, as already mentioned, some electro-optic media display a memory effect and with such media it is desirable, when generating the output signal representative of the pulse or series of pulses to be applied to a pixel to effect a transition, to take into account not only the initial state of each pixel but also at least one prior state of the same pixel, in which case the look-up table will be three-dimensional. In some cases, it may be desirable to take into account more than one prior state of each pixel (the plurality of prior states thus taken into account may be any combination of gray level and temporal prior states), thus resulting in a look-up table having four (if only two prior states are taken into account) or more dimensions.

From a formal mathematical point of view, the present methods may be regarded as using an algorithm that, given information about the initial, final and (optionally) prior states of an electro-optic pixel, as well as (optionally—see more detailed discussion below) information about the physical state of the display (e.g., temperature and total operating time), will produce a function V(t) which can be applied to the pixel to effect a transition to the desired final state. From this formal point of view, a device controller used to carry out the present methods may be regarded as essentially a physical embodiment of this algorithm, the controller serving as an interface between a device wishing to display information and an electro-optic display.

Ignoring the physical state information for the moment, the algorithm is, in accordance with preferred methods of the present invention, encoded in the form of a look-up table or transition matrix. This matrix will have one dimension each for the desired final state, and for each of the other states (initial and any prior states) are used in the calculation. The elements of the matrix will contain a function V(t) that is to be applied to the electro-optic medium.

The elements of the look-up table or transition matrix may have a variety of forms. In some cases, each element may comprise a single number. For example, an electro-optic display may use a high precision voltage modulated driver circuit capable of outputting numerous different voltages both above and below a reference voltage, and simply apply the required voltage to a pixel for a standard, predetermined period. In such a case, each entry in the look-up table could simply have the form of a signed integer specifying which voltage is to be applied to a given pixel. In other cases, each element may comprise a series of numbers relating to different portions of a waveform. For example, there are described below embodiments of the invention which use single- or double-prepulse waveforms, and specifying such a waveform necessarily requires several numbers relating to different portions of the waveform. Also described below is an embodiment of the invention which in effect applies pulse length modulation by applying a predetermined voltage to a pixel during selected ones of a plurality of sub-scan periods (frames) during a complete scan (superframe). In such an embodiment, the elements of the transition matrix may have the form of a series of bits specifying whether or not the predetermined voltage is to be applied during each sub-scan period (frame) of the relevant transition. Finally, as discussed in more detail below, in some cases, such as a temperature-compensated display, it may be convenient for the elements of the look-up table to be in the form of functions (or, in practice, more accurately coefficients of various terms in such functions).

It will be apparent that the look-up tables used in some embodiments of the invention may become very large. To take an extreme example, consider a process of the invention for a 256 ($2^8$) gray level display using an algorithm that takes account of initial, final and two prior states. The necessary four-dimensional look-up table has $2^{32}$ entries. If each entry requires (say) 64 bits (8 bytes), the total size of the look-up table would be approximately 32 Gbyte. While storing this amount of data poses no problems on a desktop computer, it may present problems in a portable device. However, in practice the size of such large look-up tables can be substantially reduced. In many instances, it has been found that there are only a small number of types of waveforms needed for a large number of different transitions, with, for example, the length of individual pulses of a general waveform being varied between different transitions. Consequently, the length of individual entries in the look-up table can be reduced by making each entry comprises (a) a pointer to an entry in a second table specifying one of a small number of types of waveform to be used; and (b) a small number of parameters specifying how this general waveform should be varied for the relevant transition.

The values for the entries in the look-up table may be determined in advance through an empirical optimization process. Essentially, one sets a pixel to the relevant initial state, applies an impulse estimated to approximately equal that needed to achieve the desired final state and measures the final state of the pixel to determine the deviation, if any, between the actual and desired final state. The process is then repeated with a modified impulse until the deviation is less than a predetermined value, which may be determined by the capability of the instrument used to measure the final state. In the case of methods which take into account one or more prior states of the pixel, in addition to the initial state, it will generally be convenient to first determine the impulse needed for a particular transition when the state of the pixel is constant in the initial state and all preceding states used in determining the impulse, and then to "fine tune" this impulse to allow for differing previous states.

The methods of the present invention desirably provide for modification of the impulse to allow for variation in temperature and/or total operating time of the display; compensation for operating time may be required because some electro-optic media "age" and their behavior changes after extended operation. Such modification may be done in one of two ways. Firstly, the look-up table may be expanded by an additional dimension for each variable that is to be taken into account in calculating the output signal. Obviously, when dealing with continuous variables such as temperature and operating time, it is necessary to quantize the continuous variable in order to maintain the look-up table at a practicable finite size. In order to find the waveform to be applied to the pixel, the calculation means may simply choose the look-up table entry for the table closest to the measured temperature. Alternatively, to provide more accurate temperature compensation, the calculation means may look up the two adjacent look-up table entries on either side of the measured continuous variable, and apply an appropriate interpolation algorithm to calculate the required entry at the measured intermediate value of the variable. For example, assume that the matrix includes entries for temperature in increments of 10° C. If the actual temperature of the display is 25° C., the calculation would look up the entries for 20° and 30° C., and use a value intermediate the two. Note that since the variation of characteristics of electro-optic media with temperature is often not linear, the set of temperatures for which the look-up table stores entries may not be distributed linearly; for example, the variation of many electro-optic media with temperature is most rapid at high temperatures, so that at low temperatures intervals of 20° C. between look-up tables might suffice, whereas at high temperatures intervals of 5° C. might be desirable.

An alternative method for temperature/operating time compensation is to use look-up table entries in the form of functions of the physical variable(s), or perhaps more accurately coefficients of standard terms in such functions. For simplicity consider the case of a display which uses a time modulation drive scheme in which each transition is handled by applying a constant voltage (of either polarity) to each pixel for a variable length of time, so that, absent any correction for environmental variables, each entry in the look-up table could consist only of a single signed number representing the duration of time for which the constant voltage is to be applied, and its polarity. If it is desired to correct such a display for variations in temperature such that the time $T_t$ for which the constant voltage needs to be applied for a specific transition at a temperature t is given by:

$$T_t = T_0 + A\Delta t + B(\Delta t)^2$$

where $T_0$ is the time required at some standard temperature, typically the mid-point of the intended operating temperature range of the display, and $\Delta t$ is the difference between t and the temperature at which $T_0$ is measured; the entries in the look-up table can consist of the values of $T_0$, A and B for the specific transition to which a given entry relates, and the calculation means can use these coefficients to calculate $T_t$ at the measured temperature. To put it more generally, the calculation means finds the appropriate look-up table entry for the relevant initial and final states, then uses the function defined by that entry to calculate the proper output signal having regard to the other variables to be taken into account.

The relevant temperature to be used for temperature compensation calculations is that of the electro-optic material at the relevant pixel, and this temperature may differ significantly from ambient temperature, especially in the case of displays intended for outdoor use where, for example, sunlight acting through a protective front sheet may cause the temperature of the electro-optic layer to be substantially higher than ambient. Indeed, in the case of large billboard-type outdoor signs, the temperature may vary between different pixels of the same display if, for example, part of the display falls within the shadow of an adjacent building, while the remainder is in full sunlight. Accordingly, it may be desirable to embed one or more thermocouples or other temperature sensors within or adjacent to the electro-optic layer to determine the actual temperature of this layer. In the case of large displays, it may also be desirable to provide for interpolation between temperatures sensed by a plurality of temperature sensors to estimate the temperature of each particular pixel. Finally, in the case of large displays formed from a plurality of modules which can replaced individually, the method and controller of the invention may provide for different operating times for pixels in different modules.

The methods of the present invention may also allow for the residence time (i.e., the period since the pixel last underwent a non-zero transition) of the specific pixel being driven. It has been found that, at least in some cases, the impulse necessary for a given transition various with the residence time of a pixel in its optical state, this phenomenon, which does not appear to have previously been discussed in the literature, hereinafter being referred to as "dwell time dependence" or "DTD", although the term "dwell time sensitivity" was used in the aforementioned Application Ser. No. 60/320,070. Thus, it may be desirable or even in some cases in practice necessary to vary the impulse applied for a given transition as a function of the residence time of the pixel in its initial optical state. In one approach to allowing for DTD, the look-up table contains an additional dimension, which is indexed by a counter indicating the residence time of the pixel in its initial optical state. In addition, the controller may require an additional storage area that contains a counter for every pixel in the display, and a display clock, which increments by one the counter value stored in each pixel at a set interval. The length of this interval must be an integral multiple of the frame time of the display, and therefore must be no less than one frame time. (The frame time of the display may not be constant, but instead may vary from scan to scan, by adjusting either the line time or the delay period at the end of the frame. In this case, the relationship between the frame counter and the elapsed time may be calculated by summing the frame times for the individual frames comprising the update.) The size of this counter and the clock frequency will be determined by the length of time over which the applied impulse will be varied, and the necessary time resolution. For example, storing a 4-bit counter for each pixel would allow the impulse to vary at 0.25 second intervals over a 4-second period (4 seconds*4 counts/sec=16 counts=4 bits). The counter may optionally be reset upon the occurrence of certain events, such as the transition of the pixel to a new state. Upon reaching its maximum value, the counter may be configured to either "roll over" to a count of zero, or to maintain its maximum value until it is reset.

The methods of the present invention may take account of not only the initial state of the relevant pixel and one or more gray level prior states of the same pixel, but also one or more temporal prior states of the pixel, i.e., data representing the state of the relevant pixel at defined points in time prior to the transition being considered. The output signal from the method is determined dependent upon the gray level and temporal prior states, and the initial state of the pixel.

Allowing for both the gray state levels in which a given pixel existed prior to the initial state and the length of time for which the pixel remained in those gray levels reduces "image drift" (i.e., inaccuracy in gray levels). It is believed (although the invention is in no way limited by this belief) that such image drift is due to polarization within the electro-optic medium.

Table 1 below illustrates a relatively simple application of a prior temporal/gray level state method to a two-bit (four gray level) gray scale display in which the various gray levels of denoted 0 (black), 1 (dark gray), 2 (light gray) and 3 (white). (Obviously, the method can be applied to applied to displays having large numbers of gray levels, for example a four-bit, 16 gray level, display having gray levels denoted from 0 (black) to 15 (white).) The middle line of Table 1 shows successive gray levels of a single pixel of the display; Table 1 assumes that the display is being updated continuously, so that the interval between adjacent columns of the display is one superframe (i.e., the interval necessary for a complete updating of the display). Obviously, if the present invention is applied to a display of a type (for example, a weather radar display) in which each updating if followed by a rest interval during which no rewriting of the display is effected, the interval between columns of Table 1 would be to be taken as one superframe plus the associated rest interval.

TABLE 1

| S10 | S9 | S8 | S7 | S6 | S5 | S4 | S3 | S2 | S1 |
|-----|----|----|----|----|----|----|----|----|----|
| 2 | 0 | 0 | 0 | 3 | 3 | 1 | 1 | 1 | 2 |
| R5 | R4 | R4 | R4 | R3 | R3 | R2 | R2 | R2 | R1 |

The top line of Table 1 shows the various temporal states Sx of the display, while the bottom of the table shows the corresponding gray level states Rx, the difference being that the temporal states change at intervals of one superframe, whereas the gray level states change only when there is a change in gray level (non-zero transition) of the relevant pixel. The right hand column of Table 1 represents the desired final state of the display after the transition being considered, while the penultimate column represents the initial state prior to this transition. Table 1 assumes a non-zero transition (i.e., that the final gray level is different from the initial gray level), since, at least in some cases, a zero transition in any one pixel of a bistable electro-optic display may be effected simply by not applying any voltage to the pixel during the relevant superframe.

Thus,
S1=R1=the desired final state of the pixel;
S2=R2=the initial state of the pixel;
S3=the first temporal prior state of the pixel;
S4=the second temporal prior state of the pixel; and similarly for S5 to S10, while:
R3=the first gray level prior state of the pixel;
R4=the second gray level prior state of the pixel; and
R5=the third gray level prior state of the pixel.

The basic look-up table method described in the aforementioned 2003/0137521 uses a look-up table indexed by (i.e., having dimensions corresponding to) R1 and R2, and optionally any one or more successive ones of R3, R4 and R5. In contrast, the prior temporal/gray level state method uses a look-up table indexed by at least R1 (=S1), R2 (=S2), R3 and S3. Optionally, the prior temporal/gray level state method may use a look-up table indexed by any one or more successive ones of R4, R5 etc., and any one or more successive ones of S4, S5 etc. It is not necessary that the prior temporal/gray level state method take account of an equal number of temporal and gray level prior states, nor is it necessary that the prior temporal/gray level state method take account of successive temporal prior states extending over the same time interval as the gray level prior states of which the method takes account. Indeed, since the variations in impulse due to changes in temporal prior states tend to be smaller than those due to changes in gray level prior states, it may, for example, in some cases be advantageous for the prior temporal/gray level state method to take account of (say) the first and second gray level prior states (R3 and R4 respectively) and only the first temporal prior state (S3), even though clearly the second gray level prior state R4 occurs at a time prior to the first temporal prior state S3.

As compared with the basic look-up table method, the prior temporal/gray level state method allows better compensation for effects (such as polarization fields building up with the electro-optic medium) due to the electro-optic medium "dwelling" in particular gray states for extended periods. This better compensation can reduce the overall complexity of the display controller and/or reduce the magnitude of image artifacts such as prior state ghosting.

The prior temporal/gray level state method may make use of any of the optional features of the basic look-up table method described above. Thus, the elements of the look-up table or transition matrix may have a variety of forms. In some cases, each element may comprise a single number. In other cases, each element may comprise a series of numbers relating to different portions of a waveform. In still other cases, such as a temperature-compensated display, it may be convenient for the elements of the look-up table to be in the form of functions (or, in practice, more accurately coefficients of various terms in such functions). Similarly, to prevent the look-up tables becoming too large, the length of individual entries in the look-up table may be reduced by making each entry (a) a pointer to an entry in a second table specifying one of a small number of types of waveform to be used; and (b) a small number of parameters specifying how this general waveform should be varied for the relevant transition. Furthermore, since the data comprising a look-up table can be treated as a general multi-dimensional data set, any standard functions, algorithms and encodings known to those skilled in the art of data storage and processing may be employed to reduce one or more of (a) the size of the storage required for the data set, (b) the computational effort required to extract the data, or (c) the time required to locate and extract a specific element from the set. These storage techniques include, for example, hash functions, loss-less and lossy compression, and representation of the data set as a combination of basic functions.

The values for the entries in the look-up table used in the prior temporal/gray level state method may be determined in advance through an empirical optimization process essentially similar to that described above for the basic look-up table method, although of course modified to allow for consideration of the one or more temporal prior states considered. To take into account the required number of temporal and gray level prior states of the pixel, it will generally be convenient to first determine the impulse needed for a particular transition when the state of the pixel is constant in the initial state and all prior states used in determining the impulse, and then to "fine tune" this impulse to allow for differing temporal and gray level prior states.

The prior temporal/gray level state method desirably provides for modification of the impulse to allow for variation in temperature and/or total operating time of the display, in exactly the same way as described above for the basic look-up table method. Prior state, temperature, operation time and other external variables may be used to modify the structure of the transitions comprising the waveform, for example by inserting 0 V periods within a transition, while leaving the net impulse unchanged.

Both the basic look-up table method and the prior temporal/gray level state method may of course be modified to take account of any other physical parameter which has a detectable effect upon the impulse needed to effect any one or more specific transitions of an electro-optic medium. For example, the method could be modified to incorporate corrections for ambient humidity if the electro-optic medium is found to be sensitive to humidity.

For a bistable electro-optic medium, the look-up table may have the characteristic that, for any zero transition in which the initial and final states of the pixel are the same, the entry will be zero, or in other words, no voltage will be applied to the pixel. As a corollary, if no pixels on the display change during a given interval, then no impulses need be applied. This enables ultra-low power operation, as well as ensuring that the electro-optic medium is not overdriven while a static image is being displayed. In general, the look-up table may only retain information about non-null transitions. In other words, for two images, I and I+1, if a given pixel is in the same state in I and I+1, then state I+1 need not be stored in the prior state table, and no further information need be stored until that pixel undergoes a transition. However, as discussed below, at least in some cases it may still be advantageous to apply impulses to pixels undergoing zero transitions.

The look-up table methods described above can be practiced with controllers having a variety of physical forms, and using any conventional data processing components. For example, the methods could be practiced using a general purpose digital computer in conjunction with appropriate equipment (for example, one or more digital analog converters, "DAC's") to convert the digital outputs from the computer to appropriate voltages for application to pixels. Alternatively, the methods could be practiced using an application specific integrated circuit (ASIC). In particular, the controller could have the form of a video card which could be inserted into a personal computer to enable the images generated by the computer to be displayed on an electro-optic screen instead of or in addition to an existing screen, such as a LCD. Since the construction of the controller is well within the level of skill in the image processing art, it is unnecessary to describe its circuitry in detail herein.

A preferred physical embodiment of the controller is a timing controller integrated circuit (IC). This IC accepts incoming image data and outputs control signals to a collection of data and select driver IC's, in order to produce the proper voltages at the pixels to produce the desired image. This IC may accept the image data through access to a memory buffer that contains the image data, or it may receive a signal intended to drive a traditional LCD panel, from which it can extract the image data. It may also receive any serial signal containing information that it requires to perform the necessary impulse calculations. Alternately, this timing controller can be implemented in software, or incorporated as a part of the CPU. The timing controller may also have the ability to measure any external parameters that influence the operation of the display, such as temperature.

The controller can operate as follows. The look-up table(s) are stored in memory accessible to the controller. For each pixel in turn, all of the necessary initial, final and (optionally) prior and physical state information is supplied as inputs. The state information is then used to compute an index into the look-up table. In the case of quantized temperature or other correction, the return value from a look-up using this index will be one voltage, or an array of voltages versus time. The controller will repeat this process for the two bracketing temperatures in the look-up table, then interpolate between the values. For the algorithmic temperature correction, the return value of the look-up will be one or more parameters, which can then be inserted into an equation along with the temperature, to determine the proper form of the drive impulse, as already described. This procedure can be accomplished similarly for any other system variables that require real-time modification of the drive impulse. One or more of these system variables may be determined by, for example, the value of a programmable resistor, or a memory location in an EPROM, which is set on the display panel at the time of construction in order to optimize the performance of the display.

An important feature of the display controller is that, unlike most displays, in most practical cases several complete scans of the display will be required in order to complete an image update. The series of scans required for one image update should be considered to be an uninterruptible unit. If the display controller and image source are operating asynchronously, then the controller must ensure that the data being used to calculate applied impulses remains constant across all scans. This can be accomplished in one of two ways. Firstly, the incoming image data could be stored in a separate buffer by the display controller (alternatively, if the display controller is accessing a display buffer through dual-ported memory, it could lock out access from the CPU). Secondly, on the first scan, the controller may store the calculated impulses in an impulse buffer. The second option has the advantage that the overhead for scanning the panel is only incurred once per transition, and the data for the remaining scans can be output directly from the buffer.

Optionally, imaging updating may be conducted in an asynchronous manner. Although it will, in general, take several scans to effect a complete transition between two images, individual pixels can begin transitions, or reverse transitions that have already started, in mid-superframe. In order to accomplish this, the controller must keep track of what portion of the total transition have been accomplished for a given pixel. If a request is received to change the optical state of a pixel that is not currently in transition, then the counter for that pixel can be set to zero, and the pixel will begin transitioning on the next frame. If the pixel is actively transitioning when a new request is received, then the controller will apply an algorithm to determine how to reach the new state from the current mid-transition state. This may be effected, for example, by adding an extra dimension to the look-up table to indicate how many frames into the update a given pixel is before the request to transition to a new state is given. In this way, transitions can be specified not just between final gray states, but also between intermediate points in any transition to a new final gray state.

In order to minimize the power necessary to operate a display, and to maximize the image stability of the electro-optic medium, the display controller may stop scanning the display and reduce the voltage applied to all pixels to, or close to, zero, when there are no pixels in the display that are undergoing transitions. Very advantageously, the display controller may turn off the power to its associated row and column drivers while the display is in such a "hold" state, thus minimizing power consumption. In this scheme, the drivers would be reactivated when the next pixel transition is requested.

FIG. 1 of the accompanying drawings shows schematically an apparatus, useful for carrying out the driving methods of the present invention, in use, together with associated apparatus. The overall apparatus (generally designated 10) shown in FIG. 1 comprises an image source, shown as a personal computer 12 which outputs on a data line 14 data representing an image. The data line 14 can be of any conventional type and may be a single data line or a bus; for example, the data line 14 could comprise a universal serial bus (USB), serial, parallel, IEEE-1394 or other line. The data which are placed on the line 14 can be in the form of a conventional bit mapped image, for example a bit map (BMP), tagged image file format (TIF), graphics interchange format (GIF) or Joint Photographic Experts Group (JPEG) file. Alternatively, however, the data placed on the line 14 could be in the form of signals intended for driving a video device; for example, many computers provide a video output for driving an external monitor and signals on such outputs may be used in the present invention. It will be apparent to those skilled in imaging processing that the apparatus described below may have to perform substantial file format conversion and/or decoding to make use of the disparate types of input signals which can be used, but such conversion and/or decoding is well within the level of skill in the art, and accordingly, the apparatus will be described only from the point at which the image data used as its original inputs have been converted to a format in which they can be processed by the apparatus.

The data line 14 extends to a controller unit 16, as described in detail below. This controller unit 16 generates one set of output signals on a data bus 18 and a second set of signals on a separate data bus 20. The data bus 18 is connected to two row (or gate) drivers 22, while the data bus 20 is connected to a plurality of column (or source) drivers 24. (The number of row drivers 22 and column drivers 24 is greatly reduced in FIG. 1 for ease of illustration.) The row and column drivers control the operation of a bistable electro-optic display 26.

The apparatus shown in FIG. 1 is chosen to illustrate the various units used, and is most suitable for a developmental, "breadboard" unit. In actual commercial production, the controller 16 will typically be part of the same physical unit as the display 26, and the image source may also be part of this physical unit, as in conventional laptop computers equipped with LCD's, and in personal digital assistants. Also, the apparatus is illustrated in FIG. 1, and will be mainly described below, in conjunction with an active matrix display architecture which has a single common, transparent electrode (not shown in FIG. 1) on one side of the electro-optic layer, this common electrode extending across all the pixels of the display. Typically, this common electrode lies between the electro-optic layer and the observer and forms a viewing surface through which an observer views the display. On the opposed side of the electro-optic layer is disposed a matrix of pixel electrodes arranged in rows and columns such that each pixel electrode is uniquely defined by the intersection of a single row and a single column. Thus, the electric field experienced by each pixel of the electro-optic layer is controlled by varying the voltage applied to the associated pixel electrode relative to the voltage (normally designated "Vcom") applied to the common front electrode. Each pixel electrode is associated with at least one transistor, typically a thin film transistor. The gates of the transistors in each row are connected via a single elongate row electrode to one of the row drivers 22. The source electrodes of the transistors in each column are connected via a single elongate column electrode to one of column drivers 24. The drain electrode of each transistor is connected directly to the pixel electrode. It will be appreciated that the assignment of the gates to rows and the source electrodes to columns is arbitrary, and could be reversed, as could the assignment of source and drain electrodes. However, the following description will assume the conventional assignments.

During operation, the row drivers 22 apply voltages to the gates such that the transistors in one and only one row are conductive at any given time. Simultaneously, the column drivers 24 apply predetermined voltages to each of the column electrodes. Thus, the voltages applied to the column drivers are applied to only one row of the pixel electrodes, thus writing (or at least partially writing) one line of the desired image on the electro-optic medium. The row driver then shifts to make the transistors in the next row conductive, a different set of voltages are applied to the column electrodes, and the next line of the image is written.

It is emphasized that the methods of the present invention are not confined to such active matrix displays. Once the correct waveforms for each pixel of the image have been determined in accordance with the methods of the present invention, any switching scheme may be used to apply the waveforms to the pixels. For example, the present methods can be used in a so-called "direct drive" scheme, in which each pixel is provided with a separate drive line. In principle, the present methods can also be used in a passive matrix drive scheme of the type used in some LCD's, but it should be noted that, since many bistable electro-optic media lack a threshold for switching (i.e., the media will change optical state if even a small electric field is applied for a prolonged period), such media are unsuitable for passive matrix driving. However, since it appears that the present methods will find their major application in active matrix displays, they will be described herein primarily with reference to such displays.

The controller unit 16 (FIG. 1) has two main functions. Firstly, using the methods of the present invention, the controller calculates a two-dimensional matrix of impulses (or waveforms) which must be applied to the pixels of a display to change an initial image to a final image. Secondly, the controller 16 calculates, from this matrix of impulses, all the timing signals necessary to provide the desired impulses at the pixel electrodes to drive a bistable electro-optic display.

Figure 2:
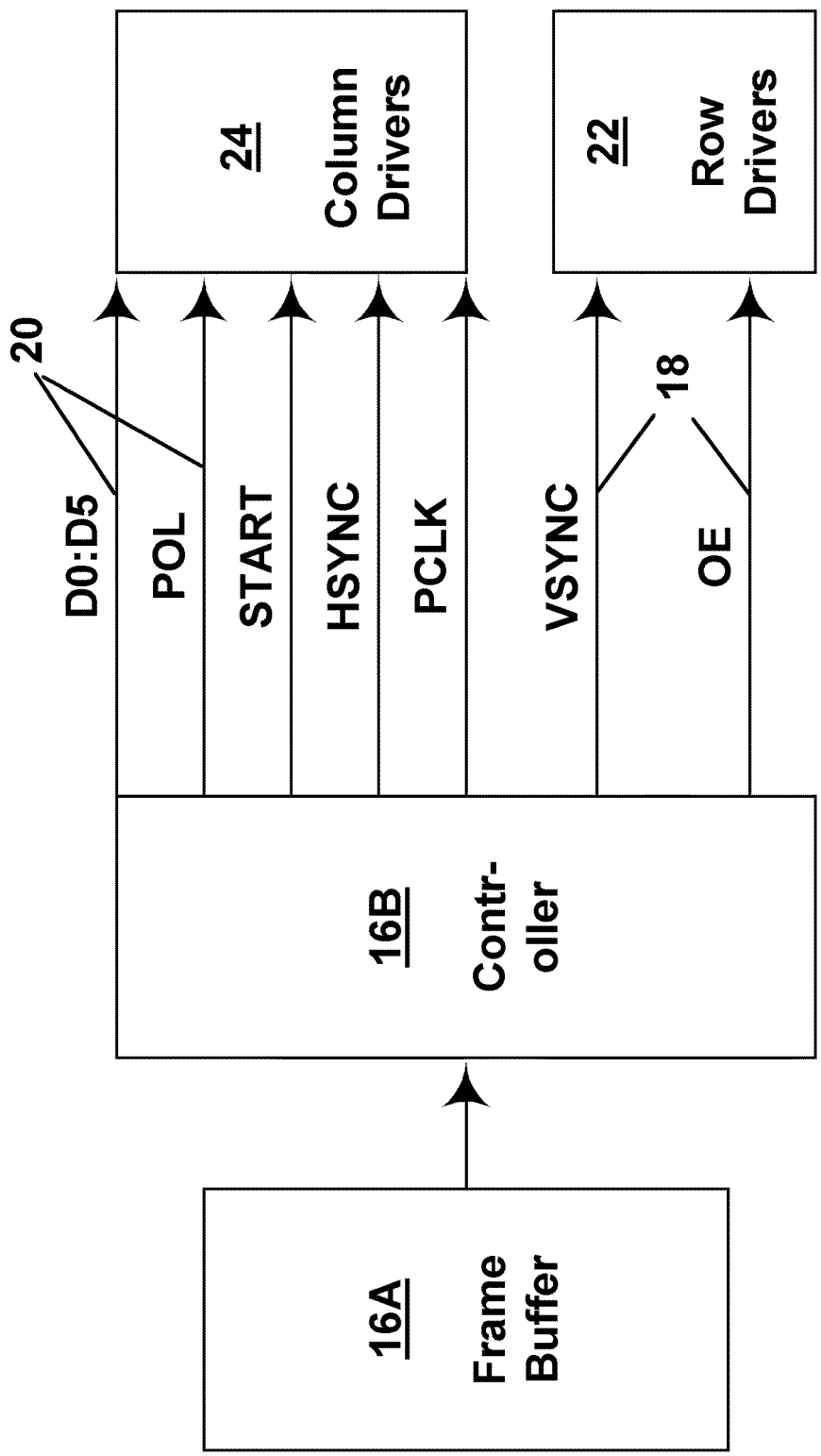
FIG. 2 is a schematic block diagram of the controller unit shown in FIG. 1 and illustrates the output signals generated by this unit.

As shown in FIG. 2, the controller unit 16 seen in FIG. 1 has two main sections, namely a frame buffer 16A, which buffers the data representing the final image which the controller 16B is to write to the display 26 (FIG. 1), and the controller proper, denoted 16B. The controller 16B reads data from the buffer 16A pixel by pixel and generates various signals on the data buses 18 and 20 as described below.

The signals shown in FIG. 2 are as follows:

D0:D5—a six-bit voltage value for a pixel (obviously, the number of bits in this signal may vary depending upon the specific row and column drivers used)

POL—pixel polarity with respect to Vcom (see below)

START—places a start bit into the column driver 24 to enable loading of pixel values HSYNC—horizontal synchronization signal, which latches the column driver PCLK—pixel clock, which shifts the start bit along the row driver VSYNC—vertical synchronization signal, which loads a start bit into the row driver OE—output enable signal, which latches the row driver.

Of these signals, VSYNC and OE supplied to the row drivers 22 are essentially the same as the corresponding signals supplied to the row drivers in a conventional active matrix LCD, since the manner of scanning the rows in the apparatus shown in FIG. 1 is in principle identical to the manner of scanning an LCD, although of course the exact timing of these signals may vary depending upon the precise electro-optic medium used. Similarly, the START, HSYNC and PCLK signals supplied to the column drivers are essentially the same as the corresponding signals supplied to the column drivers in a conventional active matrix LCD, although their exact timing may vary depending upon the precise electro-optic medium used. Hence, it is considered that no further description of these output signals in necessary.

Figure 3:
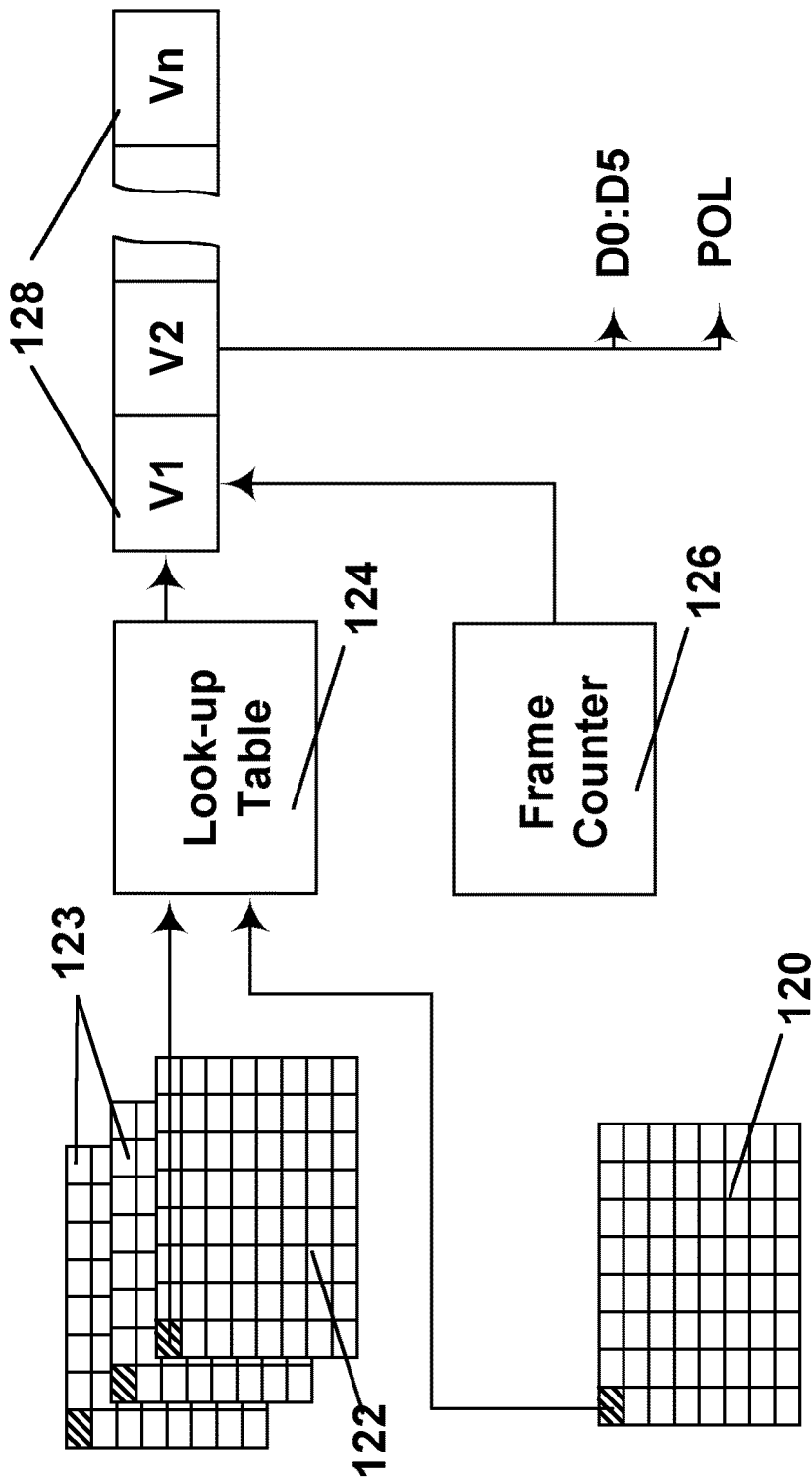
FIG. 3 is a schematic block diagram showing the manner in which the controller unit shown in FIGS. 1 and 2 generates certain output signals shown in FIG. 2.

FIG. 3 illustrates, in a highly schematic manner, the way in which the controller 16B shown in FIG. 2 generates the D0:D5 and POL signals. As described above, the controller 16B stores data representing the final image 120 (the image which it is desired to write to the display), the initial image 122 previously written to the display, and optionally one or more prior images 123 which were written to the display before the initial image. The embodiment of the invention shown in FIG. 3 stores two such prior images 123. (Obviously, the necessary data storage can be within the controller 16B or in an external data storage device.) The controller 16B uses the data for a specific pixel (illustrated as the first pixel in the first row, as shown by the shading in FIG. 3) in the initial, final and prior images 120, 122 and 123 as pointers into a look-up table 124, which provides the value of the impulse which must be applied to the specific pixel to change the state of that pixel to the desired gray level in the final image. The resultant output from the look-up table 124, and the output from a frame counter 126, are supplied to a voltage v. frame array 128, which generates the D0:D5 and POL signals.

The controller 16B (FIG. 2) is designed for use with a TFT LCD driver that is equipped with pixel inversion circuitry, which ordinarily alternates the polarity of neighboring pixels with respect to the top plane. Alternate pixels will be designated as even and odd, and are connected to opposing sides of the voltage ladder. Furthermore, a driver input, labeled "polarity", serves to switch the polarity of the even and odd pixels. The driver is provided with four or more gamma voltage levels, which can be set to determine the local slope of the voltage-level curve. A representative example of a commercial integrated circuit (IC) with these features is the Samsung KS0652 300/309 channel TFT-LCD source driver. As previously discussed, the display to be driven uses a common electrode on one side of the electro-optic medium, the voltage applied to this common electrode being referred to as the "top plane voltage" or "Vcom".

Figure 4:
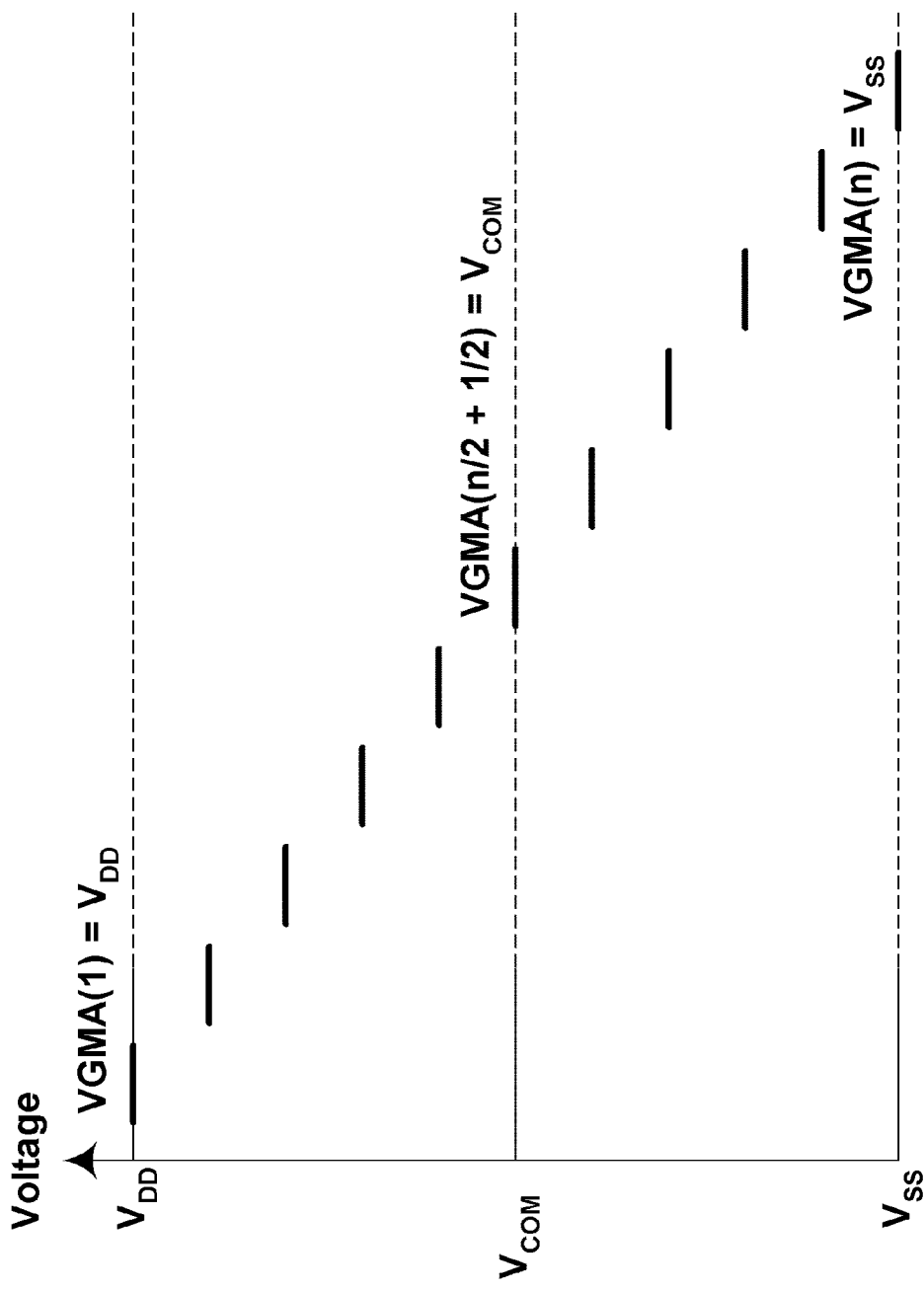
FIGS. 4 and 5 illustrate two different sets of reference voltages which can be used in the display shown in FIG. 1.
Figure 5:
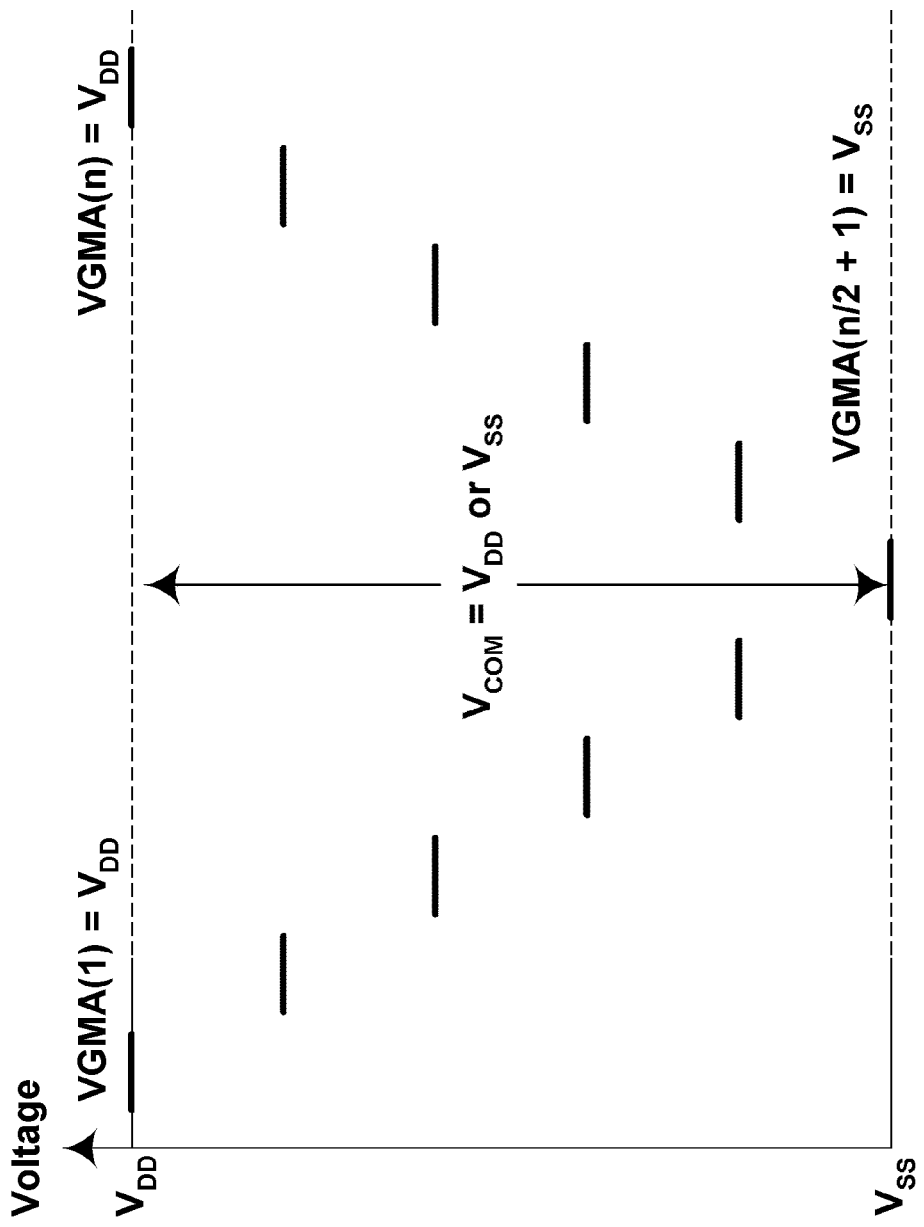

In one embodiment, illustrated in FIG. 4 of the accompanying drawings, the reference voltages of the driver are arranged so that the top plane voltage is placed at one half the maximum voltage (Vmax) which the driver can supply, i.e., $$V\text{com}=V\text{max}/2$$

and the gamma voltages are arranged to vary linearly above and below the top plane voltage. (FIGS. 4 and 5 are drawn assuming an odd number of gamma voltages so that, for example, in FIG. 4 the gamma voltage VGMA(n/2+½) is equal to Vcom. If an even number of gamma voltages are present, both VGMA(n/2) and VGMA(n/2+1) are set equal to Vcom. Similarly, in FIG. 5, if an even number of gamma voltages are present, both VGMA(n/2) and VGMA(n/2+1) are set equal to the ground voltage Vss.) The pulse length necessary to achieve all needed transitions is determined by dividing the largest impulse needed to create the new image by Vmax/2. This impulse can be converted into a number of frames by multiplying by the scan rate of the display. The necessary number of frames is then multiplied by two, to give an equal number of even and odd frames. These even and odd frames will correspond to whether the polarity bit is set high or low for the frame. For each pixel in each frame, the controller 16B must apply an algorithm which takes as its inputs (1) whether the pixel is even or odd; (2) whether the polarity bit is high or low for the frame being considered; (3) whether the desired impulse is positive or negative; and (4) the magnitude of the desired impulse. The algorithm then determines whether the pixel can be addressed with the desired polarity during that frame. If so, the proper drive voltage (impulse/pulse length) is applied to the pixel. If not, then the pixel is brought to the top plane voltage (Vmax/2) to place it in a hold state, in which no electric field is applied to the pixel during that frame.

For example, consider two neighboring pixels in the display, an odd pixel 1 and an even pixel 2. Further, assume that when the polarity bit is high, the odd pixels will be able to access the positive drive voltage range (i.e. above the top plane voltage), and the even pixels will be able to access the negative voltages (i.e. below the top plane voltage). If both pixels 1 and 2 need to be driven with a positive impulse, then the following sequence must occur:

(a) during the positive polarity frames, pixel 1 is driven with a positive voltage, and pixel 2 is held at the top plane voltage; and (b) during the negative polarity frames, pixel 1 is held at the top plane voltage, while pixel 2 is driven with a positive voltage.

Although typically frames with positive and negative polarity will be interleaved 1:1 (i.e., will alternate with each other), but this is not necessary; for example, all the odd frames could be grouped together, followed by all the even frames. This would result in alternate columns of the display being driven in two separate groups.

The major advantage of this embodiment is that the common front electrode does not have to be switched during operation. The primary disadvantage is that the maximum drive voltage available to the electro-optic medium is only half of the maximum voltage of the driver, and that each line may only be driven 50% of the time. Thus, the refresh time of such a display is four times the switching time of the electro-optic medium under the same maximum drive voltage.

In a second embodiment of this form of the invention, the gamma voltages of the driver are arranged as shown in FIG. 5, and the common electrode switches between V=0 and V=Vmax. Arranging the gamma voltages in this way allows both even and odd pixels to be driven simultaneously in a single direction, but requires that the common electrode be switched to access the opposite drive polarity. In addition, because this arrangement is symmetric about the top plane voltage, a particular input to the drivers will result in the same voltage being applied on either an odd or an even pixel. In this case, the inputs to the algorithm are the magnitude and sign of the desired impulse, and the polarity of the top plane. If the current common electrode setting corresponds to the sign of the desired impulse, then this value is output. If the desired impulse is in the opposite direction, then the pixel is set to the top plane voltage so that no electric field is applied to the pixel during that frame.

As in the embodiment previously described, in this embodiment the necessary length of the drive pulse can be calculated by dividing the maximum impulse by the maximum drive voltage, and this value converted into frames by multiplying by the display refresh rate. Again, the number of frames must be doubled, to account for the fact that the display can only be driven in one direction with respect to the top plane at a time.

The major advantage of this second embodiment is that the full voltage of the driver can be used, and all of the outputs can be driven at once. However, two frames are required for driving in opposed directions. Thus, the refresh time of such a display is twice the switching time of the electro-optic medium under the same maximum drive voltage. The major drawback is the need to switch the common electrode, which may result in unwanted voltage artifacts in the electro-optic medium, the transistors associated with the pixel electrodes, or both.

In either embodiment, the gamma voltages are normally arranged on a linear ramp between the maximum voltages of the driver and the top plane voltage. Depending upon the design of the driver, it may be necessary to set one or more of the gamma voltages at the top plane value, in order to ensure that the driver can actually produce the top plane voltage on the output.

Reference has already been made above to the need to adapt the method of the present invention to the limitations of conventional drivers designed for use with LCD's. More specifically, conventional column drivers for LCD's, and particularly super twisted nematic (STN) LCD's (which can usually handle higher voltages than other types of column drivers), are only capable of applying one of two voltages to a drive line at any given time, since this is all that a polarity-insensitive LC material requires. In contrast, to drive polarity-sensitive electro-optic displays, a minimum of three driver voltage levels are necessary. The three driver voltages required are V−, which drives a pixel negative with respect to the top plane voltage, V+, which drives a pixel positive with respect to the top plane voltage, and 0 V with respect to the top plane voltage, which will hold the pixel in the same display state.

The methods of the present invention can, however, be practiced with this type of conventional LCD driver, provided that the controller is arranged to apply an appropriate sequence of voltages to the inputs of one or more column drivers, and their associated row drivers, in order to apply the necessary impulses to the pixels of an electro-optic display.

There are two principal variants of this approach. In the first variant, all the impulses applied must have one of three values: +I, −I or 0, where:

$$+I = -(-I) = V\mathrm{app} * t_{pulse}$$

where Vapp is the applied voltage above the top plane voltage, and $t_{pulse}$ is the pulse length in seconds. This variant only allows the display to operate in a binary (black/white) mode. In the second variant, the applied impulses may vary from +I to −I, but must be integral multiples of Vapp/freq, where freq is the refresh frequency of the display.

This variant takes advantage of the fact that, as already noted, conventional LCD drivers are designed to reverse polarity at frequent intervals to avoid certain undesirable effects which might otherwise be produced in the display. Consequently, such drivers are arranged to receive from the controller a polarity or control voltage, which can either be high or low. When a low control voltage is asserted, the output voltage on any given driver output line can adopt one of two out of the possible three voltages required, say V1 or V2, while when a high control voltage is asserted, the output voltage on any given line can adopt one of a different two of the possible three voltages required, say V2 or V3. Thus, while only two out of the three required voltages can be addressed at any specific time, all three voltages can be achieved at differing times. The three required voltages will usually satisfy the relationship:

$$V2 = (V3 + V1)/2$$

and V1 may be at or near the logic ground.

In this method, the display will be scanned 2*tpulse*freq times. For half these scans (i.e., for tpulse*freq scans), the driver will be set to output either V1 or V2, which will normally be equal to −V and Vcom, respectively. Thus, during these scans, the pixels are either driven negative, or held in the same display state. For the other half of the scans, the driver will be switched to output either V2 or V3, which will normally be at Vcom and +V respectively. In these scans, the pixels are driven positive or held in the same display state. Table 2 below illustrates how these options can be combined to produce a drive in either direction or a hold state; the correlation of positive driving with approach to a dark state and negative driving with approach to a light state is of course a function of the specific electro-optic medium used.

TABLE 2

Drive sequence for achieving bi-directional drive plus hold with STN drivers

| | Driver outputs | |
|---|---|---|
| Desired Drive | V1-V2 | V2-V3 |
| positive (drive dark) | V2 | V3 |
| negative (drive white) | V1 | V2 |
| hold | V2 | V2 |

There are several different ways to arrange the two portions of the drive scheme (i.e., the two different types of scans or "frames"). For example, the two types of frames could alternate. If this is done at a high refresh rate, then the electro-optic medium will appear to be simultaneously lightening and darkening, when in fact it is being driven in opposed direction in alternate frames. Alternatively, all of the frames of one type could occur before any of the frames of the second type; this would result in a two-step drive appearance. Other arrangements are of course possible; for example two or more frames of one type followed by two or more of the opposed type. Additionally, if there are no pixels that need to be driven in one of the two directions, then the frames of that polarity can be dropped, reducing the drive time by 50%.

While this first variant can only produce binary images, the second variant can render images with multiple gray scale levels. This is accomplished by combining the drive scheme described above with modulation of the pulse widths for different pixels. In this case, the display is again scanned 2*tpulse*freq times, but the driving voltage is only applied to any particular pixel during enough of these scans to ensure that the desired impulse for that particular pixel is achieved. For example, for each pixel, the total applied impulse could be recorded, and when the pixel reached its desired impulse, the pixel could be held at the top plane voltage for all subsequent scans. For pixels that need to be driven for less than the total scanning time, the driving portion of this time (i.e., the portion of the time during which an impulse is applied to change the display state of the pixel, as opposed to the holding portion during which the applied voltage simply maintains the display state of the pixel) may be distributed in a variety of ways within the total time. For example, all driving portions could be set to start at the beginning of the total time, or all driving portions could instead be timed to complete at the end of the total time. As in the first variant, if at any time in the second variant no further impulses of a particular polarity need to be applied to any pixel, then the scans applying pulses of that polarity can be eliminated. This may mean that the entire pulse is shortened, for example, if the maximum impulse to be applied in both the positive and negative directions is less than the maximum allowable impulse.

To take a highly simplified case for purposes of illustration, consider the application of the gray scale scheme described above to a display having four gray levels, namely black (level 0), dark gray (level 1), light gray (level 2) and white (level 3). One possible drive scheme for such a display is summarized in Table 3 below.

TABLE 3

| | Frame No. | | | | | |
|---|---|---|---|---|---|---|
| | 1 | 2 | 3 | 4 | 5 | 6 |
| Parity | Odd | Even | Odd | Even | Odd | Even |
| Transition | | | | | | |
| 0-3 | + | 0 | + | 0 | + | 0 |
| 0-2 | + | 0 | + | 0 | 0 | 0 |
| 0-1 | + | 0 | 0 | 0 | 0 | 0 |
| 0-0 | 0 | 0 | 0 | 0 | 0 | 0 |
| 3-0 | 0 | − | 0 | − | 0 | − |
| 2-0 | 0 | − | 0 | − | 0 | 0 |
| 1-0 | 0 | − | 0 | 0 | 0 | 0 |

For ease of illustration, this drive scheme is assumed to use only six frames, although in practice a greater number would typically be employed. These frames are alternately odd and even. White-going transitions (i.e., transitions in which the gray level is increased) are driven only on the odd frames, while black-going transitions (i.e., transitions in which the gray level is decreased) are driven only on the even frames. On any frame when a pixel is not being driven, it is held at the same voltage as the common front electrode, as indicated by "0" in Table 3. For the 0-3 (black-white) transition, a white-going impulse is applied (i.e., the pixel electrode is held at a voltage relative to the common front electrode which tends to increase the gray level of the pixel) in each of the odd frames, Frames 1, 3 and 5. For a 0-2 (black to light gray) transition, on the other hand, a white-going impulse is applied only in Frames 1 and 3, and no impulse is applied in Frame 5; this is of course arbitrary, and, for example, a white-going impulse could be applied in Frames 1 and 5 and no impulse applied in Frame 3. For a 0-1 (black to dark gray) transition, a white-going impulse is applied only in Frame 1, and no impulse is applied in Frames 3 and 5; again, this is arbitrary, and, for example, a white-going impulse could be applied in Frame 3 and no impulse applied in Frames 1 and 5.

The black-going transitions are handled in a manner exactly similar to the corresponding white-going transitions except that the black-going impulses are applied only in the even frames of the drive scheme. It is believed that those skilled in driving electro-optic displays will readily be able to understand the manner in which the transitions not shown in Table 3 are handled from the foregoing description.

The sets of impulses described above can either be stand-alone transitions between two images (as in general image flow), or they may be part of a sequence of impulses designed to accomplish an image transition (as in a slide-show waveform, as discussed in more detail below).

Although emphasis has been laid above on driving methods which permit the use of conventional drivers designed for use with LCD's, the present methods can make use of custom drivers, and a driver which is intended to enable accurate control of gray states in an electro-optic display, while achieving rapid writing of the display will now be described with reference to FIGS. 6 and 7.

As already discussed, to first order, many electro-optic media respond to a voltage impulse, which can be expressed as V times t (or more generally, by the integral of V with respect to t) where V is the voltage applied to a pixel and t is the time over which the voltage is applied. Thus, gray states can be obtained by modulating the length of the voltage pulse applied to the display, or by modulating the applied voltage, or by a combination of these two.

In the case of pulse width modulation in an active matrix display, the attainable pulse width resolution is simply the inverse of the refresh rate of the display. In other words, for a display with a 100 Hz refresh rate, the pulse length can be subdivided into 10 ms intervals. This is because each pixel in the display is only addressed once per scan, when the select line for the pixels in that row are activated. For the rest of the time, the voltage on the pixel may be maintained by a storage capacitor, as described in the aforementioned WO 01/07961. As the response speed of the electro-optic medium becomes faster, the slope of the reflectivity versus time curve becomes steeper and steeper. Thus, to maintain the same gray scale resolution, the refresh rate of the display must increase accordingly. Increasing the refresh rate results in higher power consumption, and eventually becomes impractical as the transistors and drivers are expected to charge the pixel and line capacitance in a shorter and shorter time.

On the other hand, in a voltage modulated display, the impulse resolution is simply determined by the number of voltage steps, and is independent of the speed of the electro-optic medium. The effective resolution can be increased by imposing a nonlinear spacing of the voltage steps, concentrating them where the voltage/reflectivity response of the electro-optic medium is steepest.

Figure 6:
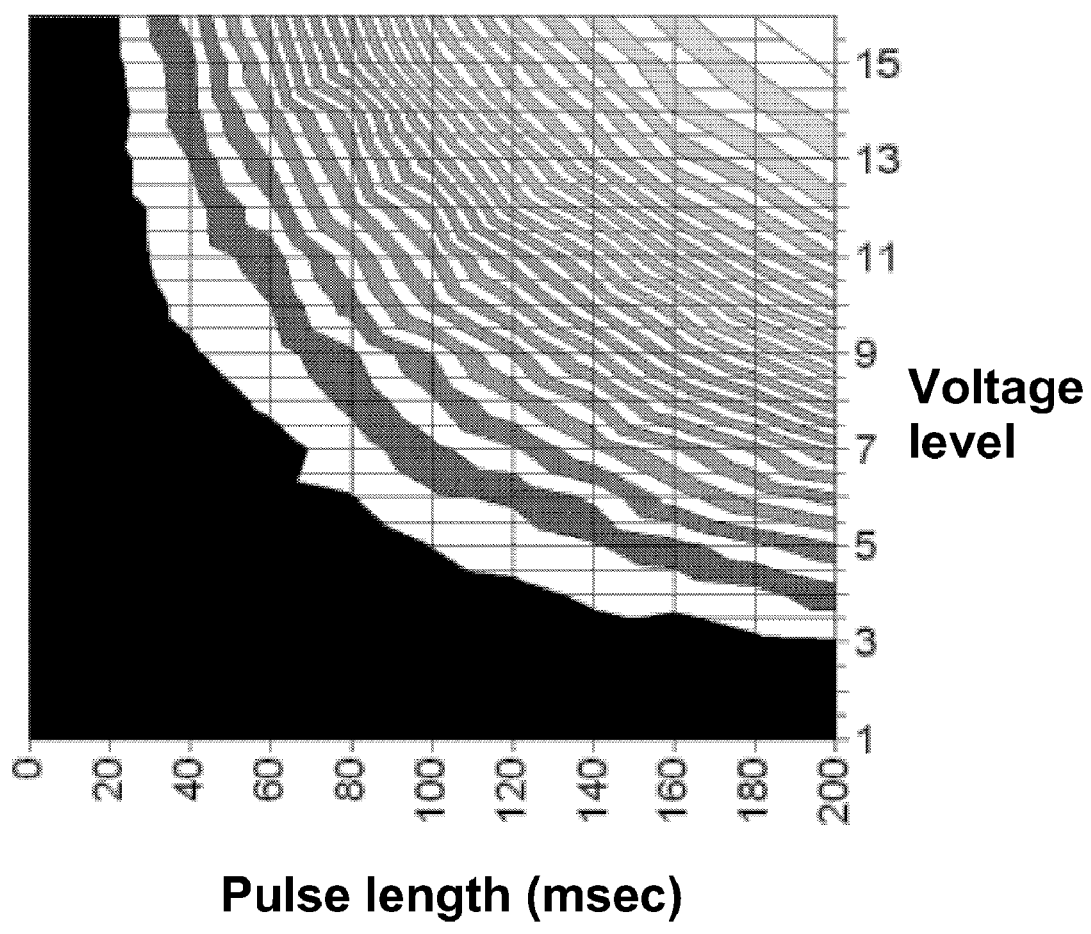
FIG. 6 is a schematic representation of tradeoffs between pulse width modulation and voltage modulation approaches in a look-up table method of the present invention.

FIG. 6 of the accompanying drawings is a schematic representation of the tradeoffs between the pulse width modulation (PWM) and voltage modulation (VM) approaches. The horizontal axis represents pulse length, while the vertical axis represents voltage. The reflectivity of the particle-based electrophoretic display as a function of these two parameters is represented as a contour plot, with the bands and spaces representing differences of 1 L* in the reflected luminance of the display. (It has been found empirically that a difference in luminance of 1 L* is just noticeable to an average subject in dual stimulus experiments.) The particular particle-based electrophoretic medium used in the experiments summarized in FIG. 6 had a response time of 200 ms at the maximum voltage (16 V) shown in the Figure.

The effects of pulse width modulation alone can be determined by traversing the plot horizontally along the top, while the effects of voltage modulation alone are seen by examining the right vertical edge. From this plot, it is clear that, if a display using this particular medium were driven at a refresh rate of 100 Hz in a pulse width modulation (PWM) mode, it would not be possible to obtain a reflectivity within ±1 L* in the middle gray region, where the contours are steepest. In voltage modulation (VM) mode, achieving a reflectivity within ±1 L* would require 128 equally spaced voltage levels, while running at a frame rate as low as 5 Hz (assuming, of course, that the voltage holding capability of the pixel, provided by a capacitor, is high enough). In addition, these two approaches can be combined to achieve the same accuracy with fewer voltage levels. To further reduce the required number of voltage levels, they could be concentrated in the steep middle portion of the curves shown in FIG. 6 but made sparse in the outer regions. This could be accomplished with a small number of input gamma voltages. To further reduce the required number of voltage levels, they could be concentrated at advantageous values. For example, very small voltages are not useful for achieving transitions if application of such a small voltage over the allotted address time is not sufficient to make any of the desired gray state transitions. Choosing a distribution of voltages that excludes such small voltages allows the allowed voltages to be more advantageously placed.

Since bistable electro-optic displays are sensitive to the polarity of the applied electric field, as noted above, it is not desirable to reverse the polarity of the drive voltage on successive frames (images), as is usually done with LCD's, and frame, pixel and line inversion are unnecessary, and indeed counterproductive. For example, LCD drivers with pixel inversion deliver voltages of alternating polarity in alternate frames. Thus, it is only possible to deliver an impulse of the proper polarity in one half of the frames. This is not a problem in an LCD, where the liquid crystal material in not sensitive to polarity, but in a bistable electro-optic display it doubles the time required to address the electro-optic medium.

Similarly, because bistable electro-optic displays are impulse transducers and not voltage transducers, the displays integrate voltage errors over time, which can result in large deviations of the pixels of the display from their desired optical states. This makes it important to use drivers with high voltage accuracy, and a tolerance of ±3 mV or less is recommended.

To enable a driver to address a monochrome XGA (1024×768) display panel at a 75 Hz refresh rate, a maximum pixel clock rate of 60 MHz is required; achieving this clock rate is within the state of the art.

As already mentioned, one of the primary virtues of particle-based electrophoretic and other similar bistable electro-optic displays is their image stability, and the consequent opportunity to run the display at very low power consumption. To take maximum advantage of this opportunity, power to the driver should be disabled when the image is not changing. Accordingly, the driver should be designed to power down in a controlled manner, without creating any spurious voltages on the output lines. Because entering and leaving such a "sleep" mode will be a common occurrence, the power-down and power-up sequences should be as rapid as possible, and should have minimal effects on the lifetime of the driver.

In addition, there should be an input pin that brings all of the driver output pins to Vcom, which will hold all of the pixels at their current optical state without powering down the driver.

The present drivers are useful, inter alia, for driving medium to high resolution, high information content portable displays, for example a 7 inch (178 mm) diagonal XGA monochrome display. To minimize the number of integrated circuits required in such high resolution panels, it is desirable to use drivers with a high number (for example, 324) of outputs per package. It is also desirable that the driver have an option to run in one or more other modes with fewer of its outputs enabled. The preferred method for attaching the integrated circuits to the display panel is tape carrier package (TCP), so it is desirable to arrange the sizing and spacing of the driver outputs to facilitate use of this method.

The present drivers will typically be used to drive small to medium size active matrix panels at around 10-30 V. Accordingly, the drivers should be capable of driving capacitative loads of approximately 100 pF.

Figure 7:
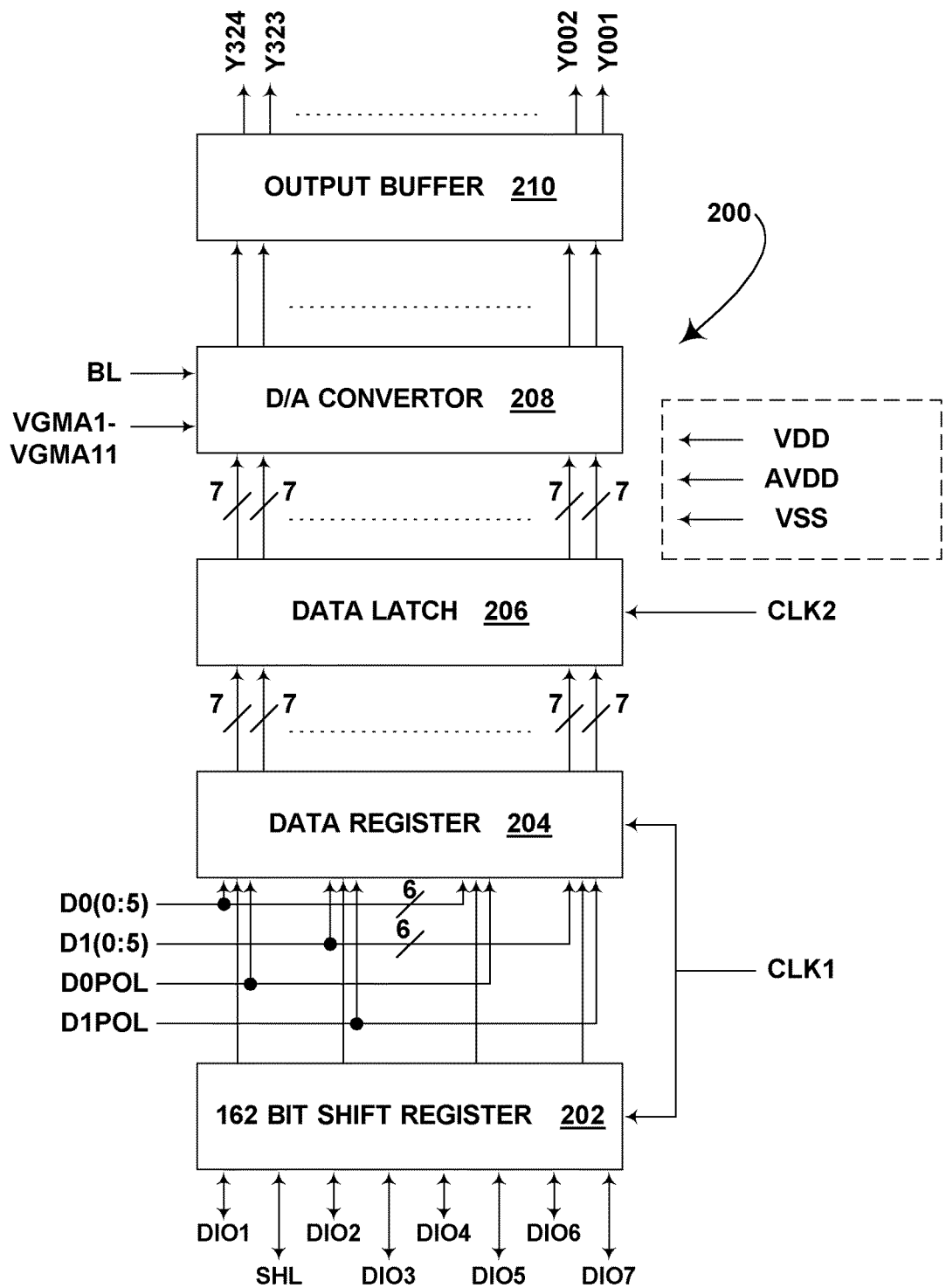
FIG. 7 is a block diagram of a custom driver useful in a look-up table method of the present invention.

A block diagram of a preferred driver (generally designated 200) useful in the methods of the invention is given in FIG. 7 of the accompanying drawings. This driver 200 comprises a shift register 202, a data register 204, a data latch 206, a digital to analogue converter (DAC) 208 and an output buffer 210. This driver differs from those typically used to drive LCD's in that it provides for a polarity bit associated with each pixel of the display, and for generating an output above or below the top plane voltage controlled by the relevant polarity bit.

The signal descriptions for this preferred driver are given in the following Table 4:

TABLE 4

| Symbol | Pin Name | Description |
| --- | --- | --- |
| VDD | Logic power supply | 2.7-3.6 V |
| AVDD | Driver power supply | 10-30 V |
| VSS | Ground | 0 V |
| Y1-Y324 | Driver outputs, fed to the column electrodes of the display | D/A converted 64 level analog outputs |
| D0(0:5) | Display data input, odd dots | 6 bit gray scale data for odd dots, D0:0 = least significant bit (LSB) |
| D1(0:5) | Display data input, even dots | 6 bit gray scale data for even dots, D1:0 = LSB |
| D0POL | Odd dot polarity control input | Determines which set of gamma voltages current odd dot will reference. D0POL = 1: odd dot will reference VGAM6-11 D0POL = 0: odd dot will reference VGAM1-6 |
| D1POL | Even dot polarity control input | Determines which set of gamma voltages current even dot will reference. D1POL = 1: odd dot will reference VGAM6-11 D1POL = 0: odd dot will reference VGAM1-6 |
| SHL | Shift direction control input | Controls shift direction in 162 bit shift register SHL = H: DIO1 input, Y1->Y324 SHL = L: DIO1 output, Y324->Y1 |
| DIO1 | Start pulse input/output | SHL = H: Used as the start pulse input pin SHL = L: Used as the start pulse output pin |
| DIO2 | Start pulse input/output for 256 lines | SHL = H: Used as the start pulse output pin for 256 lines active SHL = L: Used as the start pulse input pin for 256 lines, tie low if not used |
| DIO3 | Start pulse input/output for 260 lines | SHL = H: Used as the start pulse output pin for 260 lines active SHL = L: Used as the start pulse input pin for 260 lines, tie low if not used |
| DIO4 | Start pulse input/output for 300 lines | SHL = H: Used as the start pulse output pin for 300 lines active SHL = L: Used as the start pulse input pin for 300 lines, tie low if not used |
| DIO5 | Start pulse input/output for 304 lines | SHL = H: Used as the start pulse output pin for 304 lines active SHL = L: Used as the start pulse input pin for 304 lines, tie low if not used |
| DIO6 | Start pulse input/output for 320 lines | SHL = H: Used as the start pulse output pin for 320 lines active SHL = L: Used as the start pulse input pin for 320 lines, tie low if not used |
| DIO7 | Start pulse input/output for 324 lines | SHL = H: Used as the start pulse output pin for 324 lines active SHL = L: Used as the start pulse input pin for 324 lines, tie low if not used |
| CLK1 | Shift clock input | Two 6 bit gray values and two polarity control values for two display dots are loaded at every rising edge |

TABLE 4-continued

| Symbol | Pin Name | Description |
| --- | --- | --- |
| CLK2 | Latch input | Latches the contents of the data register on a rising edge and transfers latched values to the D/A converter block. |
| BL | Blanking input (this does not actually blank the bistable display, but simply stops the driver writing to the display, thus allowing the image already written to remain) | Sets all outputs to VGAM6 level BL = H: All outputs set to VGAM6 BL = L: All outputs reflect D/A values |
| VGAM1-6 | Lower gamma reference voltages | Determine grayscale voltage outputs through resistive DAC system |
| VGAM6-11 | Upper gamma reference voltages | Determine grayscale voltage outputs through resistive DAC system |

The driver 200 operates in the following manner. First, a start pulse is provided by setting (say) DIO1 high to reset the shift register 202 to a starting location. (As will readily be apparent to those skilled in display driver technology, the various DIOx inputs to the shift register are provided to enable the driver to be used with displays having varying numbers of columns, and only one of these inputs is used with any given display, the others being tied permanently low.) The shift register now operates in the conventional manner used in LCD's; at each pulse of CLK1, one and only one of the 162 outputs of the shift register 202 goes high, the others being held low, and the high output being shifted one place at each pulse of CLK1. As schematically indicated in FIG. 7, each of the 162 outputs of the shift register 202 is connected to two inputs of data register 204, one odd input and one even input.

The display controller (cf. FIG. 2) provides two six-bit impulse values D0(0:5) and D1(0:5) and two single-bit polarity signals D0POL and D1POL on the inputs of the data register 204. At the rising edge of each clock pulse CLK1, two seven-bit numbers (D0POL+D0(0:5) and D1POL+D1(0:5)) are written into registers in data register 204 associated with the selected (high) output of shift register 202. Thus, after 162 clock pulses CLK1, 324 seven-bit numbers (corresponding to the impulse values for one complete line of the display for one frame) have been written into the 324 registers present in data register 204.

At the rising edge of each clock pulse CLK2, these 324 seven-bit numbers are transferred from the data register 204 to the data latch 206. The numbers thus placed in the data latch 206 are read by the DAC 208 and, in conventional fashion, corresponding analogue values are placed on the outputs of the DAC 208 and fed, via the buffer 210 to the column electrodes of the display, where they are applied to pixel electrodes of one row selected in conventional fashion by a row driver (not shown). It should be noted, however, that the polarity of each column electrode with respect to Vcom is controlled by the polarity bit D0POL or D1POL written into the data latch 206 and thus these polarities do not alternate between adjacent column electrodes in the conventional manner used in LCD's.

Figure 8:
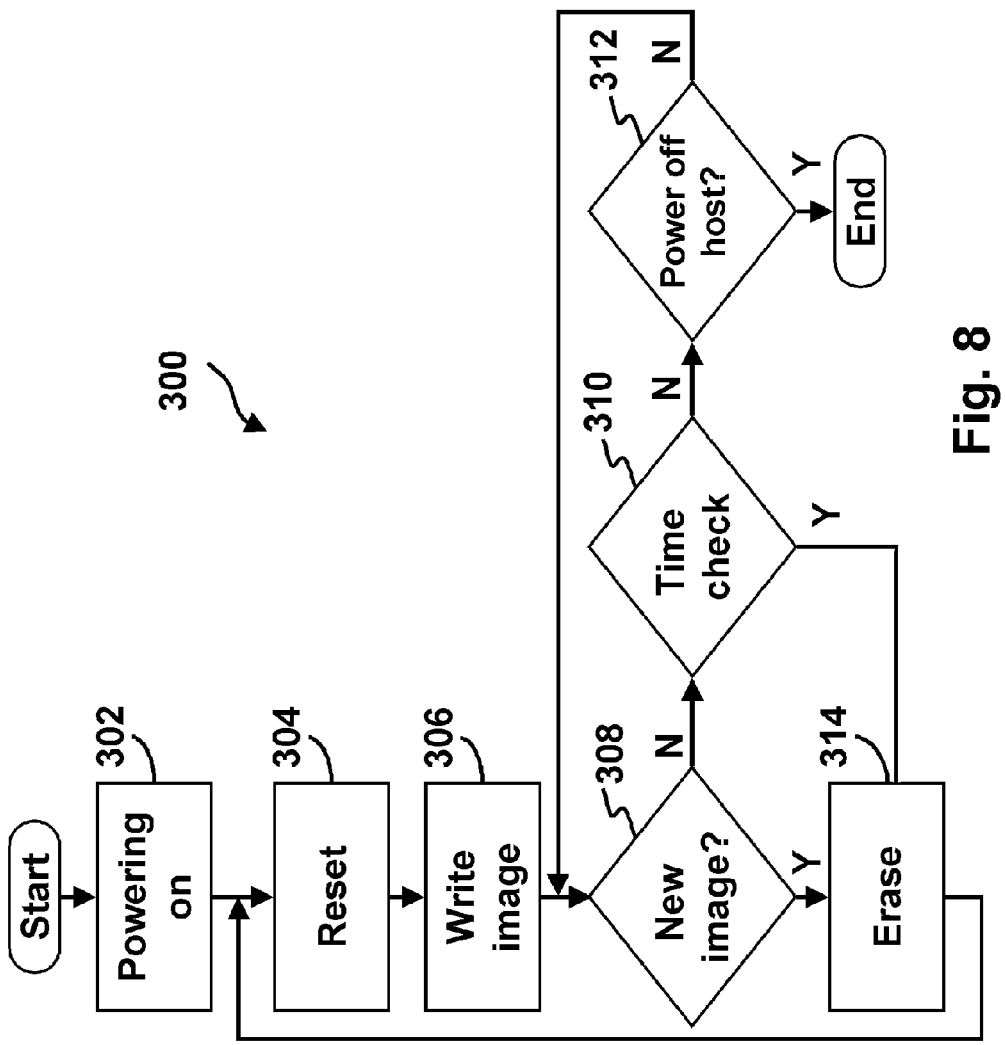
FIG. 8 is a flow chart illustrating a program which may be run by the controller unit shown in FIGS. 1 and 2.

FIG. 8 is a flow chart illustrating a program which may be run by the controller unit shown in FIGS. 1 and 2. This program (generally designated 300) is intended for use with a look-up table method (described in more detail below) in which all pixels of a display are erased and then re-addressed each time an image is written or refreshed.

The program begins with a "powering on" step 302 in which the controller is initialized, typically as a result of user input, for example a user pushing the power button of a personal digital assistant (PDA). The step 302 could also be triggered by, for example, the opening of the case of a PDA (this opening being detected either by a mechanical sensor or by a photodetector), by the removal of a stylus from its rest in a PDA, by detection of motion when a user lifts a PDA, or by a proximity detector which detects when a user's hand approaches a PDA.

The next step 304 is a "reset" step in which all the pixels of the display are driven alternately to their black and white states. It has been found that, in at least some electro-optic media, such "flashing" of the pixels is necessary to ensure accurate gray states during the subsequent writing of an image on the display. It has also been found that typically at least five flashes (counting each successive black and white state as one flash) are required, and in some cases more. The greater the number of flashes, the more time and energy that this step consumes, and thus the longer the time that must elapse before the user can see a desired image upon the display. Accordingly, it is desirable that the number of flashes be kept as small as possible consistent with accurate rendering of gray states in the image subsequently written. At the conclusion the reset step 304, all the pixels of the display are in the same black or white state.

The next step 306 is a writing or "sending out image" step in which the controller 16 sends out signals to the row and column drivers 22 and 24 respectively (FIGS. 1 and 2) in the manner already described, thus writing a desired image on the display. Since the display is bistable, once the image has been written, it does not need to be rewritten immediately, and thus after writing the image, the controller can cause the row and column drivers to cease writing to the display, typically by setting a blanking signal (such as setting signal BL in FIG. 7 high).

The controller now enters a decision loop formed by steps 308, 310 and 312. In step 308, the controller 16 checks whether the computer 12 (FIG. 1) requires display of a new image. If so, the controller proceeds, in an erase step 314 to erase the image written to the display at step 306, thus essentially returning the display to the state reached at the end of reset step 304. From erase step 314, the controller returns to step 304, resets as previously described, and proceeds to write the new image.

If at step 308 no new image needs to be written to the display, the controller proceeds to a step 310, at which it determines when the image has remained on the display for more than a predetermined period. As is well known to those skilled in display technology, images written on bistable media do not persist indefinitely, and the images gradually fade (i.e., lose contrast). Furthermore, in some types of electro-optic medium, especially electrophoretic media, there is often a trade-off between writing speed of the medium and bistability, in that media which are bistable for hours or days have substantially longer writing times than media which are only bistable for seconds or minutes. Accordingly, although it is not necessary to rewrite the electro-optic medium continuously, as in the case of LCD's, to provide an image with good contrast, it may be desirable to refresh the image at intervals of (say) a few minutes. Thus, at step 310 the controller determines whether the time which has elapsed since the image was written at step 306 exceeds some predetermined refresh interval, and if so the controller proceeds to erase step 314 and then to reset step 304, resets the display as previously described, and proceeds to rewrite the same image to the display.

(The program shown in FIG. 8 may be modified to make use of both local and global rewriting. If so, step 310 may be modified to decide whether local or global rewriting is required. If, in this modified program, at step 310 the program determines that the predetermined time has not expired, no action is taken. If, however, the predetermined time has expired, step 310 does not immediately invoke erasure and rewriting of the image; instead step 310 simply sets a flag (in the normal computer sense of that term) indicating that the next image update should be effected globally rather than locally. The next time the program reaches step 306, the flag is checked; if the flag is set, the image is rewritten globally and then the flag is cleared, but if the flag is not set, only local rewriting of the image is effected.)

If at step 310 it is determined that the refresh interval has not been exceeded, the controller proceeds to a step 312, where it determines whether it is time to shut down the display and/or the image source. In order to conserve energy in a portable apparatus, the controller will not allow a single image to be refreshed indefinitely, and terminates the program shown in FIG. 8 after a prolonged period of inactivity. Accordingly, at step 310 the controller determines whether a predetermined "shut-down" period (greater than the refresh interval mentioned above) has elapsed since a new image (rather than a refresh of a previous image) was written to the display, and if so the program terminates, as indicated at 314. Step 314 may include powering down the image source. Naturally, the user still has access to a slowly-fading image on the display after such program termination. If the shut-down period has not been exceeded, the controller proceeds from step 312 back to step 308.

Some general considerations regarding waveforms to be used in the methods of the present invention will be discussed.

Waveforms for bistable displays that exhibit the aforementioned memory effect can be grouped into two major classes, namely compensated and uncompensated. In a compensated waveform, all of the pulses are precisely adjusted to account for any memory effect in the pixel. For example, a pixel undergoing a series of transitions through gray scale levels 1-3-4-2 might receive a slightly different impulse for the 4-2 transition than a pixel that undergoes a transition series 1-2-4-2. Such impulse compensation could occur by adjusting the pulse length, the voltage, or by otherwise changing the V(t) profile of the pulses. In an uncompensated waveform, no attempt is made to account for any prior state information (other than the initial state). In an uncompensated waveform, all pixels undergoing the 4-2 transition would receive precisely the same pulse. For an uncompensated waveform to work successfully, one of two criteria must be met. Either the electro-optic material must not exhibit a memory effect in its switching behavior, or each transition must effectively eliminate any memory effect on the pixel.

In general, uncompensated waveforms are best suited for use with systems capable of only coarse impulse resolution. Examples would be a display with tri-level drivers, or a display capable of only 2-3 bits of voltage modulation. A compensated waveform requires fine impulse adjustments, which are not possible with these systems. Obviously, while a coarse-impulse system is preferably restricted to uncompensated waveforms, a system with fine impulse adjustment can implement either type of waveform.

The simplest uncompensated waveform is 1-bit general image flow (1-bit GIF). In 1-bit GIF, the display transitions smoothly from one pure black-and-white image to the next. The transition rule for this sequence can be stated simply: if a pixel is switching from white to black, then apply an impulse I. If it is switching from black to white, apply the impulse of the opposite polarity, −I. If a pixel remains in the same state, then no impulse is applied to that pixel. As previously stated, the mapping of the impulse polarity to the voltage polarity of the system will depend upon the response function of the material.

Another uncompensated waveform that is capable of producing grayscale images is the uncompensated n-prepulse slide show (n-PP SS). The uncompensated slide show waveform has three basic sections. First, the pixels are erased to a uniform optical state, typically either white or black. Next, the pixels are driven back and forth between two optical states, again typically white and black. Finally, the pixel is addressed to a new optical state, which may be one of several gray states. The final (or writing) pulse is referred to as the addressing pulse, and the other pulses (the first (or erasing) pulse and the intervening (or blanking) pulses) are collectively referred to as prepulses. A waveform of this type will be described below with reference to FIGS. 9 and 10.

Prepulse slide show waveforms can be divided into two basic forms, those with an odd number of prepulses, and those with an even number of prepulses. For the odd-prepulse case, the erasing pulse may be equal in impulse and opposite in polarity to the immediately previous writing pulse (again, see FIG. 9 and discussion thereof below). In other words, if the pixel is written to gray from black, the erasing pulse will take the pixel back to the black state. In the even-prepulse case, the erasing pulse should be of the same polarity as the previous writing pulse, and the sum of the impulses of the previous writing pulse and the erasing pulse should be equal to the impulse necessary to fully transition from black to white. In other words, if a pixel is written from black in the even-prepulse case, then it must be erased to white.

After the erasing pulse, the waveform includes either zero or an even number of blanking pulses. These blanking pulses are typically pulses of equal impulse and opposite polarity, arranged so that the first pulse is of opposite polarity to the erasing pulse. These pulses will generally be equal in impulse to a full black-white pulse, but this is not necessarily the case. It is also only necessary that pairs of pulses have equal and opposite impulses it is possible that there may be pairs of widely varying impulses chained together, i.e. +I, −I, +0.1I, −0.1I, +4I, −4I.

The last pulse to be applied is the writing pulse. The impulse of this pulse is chosen based only upon the desired optical state (not upon the current state, or any prior state). In general, but not necessarily, the pulse will increase or decrease monotonically with gray state value. Since this waveform is specifically designed for use with coarse impulse systems, the choice of the writing pulse will generally involve mapping a set of desired gray states onto a small number of possible impulse choices, e.g. 4 gray states onto 9 possible applied impulses.

Examination of either the even or odd form of the uncompensated n-prepulse slide show waveform will reveal that the writing pulse always begins from the same direction, i.e. either from black or from white. This is an important feature of this waveform. Since the principle of the uncompensated waveform is that the pulse length cannot be compensated accurately to ensure that pixels reach the same optical state, one cannot to expect to reach an identical optical state when approaching from opposite extreme optical states (black or white). Accordingly, there are two possible polarities for either of these forms, which can be labeled "from black" and "from white."

One major shortcoming of this type of waveform is that it has large-amplitude optical flashes between images. This can be improved by shifting the update sequence by one superframe time for half of the pixels, and interleaving the pixels at high resolution, as discussed below with reference to FIGS. 9 and 10. Possible patterns include every other row, every other column, or a checkerboard pattern. Note, this does not mean using the opposite polarity, i.e. "from black" versus "from white", since this would result in non-matching gray scales on neighboring pixels. Instead, this can be accomplished by delaying the start of the update by one "superframe" (a grouping of frames equivalent to the maximum length of a black-white update) for half of the pixels (i.e. the first set of pixels completes the erase pulse, then the second set of pixels begin the erase pulse as the first set of pixels begin the first blanking pulse). This will require the addition of one superframe for the total update time, to allow for this synchronization.

Limited Transitions Method of the Present Invention

Figure 9:
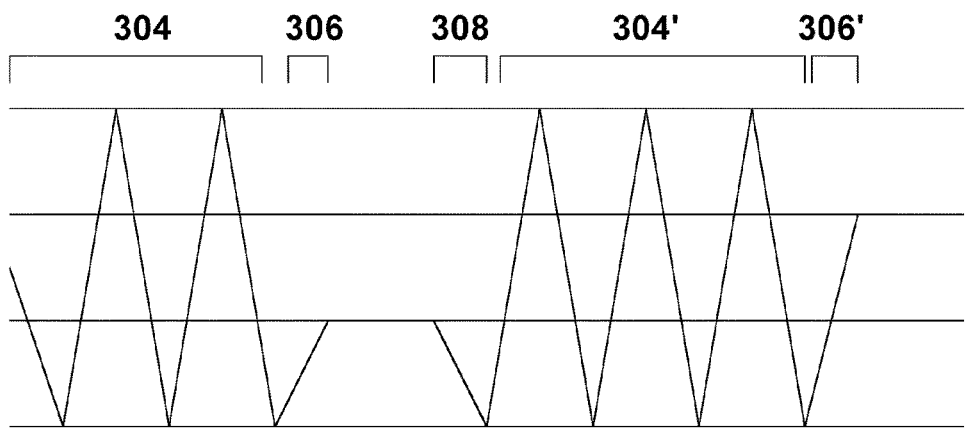
FIGS. 9 and 10 illustrate two drive schemes of the present invention.
Figure 10:
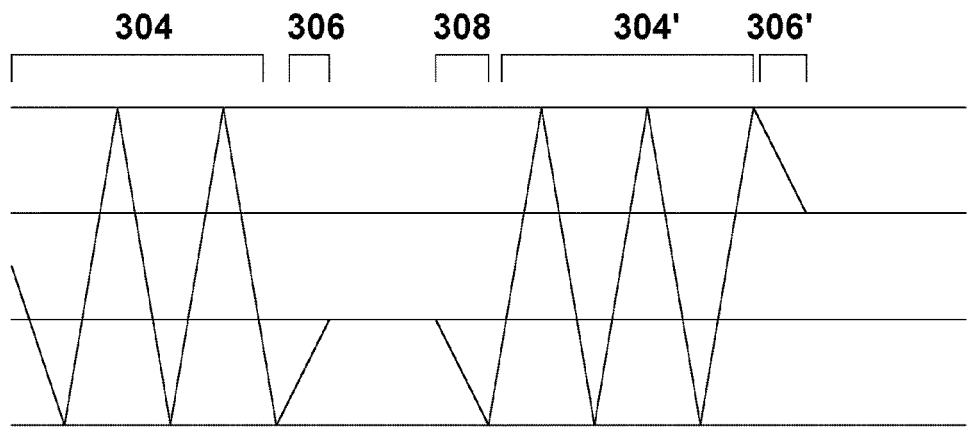

To avoid the aforementioned flashing problems of the drive schemes shown in FIGS. 9 and 10, while also avoiding the problems of general grayscale image flow previously discussed, it is advantageous, in accordance with the limited transitions method of the present invention, to arrange the drive scheme so that any given pixel can only undergo a predetermined maximum number (at least one) of gray scale transitions before passing through one extreme optical state (black or white). A transition away from the extreme optical state start from an accurately known optical state, in effect canceling out any previously accumulated errors. Various techniques for minimizing the optical effects of such passage of pixels through extreme optical states (such as flashing of the display) are discussed below.

Before describing the limited transitions method of the present invention in detail, other ways of reducing the flashing problem will first be described. A first, simple drive scheme will now be described with reference to a simple two-bit gray scale system having black (level 0), dark gray (level 1), light gray (level 2) and white (level 3) optical states, transitions being effected using a pulse width modulation technique, and a look-up table for transitions as set out in Table 5 below.

TABLE 5

| Transition | Impulse | Transition | Impulse |
|---|---|---|---|
| 0-0 | 0 | 0-0 | 0 |
| 0-1 | n | 1-0 | −n |
| 0-2 | 2n | 2-0 | −2n |
| 0-3 | 3n | 3-0 | −3n | where n is a number dependent upon the specific display, and −n indicates a pulse having the same length as a pulse n but of opposite polarity. It will further be assumed that at the end of the reset pulse 304 in FIG. 8 all the pixels of the display are black (level 0). Since, as described below, all transitions take place through an intervening black state, the only transitions effected are those to or from this black state. Thus, the size of the necessary look-up table is significantly reduced, and obviously the factor by which look-up table size is thus reduced increases with the number of gray levels of the display.

FIG. 9 shows the transitions of one pixel associated with the drive scheme of FIG. 8. At the beginning of the reset step 304, the pixel is in some arbitrary gray state. During the reset step 304, the pixel is driven alternately to three black states and two intervening white states, ending in its black state. The pixel is then, at 306, written with the appropriate gray level for a first image, assumed to be level 1. The pixel remains at this level for some time during which the same image is displayed; the length of this display period is greatly reduced in FIG. 9 for ease of illustration. At some point, a new image needs to be written, and at this point, the pixel is returned to black (level 0) in erase step 308, and is then subjected, in a second reset step designated 304', to six reset pulses, alternately white and black, so that at the end of this reset step 304', the pixel has returned to its black state. Finally, in a second writing step designated 306', the pixel is written with the appropriate gray level for a second image, assumed to be level 2.

Numerous variations of the drive scheme shown in FIG. 9 are of course possible. One useful variation is shown in FIG. 10. The steps 304, 306 and 308 shown in FIG. 10 are identical to those shown in FIG. 9. However, in step 304', five reset pulses are used (obviously a different odd number of pulses could also be used), so that at the end of step 304', the pixel is in its white state (level 3), and in the second writing step 306', writing of the pixel is effected from this white state rather than the black state as in FIG. 9. Successive images are then written alternately from black and white states of the pixel.

In a further variation of the drive schemes shown in FIGS. 9 and 10, erase step 308 is effected to as to drive the pixel white (level 3) rather than black. An even number of reset pulses are then applied to that the pixel ends the reset step in a white state, and the second image is written from this white state. As with the drive scheme shown in FIG. 10, in this scheme successive images are written alternately from black and white states of the pixel.

It will be appreciated that in all the foregoing schemes, the number and duration of the reset pulses can be varied depending upon the characteristics of the electro-optic medium used. Similarly, voltage modulation rather than pulse width modulation may be used to vary the impulse applied to the pixel.

The black and white flashes which appear on the display during the reset steps of the drive schemes described above are of course visible to the user and may be objectionable to many users. To lessen the visual effect of such reset steps, it is convenient to divide the pixels of the display into two (or more) groups and to apply different types of reset pulses to the different groups. More specifically, if it necessary to use reset pulses which drive any given pixel alternately black and white, it is convenient to divide the pixels into at least two groups and to arrange the drive scheme so that one group of pixels are driven white at the same time that another group are driven black. Provided the spatial distribution of the two groups is chosen carefully and the pixels are sufficiently small, the user will experience the reset step as an interval of gray on the display (with perhaps some slight flicker), and such a gray interval is typically less objectionable than a series of black and white flashes.

For example, in one form of such a "two group reset" step, the pixel in odd-numbered columns may be assigned to one "odd" group and the pixels in the even-numbered columns to the second "even" group. The odd pixels could then make use of the drive scheme shown in FIG. 9, while the even pixels could make use of a variant of this drive scheme in which, during the erase step, the pixels are driven to a white rather a black state. Both groups of pixels would then be subjected to an even number of reset pulses during reset step 304', so that the reset pulses for the two groups are essentially 180° out of phase, and the display appears gray throughout this reset step. Finally, during the writing of the second image at step 306', the odd pixels are driven from black to their final state, while the even pixels are driven from white to their final state. In order to ensure that every pixel is reset in the same manner over the long term (and thus that the manner of resetting does not introduce any artifacts on to the display), it is advantageous for the controller to switch the drive schemes between successive images, so that as a series of new images are written to the display, each pixel is written to its final state alternately from black and white states.

Obviously, a similar scheme can be used in which the pixels in odd-numbered rows form the first group and the pixels in even-numbered rows the second group. In a further similar drive scheme, the first group comprises pixels in odd-numbered columns and odd-numbered rows, and even-numbered columns and even-numbered rows, while the second group comprises in odd-numbered columns and even-numbered rows, and even-numbered columns and odd-numbered rows, so that the two groups are disposed in a checkerboard fashion.

Instead of or in addition to dividing the pixels into two groups and arranging for the reset pulses in one group to be 180° out of phase with those of the other group, the pixels may be divided into groups which use different reset steps differing in number and frequency of pulses. For example, one group could use the six pulse reset sequence shown in FIG. 9, while the second could use a similar sequence having twelve pulses of twice the frequency. In a more elaborate scheme, the pixels could be divided into four groups, with the first and second groups using the six pulse scheme but 180° out of phase with each other, while the third and fourth groups use the twelve pulse scheme but 180° out of phase with each other.

In accordance with the limited transitions method of the present invention, further reductions in flashing problems may be effected by using a drive scheme which permits any given to assume a non-zero but limited number of successive gray states before touching an optical rail. In such a drive scheme, when the display is rewritten to display a new image thereon, any pixel, which has undergone a number of transitions exceeding a predetermined value without touching an extreme optical state, is driven to at least one extreme optical state before driving that pixel to its final optical state. In a preferred form of such a drive scheme, a pixel driven to an extreme optical state is driven to the extreme optical state which is closer in gray level to the optical state desired after the transition, assuming of course that this desired optical state is not one of the extreme optical states. Also, in a preferred form of such a drive scheme using a look-up table as previously described, the maximum number of transitions which a pixel is allowed to undergo without touching an optical rail (extreme optical state) is set equal to the number of prior optical states taken into account in the transition matrix; such a method requires no extra controller logic or memory.

Driving methods which limit the maximum number of transitions before touching an optical rail need not significantly increase the time taken for a complete rewriting of the display. For example, consider a four gray level (2 bit) display in which a transition from white to black or vice versa takes 200 msec, so that a general grayscale image flow drive scheme takes this time to completely rewrite the display. The only case where a transition needs to be modified in such a display is when a pixel is repeatedly toggled between the two central gray levels. If such a pixel is toggled between the two central gray levels for a number of transitions which exceeds the predetermined number, the limited transitions method of the present invention requires that the next toggling be effected via one optical rail (extreme optical state). It has been found that in such a case the transition to the optical rail takes about 70 msec, while the subsequent transition to the gray level takes about 130 msec, so that the total transition time is only about 200 msec. Thus, the present limited transitions method does not require any increase in transition time as compared with general grayscale image flow.

A limited transitions drive method which reduces the objectionable effects of reset steps will now be described with reference to FIGS. 11A and 11B. In this scheme, the pixels are again divided into two groups, with the first (even) group following the drive scheme shown in FIG. 11A and the second (odd) group following the drive scheme shown in FIG. 11B. Also in this scheme, all the gray levels intermediate black and white are divided into a first group of contiguous dark gray levels adjacent the black level, and a second group of contiguous light gray levels adjacent the white level, this division being the same for both groups of pixels. Desirably but not essentially, there are the same number of gray levels in these two groups; if there are an odd number of gray levels, the central level may be arbitrarily assigned to either group. For ease of illustration, FIGS. 11A and 11B show this drive scheme applied to an eight-level gray scale display, the levels being designated 0 (black) to 7 (white); gray levels 1, 2 and 3 are dark gray levels and gray levels 4, 5 and 6 are light gray levels.

Figure 11A:
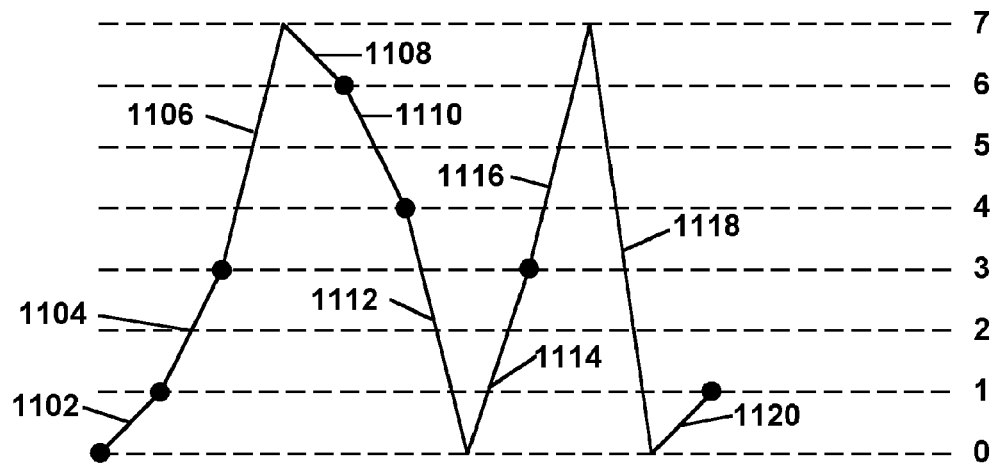
FIGS. 11A and 11B illustrate two parts of a further drive scheme of the present invention.
Figure 11B:
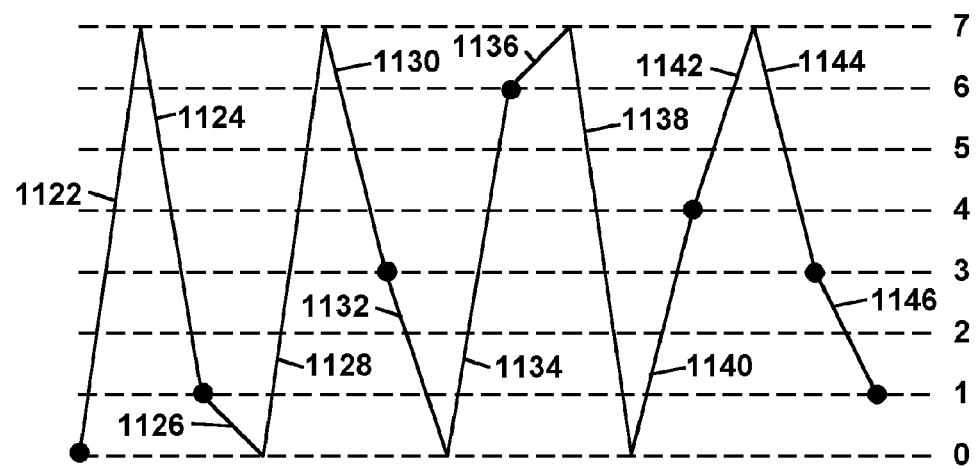

In the drive scheme of FIGS. 11A and 11B, gray to gray transitions are handled according to the following rules:

(a) in the first, even group of pixels, in a transition to a dark gray level, the last pulse applied is always a white-going pulse (i.e., a pulse having a polarity which tends to drive the pixel from its black state to its white state), whereas in a transition to a light gray level, the last pulse applied is always a black-going pulse;

(b) in the second, odd group of pixels, in a transition to a dark gray level, the last pulse applied is always a black-going pulse, whereas in a transition to a light gray level, the last pulse applied is always a white-going pulse;

(c) in all cases, a black-going pulse may only succeed a white-going pulse after a white state has been attained, and a white-going pulse may only succeed a black-going pulse after a black state has been attained; and (d) even pixels may not be driven from a dark gray level to black by a single black-going pulse nor odd pixels from a light gray level to white using a single white-going pulse.
(Obviously, in all cases, a white state can only be achieved using a final white-going pulse and a black state can only be achieved using a final black-going pulse.)

The application of these rules allows each gray to gray transition to be effected using a maximum of three successive pulses. For example, FIG. 11A shows an even pixel undergoing a transition from black (level 0) to gray level 1. This is achieved with a single white-going pulse (shown of course with a positive gradient in FIG. 11A) designated 1102. Next, the pixel is driven to gray level 3. Since gray level 3 is a dark gray level, according to rule (a) it must be reached by a white-going pulse, and the level 1/level 3 transition can thus be handled by a single white-going pulse 1104, which has an impulse different from that of pulse 1102.

The pixel is now driven to gray level 6. Since this is a light gray level, it must, by rule (a) be reached by a black-going pulse. Accordingly, application of rules (a) and (c) requires that this level 3/level 6 transition be effected by a two-pulse sequence, namely a first white-going pulse 1106, which drives the pixel white (level 7), followed by a second black-going pulse 1108, which drives the pixel from level 7 to the desired level 6.

The pixel is next driven to gray level 4. Since this is a light gray level, by an argument exactly similar to that employed for the level 1/level 3 transition discussed earlier, the level 6/level 4 transition is effected by a single black-going pulse 1110. The next transition is to level 3. Since this is a dark gray level, by an argument exactly similar to that employed for the level 3/level 6 transition discussed earlier, the level 4/level 3 transition is handled by a two-pulse sequence, namely a first black-going pulse 1112, which drives the pixel black (level 0), followed by a second white-going pulse 1114, which drives the pixels from level 0 to the desired level 3.

The final transition shown in FIG. 11A is from level 3 to level 1. Since level 1 is a dark gray level, it must, according to rule (a) be approached by a white-going pulse. Accordingly, applying rules (a) and (c), the level 3/level 1 transition must be handled by a three-pulse sequence comprising a first white-going pulse 1116, which drives the pixel white (level 7), a second black-going pulse 1118, which drives the pixel black (level 0), and a third white-going pulse 1120, which drives the pixel from black to the desired level 1 state.

FIG. 11B shows an odd pixel effecting the same 0-1-3-6-4-3-1 sequence of gray states as the even pixel in FIG. 11A. It will be seen, however, that the pulse sequences employed are very different. Rule (b) requires that level 1, a dark gray level, be approached by a black-going pulse. Hence, the 0-1 transition is effected by a first white-going pulse 1122, which drives the pixel white (level 7), followed by a black-going pulse 1124, which drives the pixel from level 7 to the desired level 1. The 1-3 transition requires a three-pulse sequence, a first black-going pulse 1126, which drives the pixel black (level 0), a second white-going pulse 1128, which drives the pixel white (level 7), and a third black-going pulse 1130, which drives the pixel from level 7 to the desired level 3. The next transition is to level 6 is a light gray level, which according to rule (b) is approached by a white-going pulse, the level 3/level 6 transition is effected by a two-pulse sequence comprising a black-going pulse 1132, which drives the pixel black (level 0), and a white-going pulse 1134, which drives the pixel to the desired level 6. The level 6/level 4 transition is effected by a three-pulse sequence, namely a white-going pulse 1136, which drives the pixel white (level 7), a black-going pulse 1138, which drives the pixel black (level 0) and a white-going pulse 1140, which drives the pixel to the desired level 4. The level 4/level transition 3 transition is effected by a two-pulse sequence comprising a white-going pulse 1142, which drives the pixel white (level 7), followed by a black-going pulse 1144, which drives the pixel to the desired level 3. Finally, the level 3/level 1 transition is effected by a single black-going pulse 1146.

It will be seen from FIGS. 11A and 11B that this drive scheme ensures that each pixel follows a "sawtooth" pattern in which the pixel travels from black to white without change of direction (although obviously the pixel may rest at any intermediate gray level for a short or long period), and thereafter travels from white to black without change of direction. Thus, rules (c) and (d) above may be replaced by a single rule (e) as follows:

(e) once a pixel has been driven from one extreme optical state (i.e., white or black) towards the opposed extreme optical state by a pulse of one polarity, the pixel may not receive a pulse of the opposed polarity until it has reached the aforesaid opposed extreme optical state.

Thus, this drive scheme is a "rail-stabilized gray scale" or "RSGS" drive scheme. Such a RSGS drive scheme is a special case of a limited transitions drive scheme which ensures that a pixel can only undergo, at most, a number of transitions equal to N/2 (or more accurately (N−1)/2) transitions, where N is the total number of gray levels capable of being displayed, without requiring a transition to take place via an optical rail. Such a drive scheme prevents slight errors in individual transitions (caused, for example, by unavoidable minor fluctuations in voltages applied by drivers) accumulating indefinitely to the point where serious distortion of a gray scale image is apparent to an observer. Furthermore, this drive scheme is designed so that even and odd pixels always approach a given intermediate gray level from opposed directions, i.e., the final pulse of the sequence is white-going in one case and black-going in the other. If a substantial area of the display, containing substantially equal numbers of even and odd pixels, is being written to a single gray level, this "opposed directions" feature minimizes flashing of the area.

For reasons similar to those discussed above relating to other drive schemes which divide pixels into two discrete groups, when implementing the sawtooth drive scheme of FIGS. 11A and 11B, careful attention should be paid to the arrangements of the pixels in the even and odd groups. This arrangement will desirably ensure that any substantially contiguous area of the display will contain a substantially equal number of odd and even pixels, and that the maximum size of a contiguous block of pixels of the same group is sufficiently small not to be readily discernable by an average observer. As already discussed, arranging the two groups of pixels in a checkerboard pattern meets these requirements. Stochastic screening techniques may also be employed to arrange the pixels of the two groups.

However, in this sawtooth drive scheme, use of a checkerboard pattern tends to increase the energy consumption of the display. In any given column of such a pattern, adjacent pixels will belong to opposite groups, and in a contiguous area of substantial size in which all pixels are undergoing the same gray level transition (a not uncommon situation), the adjacent pixels will tend to require impulses of opposite polarity at any given time. Applying impulses of opposite polarity to consecutive pixels in any column requires discharging and recharging the column (source) electrodes of the display as each new line is written. It is well known to those skilled in driving active matrix displays that discharging and recharging column electrodes is a major factor in the energy consumption of a display. Hence, a checkerboard arrangement tends to increase the energy consumption of the display.

A reasonable compromise between energy consumption and the desire to avoid large contiguous areas of pixels of the same group is to have pixels of each group assigned to rectangles, the pixels of which all lie in the same column but extend for several pixels along that column. With such an arrangement, when rewriting areas having the same gray level, discharging and recharging of the column electrodes will only be necessary when shifting from one rectangle to the next. Desirably, the rectangles are 1×4 pixels, and are arranged so that rectangles in adjacent columns do not end on the same row, i.e., the rectangles in adjacent columns should have differing "phases". The assignment of rectangles in columns to phases may be effected either randomly or in a cyclic manner.

One advantage of the sawtooth drive scheme shown in FIGS. 11A and 11B is that any areas of the image which are monochrome are simply updated with a single pulse, either black to white or white to black, as part of the overall updating of the display. The maximum time taken for rewriting such monochrome areas is only one-half of the maximum time for rewriting areas which require gray to gray transitions, and this feature can be used to advantage for rapid updating of image features such as characters input by a user, drop-down menus etc. The controller can check whether an image update requires any gray to gray transitions; if not, the areas of the image which need rewriting can be rewritten using the rapid monochrome update mode. Thus, a user can have fast updating of input characters, drop-down menus and other user-interaction features of the display seamlessly superimposed upon a slower updating of a general grayscale image.

Figure 43A:
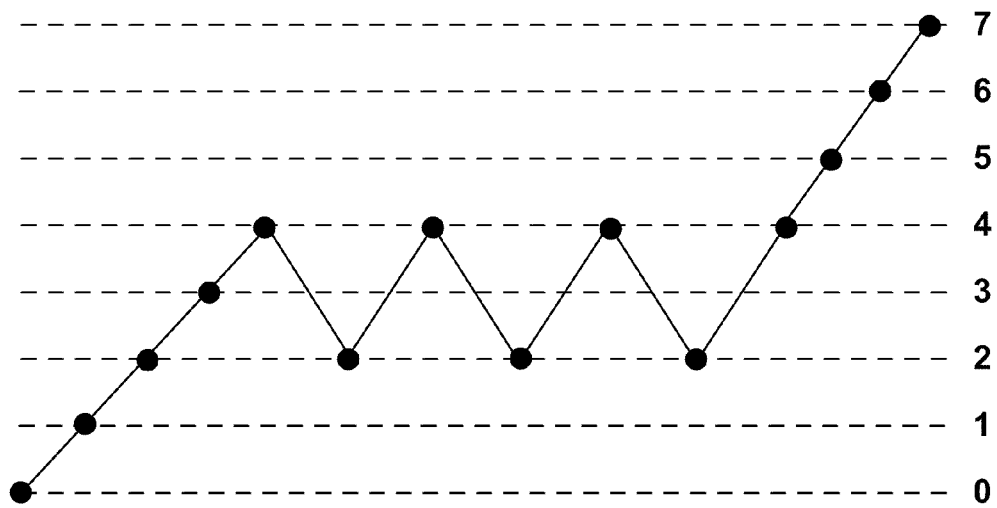
FIGS. 43A and 43B illustrate respectively transitions occurring during a prior art drive scheme and a limited transitions method of the present invention.
Figure 43B:
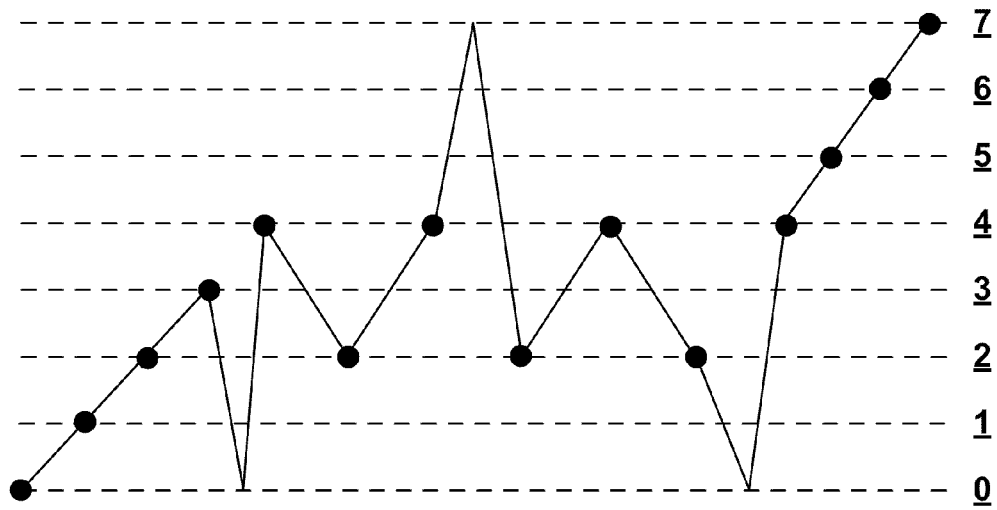

FIGS. 43A and 43B illustrate respectively transitions occurring during a prior art drive scheme and a limited transitions method of the present invention, the latter being more general than that shown in FIGS. 11A and 11B. As in FIGS. 11A and 11B, FIGS. 43A and 43B illustrate transitions occurring among 8 gray levels denoted 0 (black) to 7 (white). The prior art method shown in FIG. 43A allows an unlimited number of transitions without touching an extreme optical state. FIG. 43A illustrates a series of transitions 0-1-2-3-4-2-4-2-4-2-4-5-6-7. In the prior art method, extreme optical states 0 and 7 are achieved only at the beginning and end of the series; the intervening twelve transitions are achieved without touching an extreme optical state.

FIG. 43B illustrates how the series of transitions shown in FIG. 43A is modified using a limited transitions method of the present invention which permits only three successive transitions without touching an extreme optical state. As shown in FIG. 43B, the actual transitions effected are:

0-1-2-3-[0]-4-2-4-[7]-2-4-2-[0]-4-5-6-7 where numbers within brackets indicate an intermediate extreme optical state inserted to limit the maximum number of transitions without touching an extreme optical state to three.

A limited transitions drive scheme does not necessarily require the use of counters to measure the number of transitions undergone by each pixel of a display, and does not bar the use of drive schemes (such as the cyclic RSGS drive scheme already described with reference to FIGS. 11A and 11B) which require certain transitions to take place via an optical rail even if the predetermined number of transitions has not been reached, provided that the algorithm used to determine the manner of effecting transitions does not permit any pixel to undergo more than the predetermined number of transitions without touching an optical rail. Furthermore, it will be appreciated that the check on the number of transitions undergone by a given pixel without touching an optical rail need not be made at every rewriting of the image on the display, especially in the case of displays (for example in watches) which are updated at frequent intervals. For example, the check might be made on only alternate updates, provided that all pixels which either exceeded with predetermined number of transitions or might exceed this number after the next update were driven to optical rails.

Another preferred limited transitions method of the invention will now be described, though by way of illustration only. This preferred method is used to operate a four gray level (2 bit) active matrix display which uses a transition matrix which takes account of only the initial and final gray levels (designated "R2" and "R1" respectively) of the transition to be effected, and no additional prior states. The display controller is a tri-level pulse width modulation (PWM) controller capable of applying −V, 0 or +V to each pixel electrode relative to the common front electrode, which is held at 0.

The display controller contains two RAM image buffers. One buffer ("A") stores the image currently on the display. Normally, the controller is in sleep mode, preserving the data in the RAM and keeping the display drivers inactive. The bistability of the electro-optic medium keeps the same image on the display. When an image update command is received, the controller loads the new image into the second buffer ("B"). Then, for each pixel of the display, the controller looks up (in FLASH memory) a multi-frame drive waveform, based on the desired final state R1 of the pixel (from buffer "B") and the current, initial state R2 of each pixel (from buffer "A").

The data in the flash memory file is organized as a three-dimensional array of voltage values, V(R1, R2, frame), where as already indicated R1 and R2 are each integers from 1 to 4 (corresponding to the four available gray levels), and "frame" is the frame number, i.e., the number of the relevant frame within the superframe used for each transition. Typically, the superframe might be 1 second long, with each frame occupying 20 ms, so that the frame number can range from 1 to 50. Thus, the array has 4×4×50=800 entries. Since each entry in the array must be capable of representing any one of the voltage values −V, 0 and +V, typically two bits will be used to store each voltage value (array value).

It will immediately be apparent that, since each of the 800 array entries may have any one of the three possible voltage values, there are a huge number of possible arrays (waveforms), the number being far too large to search exhaustively. In theory, there are $3^{800}$ or about $5 \times 10^{381}$ possible arrays; since there are about $10^{78}$ atoms in the universe and $10^{9}$ seconds in an average human lifetime, practical capabilities are at least 200 orders of magnitude short of an exhaustive search. Fortunately, existing knowledge about the behavior of electro-optic displays, and especially the need for DC balance therein, impose additional constraints upon the possible waveforms and enable the search for an optimum or near optimum waveform to be confined within practicable limits.

As discussed in the aforementioned U.S. Pat. Nos. 6,504,524 and 6,531,997 and the aforementioned 2003/0137521, it is known that most, if not all, electro-optic media require direct current (DC) balanced waveforms, or deleterious effects may occur. Such effects may include damage to electrodes and long term drift (over a period of hours) of gray states over a range of several L* units when DC imbalanced waveforms are used. Accordingly, it seems prudent to make every effort to use DC balanced drive wave schemes.

From what has been said above, it might at first appear that such DC balancing may not be achievable, since the impulse, and thus the current through the pixel, required for any particular gray to gray transition is substantially constant. However, this is only true to a first approximation, and it has been found empirically that, at least in the case of particle-based electrophoretic media (and the same appears to be true of other electro-optic media), the effect of (say) applying five spaced 50 msec pulses to a pixel is not the same as applying one 250 msec pulse of the same voltage. Accordingly, there is some flexibility in the current which is passed through a pixel to achieve a given transition, and this flexibility can be used to assist in achieving DC balance. For example, the look-up table can store multiple impulses for a given transition, together with a value for the total current provided by each of these impulses, and the controller can maintain, for each pixel, a register arranged to store the algebraic sum of the impulses applied to the pixel since some prior time (for example, since the pixel was last in a black state). When a specific pixel is to be driven from a white or gray state to a black state, the controller can examine the register associated with that pixel, determine the current required to DC balance the overall sequence of transitions from the previous black state to the forthcoming black state, and choose that one of the multiple stored impulses for the white/gray to black transition needed which will either accurately reduce the associated register to zero, or at least to as small a remainder as possible (in which case the associated register will retain the value of this remainder and add it to the currents applied during later transitions). It will be apparent that repeated applications of this process can achieve accurate long term DC balancing of each pixel.

It is necessary to consider the precise definition of DC balance in a waveform. To determine if a waveform is DC balanced, a resistive model of the electro-optic medium is normally used. Such a model is not completely accurate, but may be assumed to be sufficiently accurate for present purposes. Using such a model, the characteristic that defines a DC balanced waveform is that the integral of the applied voltage with time (the applied impulse) is bounded. Note that the definition requires that be integral be "bounded" and not "zero." To illustrate this point, consider a monochrome addressing waveform which uses a 300 ms×−15V square pulse to drive the transition from white to black, and a 300 ms×15V square pulse to drive the transition from black to white. This waveform is clearly DC balanced, but the integral of applied voltage is not zero at every point in time; this integral varies between 0 and ±4.5 V-sec. However, this waveform DC is balanced in as much as the integral is bounded; the integral never reaches 9 or 18 V-sec, for example.

For further consideration of DC balanced waveforms, some definition of terms is advisable. The term "impulse" has already been defined as meaning the definite integral of voltage with respect to time (in V-sec) applied during a particular interval, usually an addressing pulse or pulse element. The term "impulse potential" will be used to mean the sum of all impulses applied to the display since an arbitrary starting point (typically the beginning of a series of transitions under consideration. At the starting point, the impulse potential is arbitrarily set to zero, and as impulses are applied the impulse potential rises and falls.

Using these terms, the definition of DC balance is that a waveform is DC balanced if and only if the impulse potential is bounded. Having a bounded impulse potential means that one must be able to say what the impulse potential will be in each of a finite number of possible cases.

For a time-independent controller (i.e., a controller in which the impulse of the waveform is influenced only by the initial and final states of the transition under consideration, and not dwell times, temperature, or other factors, such as the R1/R2 controller mentioned above), in order to show that a waveform is DC balanced, it is necessary to be able to prove that the impulse potential will be bounded after each transition in any infinitely long sequence of optical states. One sufficient condition for such proof is that the impulse potential can be expressed as a function of a fixed number of prior states, and this provides a working concept of DC balance for controllers for electro-optic displays, i.e., that the impulse potential can be expressed as a function of a finite number of prior and current optical states. Note that the impulse potential of any pixel of the display does not change from the end of one image update to the beginning of another image update, because no voltage is applied during this period.

For each combination of a (finite) number of prior states, the controller applies a fixed impulse (the impulse determined by the data in the flash memory already mentioned), and these fixed impulses can be listed. To list them, it is necessary to enumerate prior state combinations back by at least the number of prior states being used in the controller (i.e. for an R1/R2 controller, the number of prior states used in the enumeration needs to be defined for all combinations of prior states two back).

To define the impulse potential at the end of the update, knowing the fixed impulse applied during the impulse, one needs to be able to define the impulse potential at the beginning of the update for all states in the enumeration. This means that the net impulse applied by a waveform must be a function of one fewer prior state than the number needed to uniquely define the impulse potential at the end. To translate this to the problem of determining the optimum waveform to be applied by a controller, this means that the impulse potential for a waveform must be a function of one fewer prior states than the number of states used to determine the waveform. For example, if a controller has impulse data determined by three states, R1, R2, and R3 (where R3 is the gray level immediately prior to the initial gray level for the transition under consideration), each combination of R1 and R2 must leave the electro-optic medium at the same impulse potential, independent of R3.

In other words, the controller has to "know" the impulse potential of the electro-optic medium when it starts the transition being considered, so it can apply the right impulse to produce the proper value of impulse potential following the transition. If the impulse potential in the above example were allowed to vary based on all of R1, R2, and R3, then, in the next transition, there would be no way for the controller to "know" the starting impulse potential, since the R3 information previously used would have been discarded.

As already indicated, the limited transitions method of the present invention is preferably carried out using an R1/R2 controller (i.e., a controller in which the impulse applied during any transition depends only upon the initial and final gray levels of that transition), and from the foregoing discussion it will be seen that in such a controller the impulse potential must be uniquely defined as a function of R1 only.

Further complications in determining the optimum waveform arise from a phenomenon which may be called "impulse hysteresis". Except in rare situations of extreme overdrive at the optical rails, electro-optic media driven with voltage of one polarity always get blacker, and electro-optic medium driven with voltage of the opposite polarity always get whiter. However, for some electro-optic media, and in particular some encapsulated electro-optic media, the variation of optical state with impulse displays hysteresis; as the medium is driven further toward white, the optical change per applied impulse unit decreases, but if the polarity of the applied voltage is abruptly reversed so that the display is driven in the opposed direction, the optical change per impulse unit abruptly increases. In other words the magnitude of the optical change per impulse unit is strongly dependent not only upon the current optical state but also upon the direction of change of the optical state.

This impulse hysteresis produces an inherent "restoring force" tending to bring the electro-optic medium towards middle gray levels, and confounds efforts to drive the medium from state to state with unipolar pulses (as in general gray scale image flow) while still maintaining DC balance. As pulses are applied, the medium rides the three-dimensional R1/R2/impulse hysteresis surface until it reaches an equilibrium. This equilibrium is fixed for each pulse length and is generally in the center of the optical range. For example, it has been found empirically that driving one encapsulated four gray level electro-optic medium from black to dark gray required a 100 ms×−15 V unipolar impulse, but driving it back from dark gray to black required a 300 ms×15 V unipolar impulse. This waveform was not DC balanced, for obvious reasons.

A solution to the impulse hysteresis problem is to use a bipolar drive, that is to say to drive the electro-optic medium on a (potentially) non-direct path from one gray level to the next, first applying an impulse to drive the pixel into either optical rail as required to maintain DC balance and then applying a second impulse to reach the desired optical state. For example, in the above situation, one could go from black to dark gray by applying 100 ms×−15 V of impulse, but go back from dark gray to white by first applying additional negative voltage, then positive voltage, riding the R1/R2 impulse curve down to the black state. Such indirect transitions also avoid the problem of accumulation of errors by rail stabilization of gray scale, as already discussed.

The impulse hysteresis phenomenon and the prior state dependence of electro-optic media, as discussed above and in the aforementioned patents and applications, require that the waveform for each transition vary depending upon the prior state history of the pixel being considered. As described in the aforementioned 2003/0137521, the optimum waveform for each transition may be determined (i.e., the transition table corresponding to the aforementioned data array may be "tuned") by using an initial "guessed" transition matrix to create a waveform, which is used to address the electro-optic medium through a fixed, typically pseudo-random or prior-state-complete series of optical states. A program subtracts the actual optical state achieved in each prior state combination from the target gray states for the same combination to compute an error matrix, which is the same dimensions as the transition matrix. Each element in the error matrix corresponds to an element in the transition matrix. If an element in the transition matrix is too high, the corresponding element in the error matrix will be pushed higher. PID (proportional-integral-differential) control can then be used to drive the error matrix toward zero. There are cross-terms (each element in the transition matrix affects more than one element in the error matrix) but these effects are minor and tend to decrease as the magnitudes of the values in the error matrix decrease, as the tuning proceeds through multiple iterations. (Note that sometimes the I or D constants of the PID controller may be set to 0, yielding PI, PD, or P control.)

When this tuning process is completed, it is found that a certain number of prior optical states need to be in the transition matrix to achieve a certain gray level precision performance. For example, using this process with one specific encapsulated electro-optic medium yielded a waveform in which the controller recorded one more prior optical state than was in the transition matrix, and calculated the impulse in the first section of the waveform using arithmetic to ensure DC balance. In this waveform, the impulse potential was allowed to be different for each prior state combination covered by the transition matrix.

The correlation between the number of dimensions in the transition matrix ("TM dimension") and the maximum optical error for this waveform was found to be as set out in Table 6 below:

TABLE 6

| TM Dimension | Maximum Optical Error (L*) |
| --- | --- |
| 1 | 10.6 |
| 2 | 3.8 |
| 3 | 2.1 |
| 4 | 1.7 |

Since the limit of visual perception for the average observer is around 1 L* unit, the data in this table indicate that it is very useful to have more than one dimension in the transition matrix, with a two dimensional matrix being superior to a one dimensional, a three dimensional matrix being superior to a two dimensional, etc.

Having regard to all of the foregoing points, a preferred waveform was devised for the R1/R22 bit gray scale controller already mentioned. This waveform maintained fixed impulse potentials for each final optical state R1, but used a two dimensional transition matrix. It was rail stabilized, to reduce the accumulation of error, and was designed to have low divergence during toggling because it respected the impulse hysteresis curve.

In the notation used below, numbers represent impulse. Negative impulse was applied by applying −V (i.e. −15V) for a given time, and positive impulse was applied by applying +V for a given time (i.e., the waveform was pulse width modulated), so that the magnitude of the volt-time product equaled the magnitude of the impulse. Voltage modulation could alternatively be used.

In the preferred waveform, the following sequence of impulses was applied during each update, reading from left to right in time:

−TM(R1,R2) IP(R1)-IP(R2) TM(R1,R2)

where "IP(Rx)" represents the relevant value from an impulse potential matrix (in this case a vector) having one value for each gray level, and TM(R1,R2) represents the relevant value from a transition matrix having one value for each R1/R2 combination. TM(R1,R2) can of course be negative for certain values of R1 and R2. (As already noted, for convenience, impulse sequences of this type may hereinafter be abbreviated as "−x/ΔIP/x" sequences.)

The values in the transition matrix could be adjusted as desired, without worrying about DC balance, because the net impulse of the first and third sections of this waveform is always zero. The difference in impulse potential between the initial and final state is applied in the middle section of the waveform.

Empirically, it has been found that the final drive pulse almost always has more effect on the final gray level than the initial pulse, so the transition matrix for this waveform can be tuned with the same PID approach described above. The values set for the impulse potentials influence the update speed of the waveform for fixed final gray levels. For example, all the impulse potentials could be set to zero, but this results in a long update time, because the final drive pulse (third section) is always countered by an equally long initial pulse (first section). Thus, the final drive pulse, in this case, cannot be longer than half the total update time. By careful selection of impulse potentials, it is possible to use a much larger fraction of the total update time for the final pulse; for example, one can achieve final drive pulses occupying more than half, and as much as 80% of the total maximum update time.

Preferably, the lengths of the various pulses are selected by computer, using a gradient following optimization method, like PID control, finite difference combination evaluation, etc.

As noted in Paragraphs [0073] to [0077] of the aforementioned 2003/0137521 and above, transitions in electro-optic media are typically temperature sensitive, and it has been found that the uncompensated stability of gray levels versus temperature is increased when all of the transitions to a particular gray level always come from the same optical rail. The reason for this is straightforward; as the temperature varies, the switching speed of the electro-optic medium becomes gets faster or slower. Suppose that, in a 2 bit gray level display, the dark gray to light gray transition bounces off the black rail, but the white to light gray transition bounces off the white rail. If the switching speed of the medium becomes slower, the light gray state addressed from black will become darker, but the light gray state addressed from black will become lighter. Thus, it is important for a temperature stable waveform that a given gray level always be approached from the same "side", i.e., that the final pulse of the waveform always be of the same polarity. In the preferred drive scheme described above using the

−TM(R1,R2) IP(R1)-IP(R2) TM(R1,R2)

sequence, this requires choosing the TM(R1,R2) values so that the sign of each value is dependent only on R1, at least for some gray levels. One preferred approach is to allow the TM values to be of either sign for the black and white states, but positive only for light gray, and negative only for dark gray, and thus that the intermediate gray levels be approached only from the nearer optical rail.

This preferred waveform is fully compatible with techniques such as insertion of short pause periods into the waveform to increase impulse resolution, as described below.

As already indicated, the aforementioned −x/ΔIP/x pulse sequences may be modified to contain additional pulses. One such modification allows the inclusion of an additional class of pulses, hereinafter referred to as "y" pulses. "y" pulses are characterized by being of the form [+y][−y], where y is an impulse value, and may be either negative or positive (in other words, the form [−y][+y] is equally valid. The y pulse is distinct from the previously-described "x" pulses, in that the [−x] and [+x] halves of the "x" pulse pair are disposed before and after the ΔIP pulse, whereas the "y" pulses can be disposed at other locations within the pulse sequence.

A second such modification adds a 0 V "pulse" (i.e., a period when no voltage is applied to the relevant pixel) at an arbitrary point within the pulse sequence to improve the performance of that sequence, by, for example, shifting the gray level resulting from the transition up or down by a small amount, or reducing or changing the impact of prior state information on the final state of the pixel. Such 0 V sections may be inserted either between the different pulse elements, or in the middle of a single pulse element.

A preferred method for constructing a rail-stabilized waveform, using a transition table as described in the aforementioned 2003/0137521 is as follows:

(a) set the value (typically derived empirically) of the impulse potential for each gray level, and insert into the transition table the appropriate ΔIP pulse for each transition;

(b) for each transition, pick a value for x, and insert a −x pulse before, and a +x pulse after, the ΔIP pulse (as already noted, the value of x may be negative, so the −x and +x pulses can have either polarity);

(c) for each transition, pick a value for y, and insert a −y and +y pulses into the pulse sequence. The −y/+y pulse combination may be inserted into the sequence at any pulse boundary, for example before the −x pulse, before the ΔIP pulse, before the +x pulse, or after the +x pulse;

(d) for each transition, insert n frames, where n=0 or more, of 0 V at any point or points in the pulse sequence; and (e) repeat the above steps as many times as desired, until the waveform performance reaches the desired level.

Figure 12:
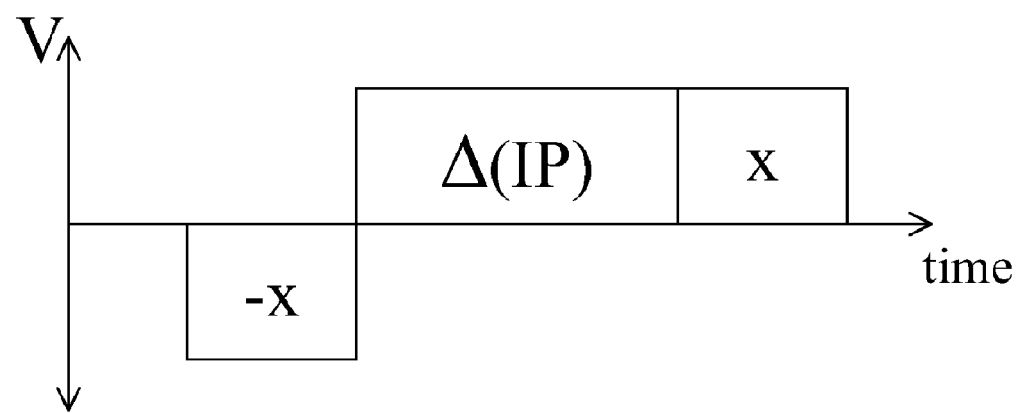
FIG. 12 illustrates the preferred −x/ΔIP/x sequence for use in the methods of the present invention.

This process will be illustrated with reference to the accompanying drawings. FIG. 12 shows the basic −x/ΔIP/+x structure of the waveform for one transition, it being assumed for the sake of illustration that the values of both x and ΔIP are positive. Unless it is desired to provide a 0 V interval between the ΔIP and +x pulses, it is not necessary to reduce the voltage applied at the junction between these two pulses, so that the ΔIP and +x pulses form, in effect, one long positive pulse.

Figure 13:
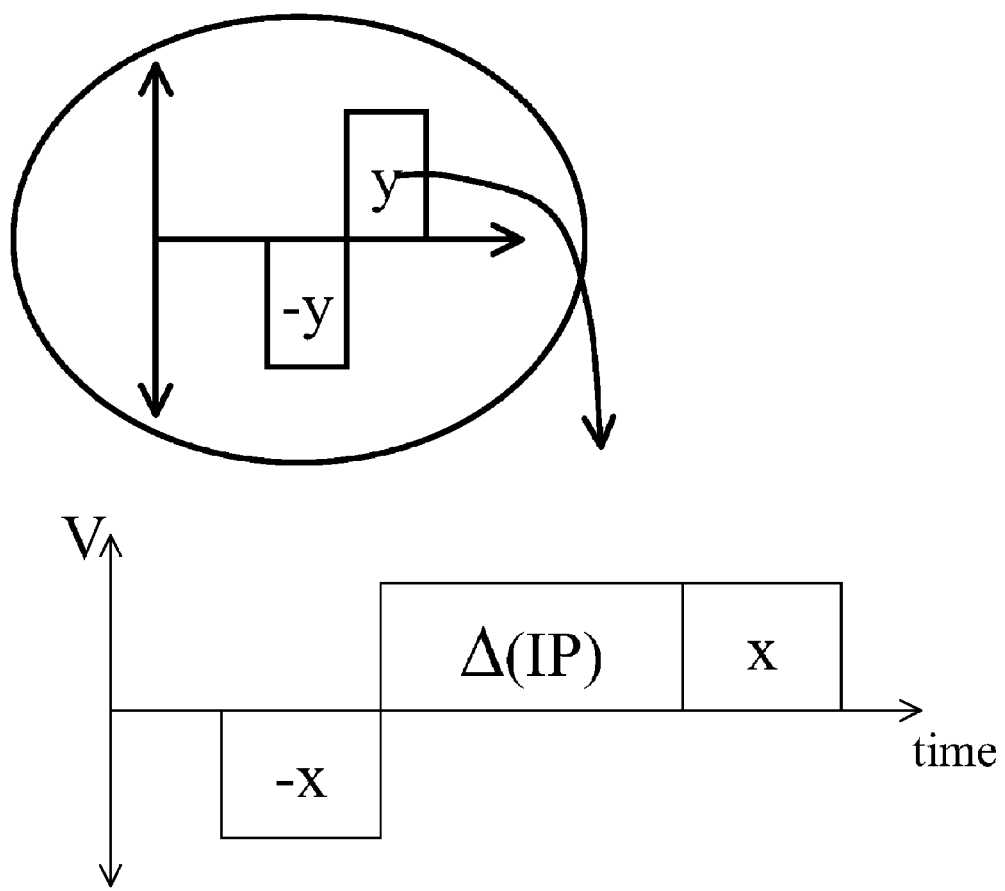
FIG. 13 illustrates schematically how the waveform shown in FIG. 12 may be modified to include an additional pair of drive pulses.

FIG. 13 illustrates symbolically the insertion of a [−y][+y] pair of pulses into the basic −x/ΔIP/+x waveform shown in FIG. 12. The −y and +y pulses do not have to be consecutive, but can be inserted at different places into the original waveform. There are two especially advantageous special cases.

Figure 14:
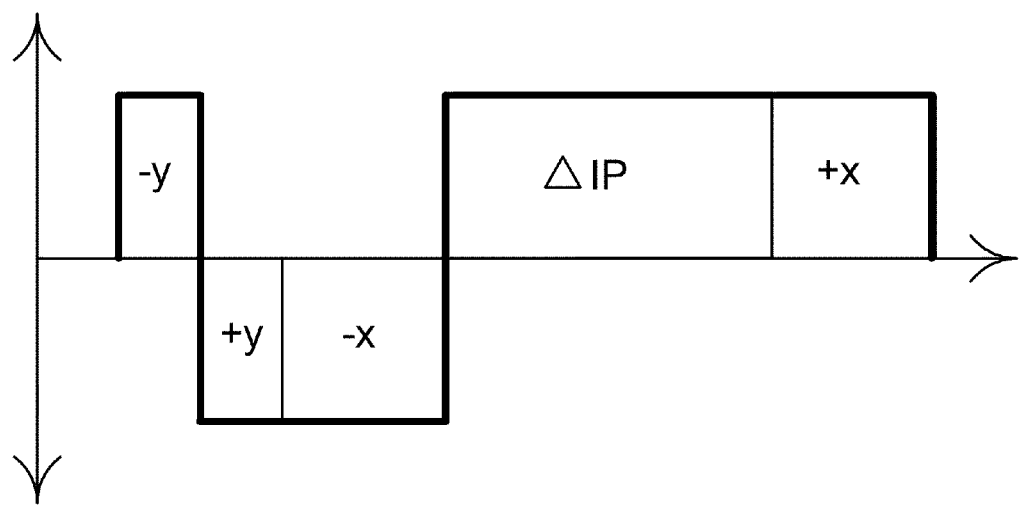
FIG. 14 illustrates one waveform produced by modifying the waveform of FIG. 12 in the manner illustrated in FIG. 13.

In the first special case, the "−y, +y" pulse pair is placed at the beginning of the −x/ΔIP/+x waveform, before the −x pulse, to produce the waveform shown in FIG. 14. It has been found that, when y and x are of opposite sign, as illustrated in FIG. 14, the final optical state can be finely tuned by even moderately coarse adjustment of the duration y. Thus, the value of x can be adjusted for coarse control and the value of y for final control of the final optical state of the electro-optic medium. This is believed to happen because the y pulse augments the −x pulse, thus changing the degree to which the electro-optic medium is pushed into one of its optical rails. The degree of pushing into one of the optical rails is known to give fine adjustment of the final optical state after a pulse away from that optical rail (in this case, provided by the x pulse).

Figure 15:
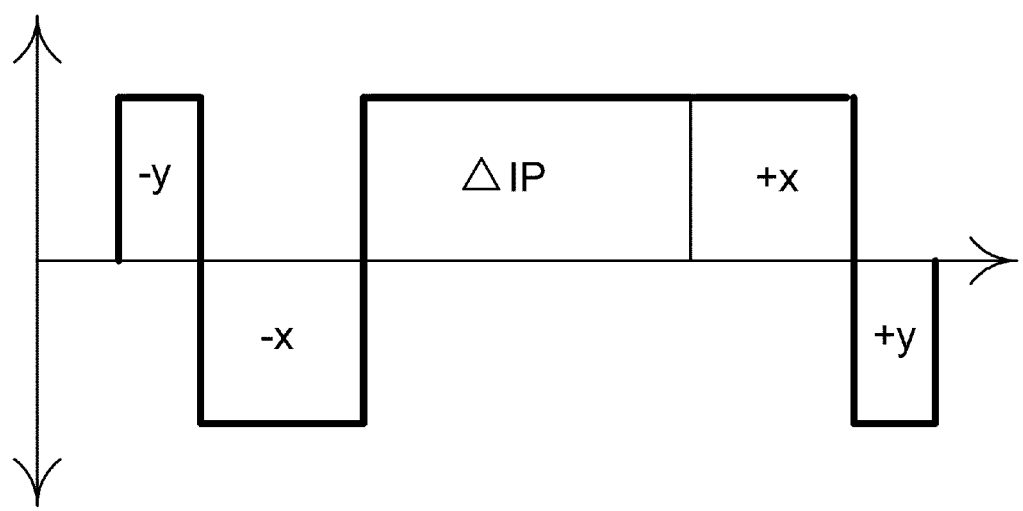
FIG. 15 illustrates a second waveform produced by modifying the waveform of FIG. 12 in the manner illustrated in FIG. 13.

In a second special case, illustrated in FIG. 15, the −y pulse is again placed at the beginning of the −x/ΔIP/+x waveform, before the −x pulse, but the +y pulse is placed at the end of the waveform, after the +x pulse. In this type of waveform, the final y pulse provides coarse tuning because the final optical state is very sensitive to the magnitude of y. The x pulse provides a finer tuning, since the final optical state typically does not depend as strongly on the magnitude of the drive into the optical rail.

Figure 16:
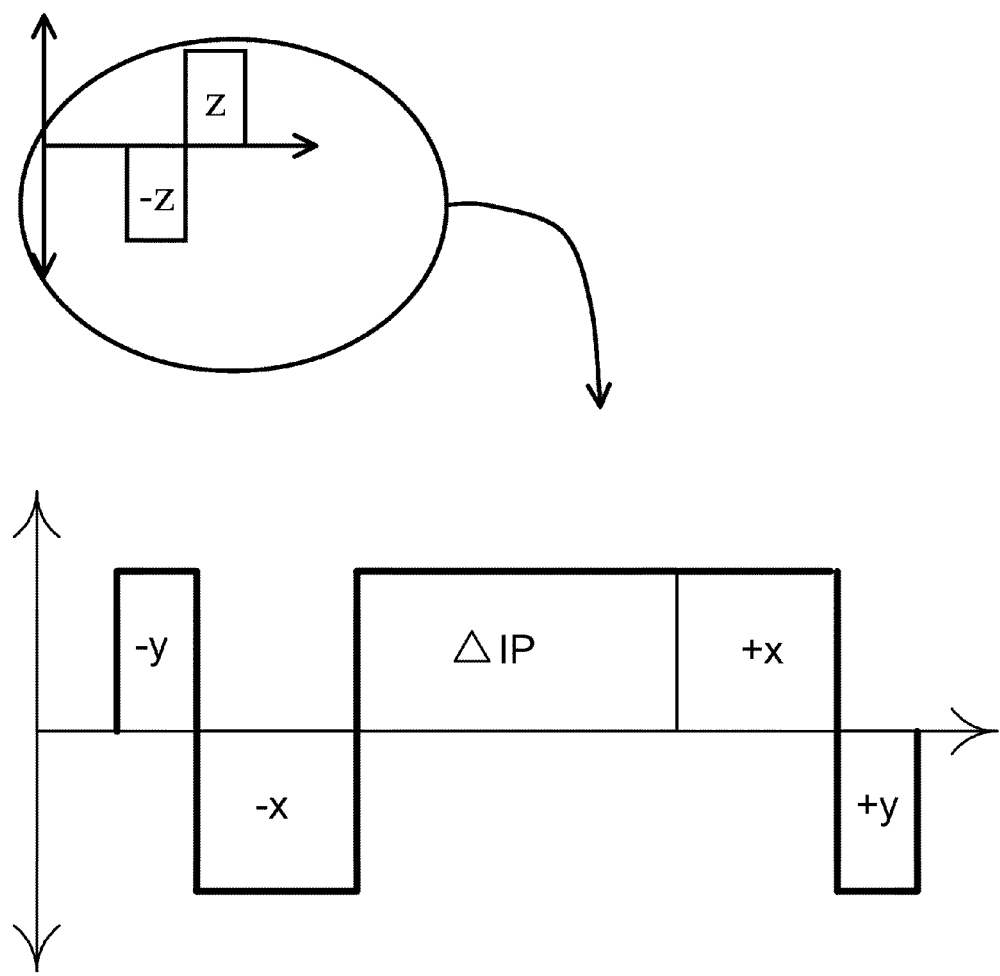
FIG. 16 illustrates schematically how the waveform shown in FIG. 15 may be further modified to include an additional pair of drive pulses.
Figure 17:
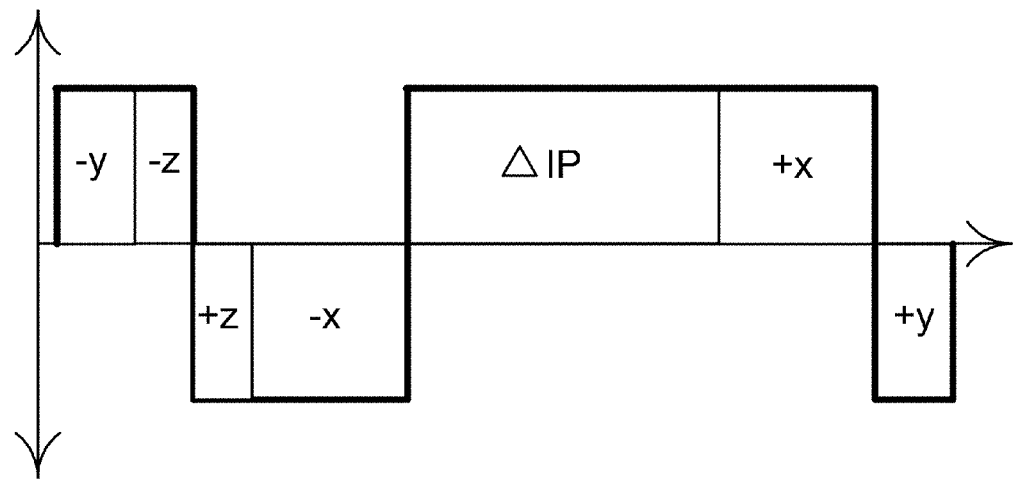
FIG. 17 illustrates one waveform produced by modifying the waveform of FIG. 15 in the manner illustrated in FIG. 16.

As already indicated, more than one pair of "y" pulses may be inserted into the basic −x/ΔIP/+x waveform to allow "fine tuning" of gray scale levels of the electro-optic medium, and the impulses of such multiple pairs of "y" pulses may differ from one another. FIG. 16 illustrates symbolically, in a manner similar to that of FIG. 13, the insertion of a second pair of y-type pulses (denoted "−z", "+z") into the waveform of FIG. 15. It will readily be apparent that since the −z and +z pulses can be introduced at any pulse boundary of the waveform shown in FIG. 15, a large number of different waveforms can result from the introduction of the −z and +z pulses. A preferred resulting waveform is shown in FIG. 17; this type of waveform is useful for fine tuning of the final optical state, for the following reasons. Consider the situation without the −z and +z pulses (i.e. the FIG. 15 waveform discussed above). The x pulse element is used for fine tuning, and the final optical state can be decreased by increasing x and increased by decreasing x. However, it is undesirable to decrease x beyond a certain point because then the electro-optic medium is not brought sufficiently close to an optical rail, as required for stability of the waveform. To avoid this problem, instead of decreasing x, one can (in effect) increase the −x pulse without changing the +x pulse by adding the −z, +z pulse pair as shown in FIG. 17, with z having the opposite sign from x. The +z pulse augments the −x pulse, while the −z pulse maintains the transition at the desired net impulse, thus maintaining an overall DC balanced transition table.

In the limited transitions waveform scheme of the present invention, it is acceptable for the "diagonal elements" (the transition table elements corresponding to null transitions in which the initial and final gray levels are the same, so called because in a normal matrix representation of a transition table such elements lie on the leading diagonal; such diagonal elements have ΔIP=0) to contain both x and y pulses. Any given transition table element may contain zero or more sets of x and/or y pulses.

The limited transitions method of the present invention may also make use of pause periods between adjacent frames of a transition; such pause periods are discussed in more detail below with reference to the interrupted scanning method of the present invention. Typically, in an active matrix display, the pixels are divided into a series of groups (normally a plurality of rows), each of these plurality of groups is selected in succession (i.e., typically the rows of the matrix are scanned) and there is applied to each of the pixels in the selected group either a drive voltage or a non-drive voltage. The scanning of all the groups of pixels is completed within a frame period. The scanning of the groups of pixels is repeated, and, in a typical electro-optic display, the scanning will be repeated more than once during the group of frames (conveniently referred to as a superframe) required for a complete rewriting of the display. Normally, a fixed scan rate is used for updating, for example 50 Hz, which allows for 20 msec frames. However, this frame length may provide insufficient resolution for optimal waveform performance. In many cases, frames of length t/2 are desirable, for example 10 msec frames in a normally 20 msec frame length waveform. It is possible to combine frames of differing delay times to generate a pulse resolution of n/2. To take one specific case a single frame of length 1.5*t may be inserted at the beginning of the waveform, and a similar frame at the end of the waveform (immediately before the terminating 0 V frame, which should occur at the ordinary frame rate and which is normally used at the end of the waveform to prevent undesirable effects caused by varying residual voltages on pixels). The two longer frames can be realized by simply adding a 0.5*t delay time between the scanning of two adjacent frames. The waveform would then have the structure:

t ms frame:t/2 ms delay:t ms frame [ . . . ] t ms frame:t/2 ms delay:t ms frame (all outputs to 0V)

For a normal frame length of 20 msec, the initial and final frames plus their respective delays would amount to 30 msec each.

Using this waveform, structure, the initial and final pulses are allowed to vary by 10 msec in length, by using the following algorithm:

(a) If the length of the initial pulse is evenly divisible by t, then the first frame consists of a 0 V drive, and a corresponding number of frames of t ms are activated to achieve the desired pulse length; or (b) If the length of the initial pulse leaves a remainder of t/2 when divided by t, then the first frame of 1.5*t is active, and a corresponding number of t msec frames following the initial frame are activated to achieve the desired pulse length.

The same algorithm is followed for the final pulse. Note that the initial and final pulses must be start- and end-justified, respectively, for this algorithm to work properly. In addition, in order to maintain DC balance, the initial and final pulses may be corresponding parts of α−x/+x pair.

Figure 20:
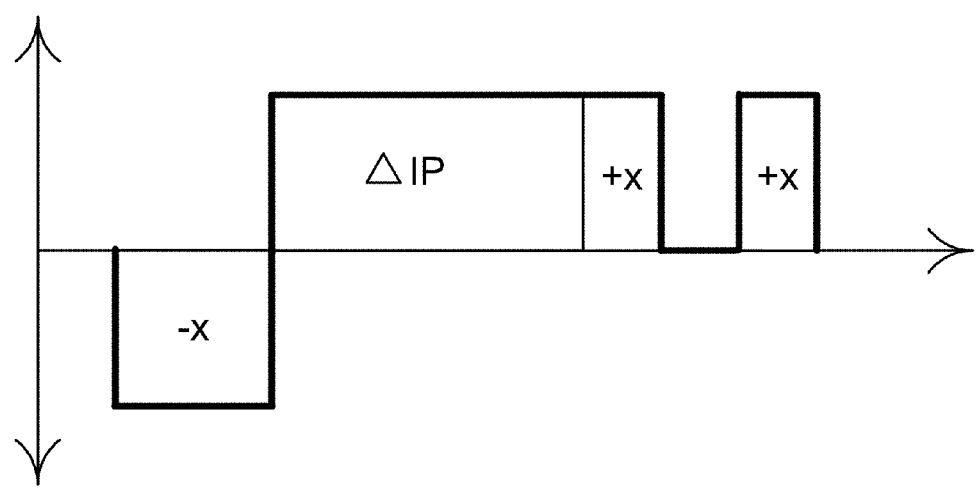
FIGS. 18-20 illustrate three modifications of the waveform shown in FIG. 12 to incorporate a period of zero voltage.
Figure 18:
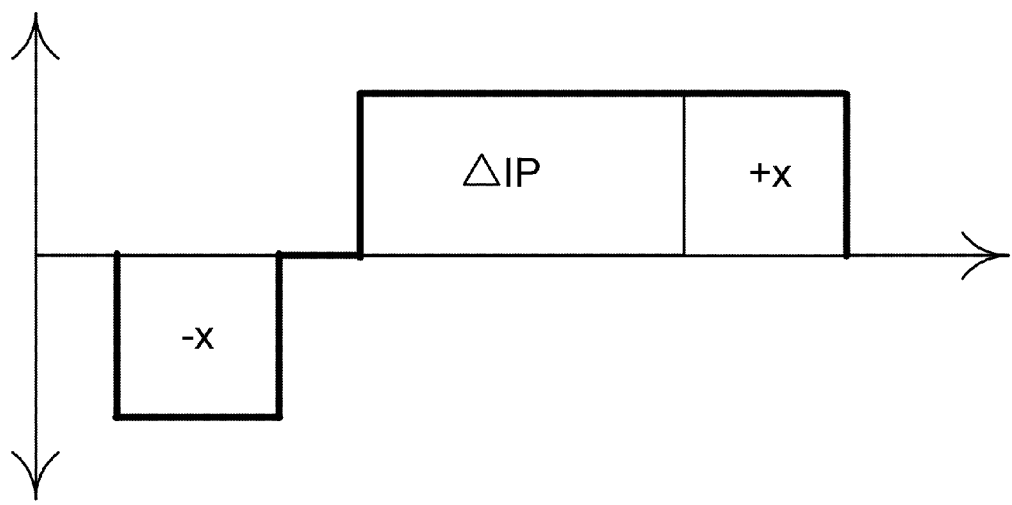
Figure 19:
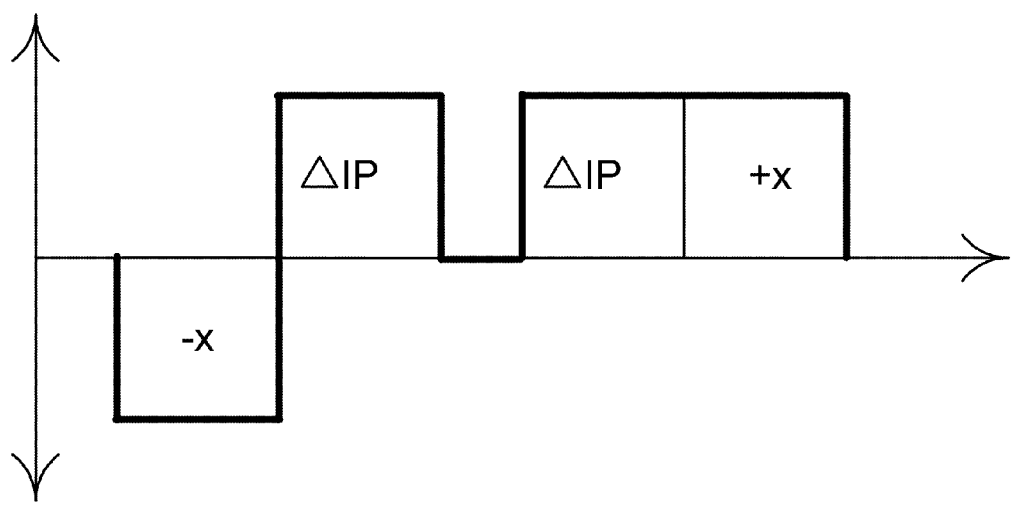
Figure 21A:
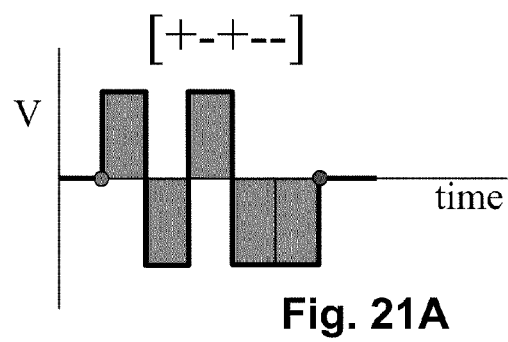
FIGS. 21A-21E show five non contiguous waveforms which can be used in the methods of the present invention.
Figure 21B:
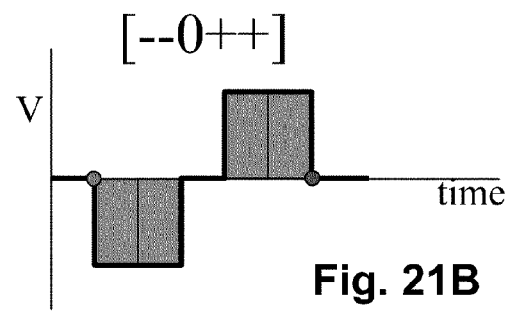
Figure 21C:
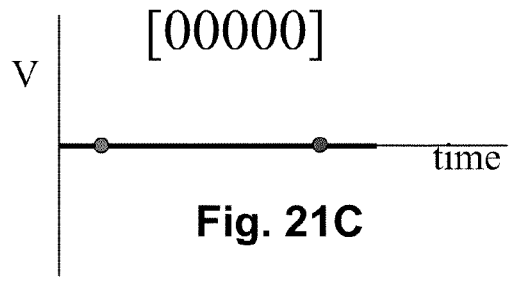
Figure 21D:
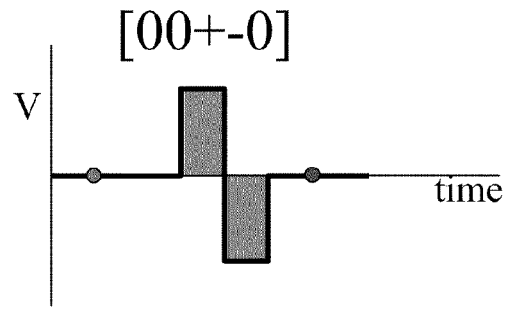
Figure 21E:
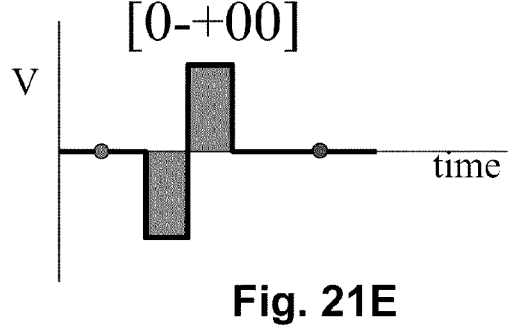

Whether or not pause periods are employed, it has been found that the effect of the waveform used to effect a transition is modified by the presence of a period of zero voltage (in effect a time delay) during or before any of the pulses in the waveform, and the limited transitions method of the present invention may include periods of zero voltage within or between successive pulses in the waveform, i.e., the waveform may be "non-contiguous" as that term is used above and in the aforementioned application Ser. No. 10/814,205. FIGS. 18 to 20 illustrate variations of the basic −x/ΔIP/+x waveform of FIG. 12 incorporating such zero voltage periods. In the waveform of FIG. 18, a time delay is inserted between the −x pulse and the ΔIP pulse. In the waveform of FIG. 19, a time delay is inserted within the ΔIP pulse, or, which amounts to the same thing, the ΔIP pulse is split into two separate pulses separated by the time delay. The waveform of FIG. 20 is similar to that of FIG. 19, except that the time delay is inserted within the +x pulse. Time delays can be incorporated into a waveform to achieve optical states not achievable without such delays. Time delays can also be used to fine-tune the final optical state. This fine-tuning ability is important, because in an active matrix drive, the time resolution of each pulse is defined by the scan rate of the display. The time resolution offered by the scan rate can be coarse enough that precise final optical states cannot be achieved without some additional means of fine tuning.

Interrupted Scanning Method of the Present Invention

As already mentioned, this invention provides an "interrupted scanning" method for driving an electro-optic display having a plurality of pixels divided into a plurality of groups. The method comprises selecting each of the plurality of groups of pixels in succession and applying to each of the pixels in the selected group either a drive voltage or a non-drive voltage, the scanning of all the groups of pixels being completed in a first frame period. The scanning of the groups of pixels is repeated during a second frame period (it being understood that any specific pixel may have the drive voltage applied during the first frame period and the non-drive voltage applied during the second frame period, or vice versa). In the interrupted scanning method invention, the scanning of the groups of pixels is interrupted during a pause period between the first and second frame periods, this pause period being not longer than the first or second frame period. In this method, the first and second frame periods are typically equal in length, and the length of the pause period is typically a sub-multiple (desirably, one half, one fourth etc.) of the length of one of the frame periods.

The interrupted scanning method may include multiple pause periods between different pairs of adjacent frame periods. Such multiple pause periods are preferably of substantially equal length, and the total length the multiple pause periods is preferably equal to either one complete frame period, or equal to one frame period less one pause period. For example, as discussed in more detail below, one embodiment of the first method might use multiple 20 ms frame periods, and either three or four 5 ms pause periods.

In this interrupted scanning method, the groups of pixels will of course typically be the rows of a conventional row/column active matrix pixel array. The interrupted scanning method comprises selecting each of the plurality of groups of pixels in succession (i.e., typically, scanning the rows of the matrix) and applying to each of the pixels in the selected group either a drive voltage or a non-drive voltage, the scanning of all the groups of pixels being completed in a first frame period. The scanning of the groups of pixels is repeated, and in a typical electro-optic display, the scanning will be repeated more than once during the superframe required for a complete rewriting of the display. The scanning of the groups of pixels is interrupted during a pause period between the first and second frame periods, this pause period being not longer than the first or second frame period.

Although a drive voltage is only applied to any specific pixel electrode for one line address time during each scan, the drive voltage persists on the pixel electrodes during the time between successive selections of the same line, only slowly decaying, so that the pixel continues to driven during the time when other lines of the matrix are being selected, and the interrupted scanning method relies upon this continued driving of the pixel during its "non-selected" time. Ignoring for the moment the slow decay of the voltage on the pixel electrode during its non-selected time, a pixel which is set to the driving voltage during the frame period immediately preceding the pause period will continue to experience the driving voltage during the pause period, so that for such a pixel the preceding frame period is in effect lengthened by the length of the pause period. On the other hand, a pixel which is set to the non-driving (typically zero) voltage during the frame period immediately preceding the pause period will continue to experience the zero voltage during the pause period. It may be desirable to adjust the length of the pause period to allow for the slow decay of the voltage on the pixel electrode in order to ensure that the total impulse delivered to the pixel during the pause period has the desired value.

To take a simple example of the interrupted scanning method for purposes of illustration, consider a simple pulse width modulated drive scheme having a superframe consisting of a plurality of (say 10) 20 ms frames. Typically, the last frame of the superframe will set all pixels to the non-driving voltage, since bistable electro-optic displays are normally only driven when the displayed image is to be changed, or at relatively long intervals when it is deemed desirable to refresh the displayed image, so that each superframe will typically be followed by a lengthy period in which the display is not driven, and it is highly desirable to set all pixels to the non-driving voltage at the end of the superframe in order to prevent rapid changes in some pixels during this lengthy non-driven period. To modify such a drive scheme in accordance with the interrupted scanning method of the present invention, a 10 ms pause period may be inserted between two successive 20 ms frames, and this simple modification halves the maximum possible difference between the applied impulse and the impulse ideally needed to complete a given transition, thereby in practice approximately halving the maximum deviation in achieved gray scale level. The 10 ms pause period is conveniently inserted after the penultimate frame in each superframe but may be inserted at other points in the superframe if desired.

In practice, it is desirable, in this example, not only to insert the 10 ms pause period but also to insert one additional 20 ms frame into each superframe. The unmodified drive scheme enables one to apply to any given pixel impulses of:

0, 20, 40, 60 . . . 160, 180 units where one impulse unit is defined as the impulse resulting from application of the driving voltage for 1 ms. Thus, the maximum difference between the available impulses and the ideal impulse for a given transition is 10 units. (Since the last frame of the superframe sets all pixels to the non-driving voltage, only the first nine frames of the superframe are available for application of the driving voltage.) As already explained, any pixel which is set to the driving voltage in the frame preceding the pause period continues to experience this driving voltage for a period equal to the frame period plus the pause period, and thus experiences an impulse of 30 units instead of 20 units for this frame. Accordingly, the modified drive scheme permits one to apply to any given pixel impulses of:

0, 20, 30, 40, 50, 60 units etc.

Insertion of the additional frame into the superframe is desirable to enable the modified drive scheme to deliver an impulse of exactly 180 units. Since any impulse which is an exact multiple of 20 units requires that the relevant pixel be set to the non-driving voltage during the frame preceding the pause period, achieving an impulse of exactly 180 units requires an 11-frame superframe, so that any pixel to receive the 180 impulse can be set to the driving voltage during 9 frames, to the non-driving voltage during the frame preceding the pause period, and (as always) to the non-driving voltage during the last frame of the superframe. Thus, when using the modified drive scheme, the maximum difference between the available impulses and the ideal impulse for a given transition is reduced to 5 units. (Although the modified drive scheme is not capable of applying an impulse of 10 units, in practice this is of little consequence. To produce reasonably consistent gray scale levels, the number of available impulse levels has to be substantially larger than the number of gray levels of the display, so that it is unlikely that any gray scale transition will require an impulse as small as 10 units.)

The pause periods can of course be of any number and length required to achieve the desired control over the impulse applied. For example, instead of modifying the aforementioned drive scheme to include one 10 ms pause period, the drive scheme could be modified to include three 5 ms pause periods after different 20 ms drive frames, desirably with the addition to the drive scheme of three further 20 ms drive frames not followed by pause periods. This modified drive scheme permits one to apply to any given pixel impulses of:

0, 20, 25, 30, 35 . . . 170, 175, 180 units thereby reducing the maximum difference between the available impulses and the ideal impulse for a given transition is reduced to 2.5 units, a four-fold reduction as compared with the original unmodified drive scheme.

The preceding discussion of the interrupted scanning method has ignored the question of polarity of the applied impulses. As discussed above and in the aforementioned 2003/0137521, bistable electro-optic media require application of impulses of both polarities. In some drive schemes, such as slide show drive schemes (cf. the discussion of FIGS. 9 and 10 above), before a new image is written to the display, all the pixels of the display are first driven to one extreme optical state, either black or white, and thereafter the pixels are driven to their final gray states by impulses of a single polarity. Such drive schemes can be modified in accordance with the interrupted scanning method in the manner already described. Other drive schemes require application of impulses of both polarities to drive the pixels to their final gray states. The impulses of the two polarities may be applied in separate frames (see, for example, Paragraphs [0128] to [0132] of the aforementioned 2003/0137521 and the discussion of Table 3 above) or, as discussed above, impulses of the two polarities may be applied in the same frames, for example using a tri-level drive scheme in which the common front electrode is held at a voltage of V/2, while individual pixel electrodes are held at 0, V/2 or V. When the impulses of the two polarities are applied in separate frames, the interrupted scanning method is desirably effected by providing at least two separate pause periods, one following a frame in which impulses of one polarity are applied and the second following a frame in which impulses of the opposed polarity are applied. However, when using a drive scheme in which impulses of both polarities are applied in the same frames, the interrupted scanning method may make use of only a single pause period since, as will be apparent from the foregoing discussion, the effect of including a pause period after a frame is to increase the magnitude of the impulse applied to any pixel to which a driving voltage was applied in the frame, regardless of the polarity of this driving voltage.

Also as discussed in the aforementioned 2003/0137521 and above, many bistable electro-optic media are desirably driven with drive schemes which achieve long term direct current (DC) balance, and such DC balance is conveniently effected using a drive scheme in which a DC balance section, which does not substantially change the gray level of the pixel, is applied before the main drive section, which does change the gray level, the two sections being chosen so that the algebraic sum of the impulses applied is zero or at least very small. If the main drive section is modified in accordance with the interrupted scanning method, it is highly desirable that the DC balance section be modified to prevent the additional impulses caused by the insertion of the pause periods accumulating to cause substantial DC imbalance. However, it is not necessary that the DC balance section be modified in a manner which is an exact mirror image of the modification of the main drive section, since the DC balance section can have gaps (zero voltage frames) and most electro-optic medium are not harmed by short term DC imbalances. Thus, in the drive scheme discussed above using a single 10 ms pause period inserted among ten 20 ms frames, DC balance can be achieved by making the first frame of the drive scheme 30 ms in duration. Applying or not applying a driving voltage to a pixel during this frame brings the overall impulse to a multiple of 20 units, so that this impulse can readily be balanced later. In the drive scheme using three 5 ms pause periods, the first two frames of the drive scheme can similarly be 25 and 30 ms in duration (in either order), again bringing the overall impulse to a multiple of 20 units.

From the foregoing description, it will be seen that the interrupted scanning method of the present invention requires a trade-off between increased addressing time caused by the need to include one additional frame in each superframe for each pause period inserted, and the improved control of impulse and hence gray scale produced by the method. However, the interrupted scanning method can provide very substantial improvement in impulse control with only modest increase in addressing time; for example, the drive scheme described above in which a superframe comprising ten 20 ms frames is modified to include three 5 ms pause periods yields a four-fold improvement in impulse accuracy at the cost of less than a 40 percent increase in addressing time.

Balanced Gray Level Method of the Present Invention

As already mentioned, this invention also provides a balanced gray level method for driving an electro-optic display having a plurality of pixels arranged in an array. The pixels are driven with a pulse width modulated waveform capable of applying a plurality of differing impulses. Drive circuitry stores data indicating whether application of a given impulse will produce a gray level higher or lower than a desired gray level. When two adjacent pixels are both required to be in the same gray level, the impulses applied to the two pixels are adjusted to that one pixel is below the desired gray level, while the other pixel is above the desired gray level.

In a preferred form of this method, the pixels are divided into two groups, hereinafter designated "even" and "odd". The two groups of pixels may be arranged in a checkerboard pattern (so that the pixels in each row and column alternate between the two groups) or in other arrangements as described above and in the aforementioned 2003/0137521, Paragraphs [0181] to [0183] and [0199] to [0202], provided that each pixel has at least one neighbor of the opposite group, and different drive schemes are used for the two groups. If the stored data indicates that one of the available impulses will produce substantially the desired gray level transition, this impulse is applied for that transition for both the even and odd pixels. However, if the stored data indicates that the impulse required for a particular gray level transition is substantially half-way between two of the available impulses, one of these impulses is used for the transition in even pixels and the other of these impulses is used for the transition in odd pixels. Thus, if two adjacent pixels are intended to be in the same gray state (the condition where precise control of gray scale is of maximum importance) one of these pixels will have a gray level slightly above the desired level, while the other will have a gray level slightly below the desired level. Ocular and optical averaging will result in an average of the two gray levels being seen, thus producing an apparent gray level closer to the desired level than can be achieved with the available impulses. In effect, this balanced gray level method uses small-signal spatial dithering (applied to correct errors in applied impulse) superimposed on large signal true gray scale to increase by a factor of two the available impulse levels. Since each pixel is still at approximately the correct gray scale level, the effective resolution of the display is not compromised.

A complete implementation of the necessary calculations, in MATHLAB pseudo-code is given below. The floor function rounds down to the nearest integer, and the mod function computes the remainder of its first argument divided by its second argument:

```
quotient= floor(desired_impuslse)
remainder = mod(desired_impulse,1)
if remainder <= 0.25
  even_parity_impulse = quotient
  odd_parity_impuslse = quotient
else if remainder <= 0.75
  even_parity_impulse = quotient + 1
  odd_parity_impulse = quotient
else
  even_parity_impulse = quotient + 1
  odd_parity_impulse = quotient + 1
end.
```

In some drive schemes previously described, for example the cyclic RSGS drive scheme described above with reference to FIGS. 11A and 11B, the pixels of the display are already divided into two groups and different drive schemes are applied to the two groups, so that the magnitude of the impulses needed to achieve the desired gray level will be different of the two groups. Such "two group" drive schemes can be modified in accordance with the balanced gray level method but the detailed implementation of the method differs somewhat from the simple case discussed above. Instead of simply comparing the available impulses with that required for the desired transition, one calculates the errors in gray scale for the two groups separately, takes the arithmetic average of the errors, and determines whether this arithmetic average would be reduced by shifting one of the groups to a different available impulse. Note that in this case, the reduction in arithmetic average may differ depending upon which group is shifted to a different impulse, and obviously whichever shift produces the smaller average should be effected.

Again, this method can be thought of as small-signal spatial dithering implemented on top of large signal intrinsic gray scale, with the small signal dithering used to correct for errors in impulse due to the limitation of the pulse width modulation drive scheme used. Because each pixel is still approximately at the correct gray level in this scheme, and the corrections are only to correct for impulse rounding errors, effective display resolution is not compromised. To put it another way, this method implements small signal spatial dithering on top of large signal true gray scale.

The various methods of the present invention may make use of various additional variations and techniques described in the aforementioned applications, especially the aforementioned 2003/0137521 and application Ser. No. 10/814,205, which variations and techniques are described in the "Additional Background Information" section below. It will be appreciated that in the overall waveform used to drive an electro-optic display, in at least some cases certain transitions may be effected in accordance with the various methods of the present invention, while other transitions may not make use of the methods of the present invention but may make use of other types of transitions described below.

Additional Background Information

Part A: Non-Contiguous Addressing

As already briefly indicated, the present methods may make use of "non-contiguous addressing" as that term in used in the aforementioned application Ser. No. 10/814,205. As there described, such non-contiguous addressing has two principal variants, a DC imbalanced variant and a DC balanced variant. The DC imbalanced variant effects at least one transition between gray levels using an output signal which has a non-zero net impulse (i.e., the length of positive and negative segments is not equal), and therefore is not internally DC balanced, and is non-contiguous, (i.e. the pulse contains portions of zero voltage or opposite polarity). The output signal used in the non-contiguous addressing method may or may not be non-periodic (i.e., it may or may not consist of repeating units such as +/−/+/− or ++/−−/++/−−).

Such a non-contiguous waveform (which may hereinafter be referred to as a "fine tuning" or "FT" waveform) may have no frames of opposite polarity, and/or may include only three voltage levels, +V, 0, and −V with respect to the effective front plane voltage of the display (assuming, as is typically the case, an active matrix display having a pixel electrode associated with each pixel and a common front electrode extending across multiple pixels, and typically the whole display, so the electric field applied to any pixel of the electro-optic medium is determined by the voltage difference between its associated pixel electrode and the common front electrode). Alternatively, an FT waveform may include more than three voltage levels. An FT waveform may consist of any one of the types of waveforms described above (such n-prepulse etc), with a non-contiguous waveform appended.

An FT waveform may (and typically will) be dependent on one or more prior image states, and can be used in order to achieve a smaller change in optical state than can be achieved using standard pulse width modulation (PWM) techniques. (Thus, the exact FT waveform employed will vary from one transition to another in a look-up table, in contrast to certain prior art waveforms in which pulses of alternating polarity are employed, for example, allegedly to prevent sticking of electrophoretic particles to surfaces such as capsule walls.) In a preferred variant of the non-contiguous addressing method, there is provided a combination of all waveforms required to achieve all allowed optical transitions in a display (a "transition matrix"), in which at least one waveform is an FT waveform of the present invention and the combination of waveforms is DC-balanced. In another preferred variant of the non-contiguous addressing method, the lengths of all voltage segments are integer multiples of a single interval (the "frame time"); a voltage segment is a portion of a waveform in which the voltage remains constant.

Non-contiguous addressing is based upon the discovery that, in many impulse driven electro-optic media, a waveform which has zero net impulse, and which thus might theoretically be expected to effect no overall change in the gray level of a pixel, can in fact, because of certain non-linear effects in the properties of such media, effect a small change in gray level, which can be used to achieve finer adjustment of gray levels than is possible using a simple PWM drive scheme or drivers with limited ability to vary the width and/or height of a pulse. The pulses which may up such a "fine tuning" waveform may be separate from the "major drive" pulses which effect a major change in gray level, and may precede or follow such major drive pulses. Alternatively, in some cases, the fine adjustment pulses may be intermingled with the major drive pulses, either a separate block of fine tuning pulses at a single point in the sequence of major drive pulses, or interspersed singly or in small groups at multiple points in the sequence of major drive pulses.

Although non-contiguous addressing has very general applicability, it will primarily be described using as an example drive schemes using source drivers with three voltage outputs (positive, negative, and zero) and waveforms constructed from the following three types of waveform elements (since it is believed that the necessary modifications of the present invention for use with other types of drivers and waveform elements will readily be apparent to those skilled in the technology of electro-optic displays):

1) Saturation pulse: A sequence of frames with voltages of one sign or one sign and zero volts that drives the reflectance approximately to one extreme optical state (an optical rail, either the darkest state, here called the black state, or the brightest state, here called the white state);

2) Set pulse: A sequence of frames with voltages of one sign or one sign and zero volts that drives the reflectance approximately to a desired gray level (black, white or an intermediate gray level); and 3) FT sequence: A sequence of frames with voltages that are individually selected to be positive, negative, or zero, such that the optical state of the ink is moved much less than a single-signed sequence of the same length. Examples of FT drive sequences having a total length of five scan frames are: [+ − + − −] (here, the voltage of each frame is represented sequentially by a + for positive voltage, 0 for zero voltage, and − for a negative voltage), [− − 0 + +], [0 0 0 0 0], [0 0 + − 0], and [0 − + 0 0]. These sequences are shown schematically in FIGS. 21A-21E respectively of the accompanying drawings, in which the circles represent the starting and end points of the FT sequence, and there are five scan frames between these points.

An FT sequence may be used either to allow fine control of the optical state, as previously described, or to produce a change in the optical state similar to that for a sequence of monopolar (single-signed) voltages but having a different net voltage impulse (where impulse is defined as the integral of the applied voltage over time). FT sequences in the waveform can thus be used as a tool to achieve DC balance.

Figure 22:
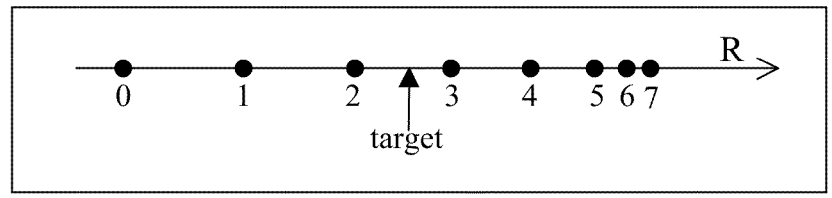
FIG. 22 illustrates a problem in addressing an electro-optic display using various numbers of frames of a monopolar voltage.

The use of an FT sequence to achieve fine control of the optical state will first be described. In FIG. 22, the optical states achievable using zero, one, two, three, or more frames of a monopolar voltage are indicated schematically as points on the reflectivity axis. From this Figure, it will be seen that the length of the monopolar pulse can be chosen to achieve a reflectance represented by its corresponding point on this axis. However, one may wish to achieve a gray level, such as that indicated by "target" in FIG. 22, that is not well approximated by any of these gray levels. An FT sequence can be used to fine-tune the reflectance to the desired state, either by fine tuning the final state achieved after a monopolar drive pulse, or by fine-tuning the initial state and then using a monopolar drive sequence.

Figure 23:
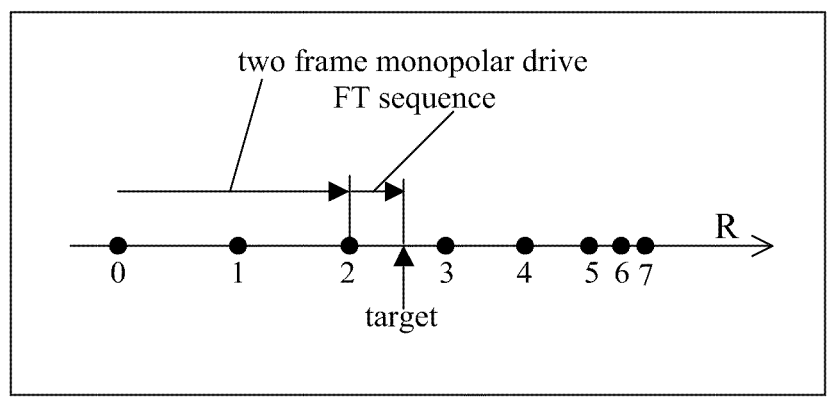
FIG. 23 illustrates one approach to solving the problem shown in FIG. 22 using a non-contiguous variant of a method of the present invention.

A first example of an FT sequence, shown in FIG. 23, shows an FT sequence being used after a two-pulse monopolar drive. The FT sequence is used to fine-tune the final optical state to the target state. Like FIG. 22, FIG. 23 shows the optical states achievable using various numbers of scan frames, as indicated by the solid points. The target optical state is also shown. The optical change by applying two scan frames is indicated, as is an optical shift induced by the FT sequence.

Figure 24:
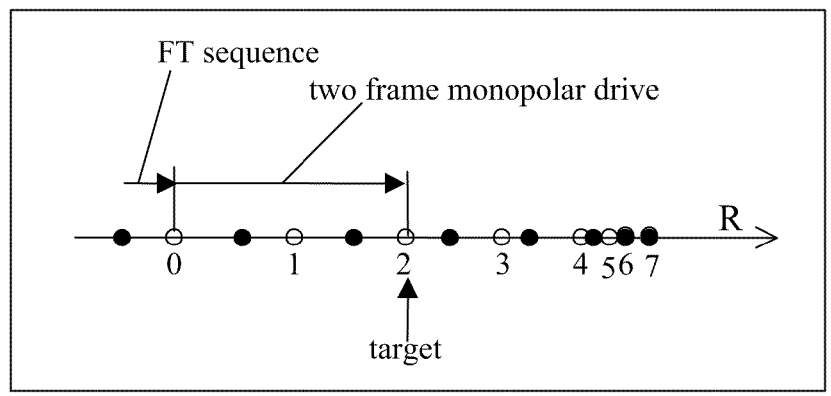
FIG. 24 illustrates a second approach to solving the problem shown in FIG. 13 using a non-contiguous variant of a method of the present invention.

A second example of an FT sequence is shown in FIG. 24; in this case, the FT sequence is used first to fine tune the optical state into a position where a monopolar drive sequence can be used to achieve the desired optical state. The optical states achievable after the FT sequence are shown by the open circles in FIG. 24.

An FT sequence can also be used with a limited transitions waveform of the present invention, such as a rail-stabilized gray scale waveform, such as that described above with reference to FIGS. 11A and 11B. As mentioned above, the essence of a limited transitions waveform is that a given pixel is only allowed to make a limited number of gray-to-gray transitions before being driven to one of its extreme optical states. Thus, such waveforms use frequent drives into the extreme optical states (referred to as optical rails) to reduce optical errors while maintaining DC balance (where DC balance is a net voltage impulse of zero and is described in more detail below). Well resolved gray scale can be achieved using these waveforms by selecting fine-adjust voltages for one or more scan frames. However, if these fine-adjust voltages are not available, another method must be used to achieve fine tuning, preferably while maintaining DC balance as well. FT sequences may be used to achieve these goals.

First, consider a cyclic version of a rail-stabilized grayscale waveform, in which each transition consists of zero, one, or two saturation pulses (pulses which drive the pixel into an optical rail) followed by a set pulse as described above (which takes the pixel to the desired gray level). To illustrate how FT sequences can be used in this waveform, a symbolic notation will be used for the waveform elements: "sat" to represent a saturation pulse; "set" to represent a set pulse; and "N" to represent an FT drive sequence. The three basic types of cyclic rail-stabilized grayscale waveforms are:

set (for example, transition 1104 in FIG. 11A)
    sat-set (for example, transition 1106/1108 in FIG. 11A)
    sat-sat'-set (for example, transition 1116/1118/1120 in FIG. 11A)

where sat and sat' are two distinct saturation pulses.

Modification of the first of these types with an FT sequence gives the following waveforms:

N-set
    set-N that is, an FT sequence followed by a set pulse or the same elements in reverse order.

Modification of the second of these types with one or more FT sequences gives, for example, the following FT-modified waveforms:

N-sat-set
    sat-N-set
    sat-set-N
    sat-N-set-N'
    N-sat-set-N'
    N-sat-N'-set
    N-sat-N'-set-N"

where N, N', and N" are three FT sequences, which may or may not be different from one another.

Modification of the second of these types can be achieved by interspersing FT sequences between the three waveform elements following essentially the previously described forms. An incomplete list of examples includes:

N-sat-sat'-set
    N-sat-sat'-set-N'
    sat-N-sat'-N'-set-N"
    N-sat-N'-sat'-N"-set-N'".

Another base waveform which can be modified with an FT sequence is the single-pulse slide show gray scale with drive to black (or white). In this waveform, the optical state is first brought to an optical rail, then to the desired image. The waveform of each transition can be symbolically represented by either of the two sequences:

sat-set
    set.

Such a waveform may be modified by inclusion of FT drive sequence elements in essentially the same manner as already described for the rail-stabilized gray scale sequence, to produce sequences such as:

sat-set-N
    sat-N-set
    etc.

The above two examples describe the insertion of FT sequences before or after saturation and set pulse elements of a waveform. It may be advantageous to insert FT sequences part way through a saturation or set pulse, that is the base sequence:

sat-set would be modified to a form such as:

{sat, part I}-N-{sat, part II}-set or sat-{set, part I}-N-{set, part II}

As already indicated, it has been discovered that the optical state of many electro-optic media achieved after a series of transitions is sensitive to the prior optical states and also to the time spent in those prior optical states, and methods have been described for compensating for prior state and prior dwell time sensitivities by adjusting the transition waveform accordingly. FT sequences can be used in a similar manner to compensate for prior optical states and/or prior dwell times.

To describe this concept in more detail, consider a sequence of gray levels that are to be represented on a particular pixel; these levels are denoted $R_1$, $R_2$, $R_3$, $R_4$, and so on, where $R_1$ denotes the next desired (final) gray level of the transition being considered, $R_2$ is the initial gray level for that transition, $R_3$ is the first prior gray level, $R_4$ is the second prior gray level and so on. The gray level sequence can then be represented by:

$R_n R_{n-1} R_{n-2} \ldots R_3 R_2 R_1$

The dwell time prior to gray level i is denoted $D_i$. $D_i$ may represent the number of frame scans of dwell in gray level i.

The FT sequences described above could be chosen to be appropriate for the transition from the current to the desired gray level. In the simplest form, these FT sequences are then functions of the current and desired gray level, as represented symbolically by:

$N=N(R_2, R_1)$ to indicate that the FT sequence N depends upon $R_2$ and $R_1$.

To improve device performance, and specifically to reduce residual gray level shifts correlated to prior images, it is advantageous to make small adjustments to a transition waveform. Selection of FT sequences could be used to achieve these adjustments. Various FT sequences give rise to various final optical states. A different FT sequence may be chosen for different optical histories of a given pixel. For example, to compensate for the first prior image ($R_3$), one could choose an FT sequence that depends on $R_3$, as represented by:

$N=N(R_3, R_2, R_1)$

That is, an FT sequence could be selected based not only on $R_1$ and $R_2$, but also on $R_3$.

Generalizing this concept, the FT sequence can be made dependent on an arbitrary number of prior gray levels and/or on an arbitrary number of prior dwell times, as represented symbolically by:

$N=N(D_m, D_{m-1}, \ldots D_3, D_2; R_n, R_{n-1}, \ldots R_3, R_2, R_1)$ where the symbol $D_k$ represents the dwell time spent in the gray level $R_k$ and the number of optical states, n, need not equal the number of dwell times, m, required in the FT determination function. Thus FT sequences may be functions of prior images and/or prior and current gray level dwell times.

Figure 25:
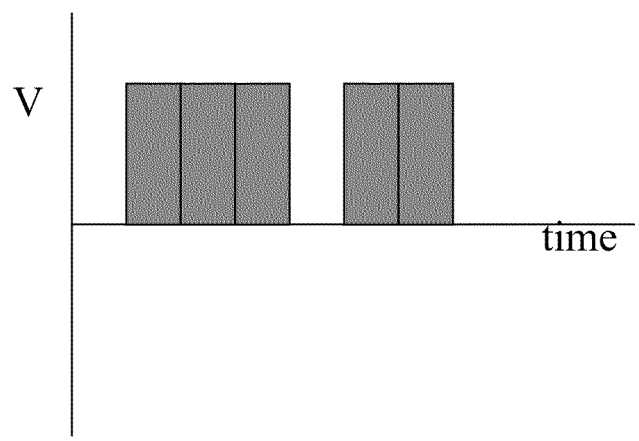
FIG. 25 illustrates a waveform which may be used in a non-contiguous variant of a method of the present invention.
Figure 26:
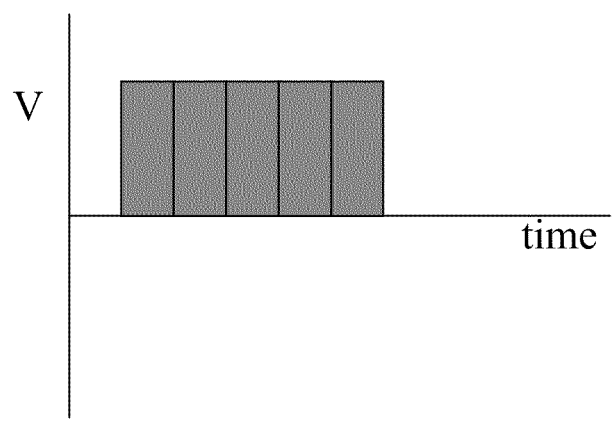
FIG. 26 illustrates a base waveform which can be modified to produce the waveform shown in FIG. 25.

As a special case of this general concept, it has been found that insertion of zero voltage scan frames into an otherwise monopolar pulse can change the final optical state achieved. For example, the optical state achieved after the sequence of FIG. 25, into which a zero voltage scan frame has been inserted, will differ somewhat from the optical state achieved after the corresponding monopolar sequence of FIG. 26, with no zero voltage scan frame but the same total impulse as the sequence of FIG. 25.

It has also been found that the impact of a given pulse on the final optical state depends upon the length of delay between this pulse and a previous pulse. Thus, one can insert zero voltage frames between pulse elements to achieve fine tuning of a waveform.

The present methods may extend to the use of FT drive elements and insertion of zero-volt scan frames in monopolar drive elements in other waveform structures. Other examples include but are not limited to double-prepulse (including triple-prepulse, quadruple-prepulse and so on) slide show gray scale waveforms, where both optical rails are visited (more than once in the case of higher numbers of prepulses) in going from one optical state to another, and other forms of rail-stabilized gray scale waveforms. FT sequences could also be used in general image flow gray scale waveforms, where direct transitions are made between gray level.

While insertion of zero voltage frames can be thought of as a specific example of insertion of an FT sequence, where the FT sequence is all zeros, attention is directed to this special case because it has been found to be effective in modifying final optical states.

The preceding discussion has focused on the use of FT sequences to achieve fine tuning of gray levels. The use of such FT sequences to achieve DC balance will now be considered. FT sequences can be used to change the degree of DC imbalance (preferably to reduce or eliminate DC imbalance) in a waveform. By DC balance is meant that all full-circuit gray level sequences (sequences that begin and end with the same gray level), have zero net voltage impulse. A waveform can be made DC balanced or less strongly DC imbalanced by use of one or more FT sequences, taking advantage of the fact that FT sequences can either (a) change the optical state in the same way as a saturation or set pulse but with a substantially different net voltage impulse; or (b) result in an insubstantial change in the optical state but with a net DC imbalance.

The following illustration shows how FT sequences can be used to achieve DC balance. In this example, a set pulse can be of variable length, namely one, two, three or more scan frames. The final gray levels achieved for each of the number of scan frames are shown in FIG. 27, in which the number next to each point represents the number of scan frames used to achieve the gray level.

Figure 27:
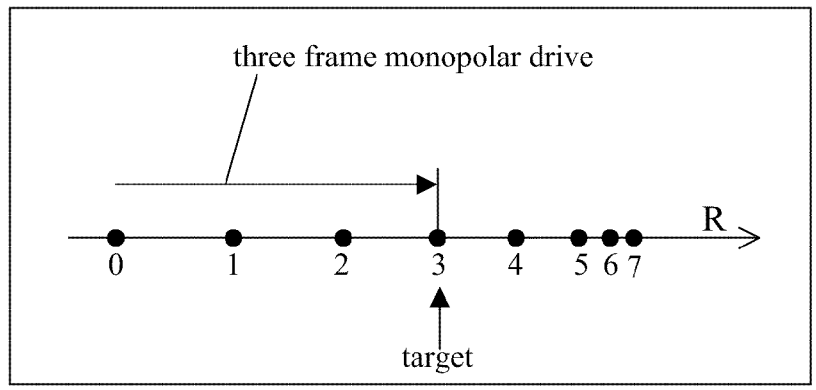
FIG. 27 illustrates a problem in addressing an electro-optic display using various numbers of frames of a monopolar voltage while maintaining DC balance.

FIG. 27 shows the optical states available using scan frames of positive voltage, monopolar drive where the number labels specify the number of monopolar frames used to produce the final gray level. Suppose that, in order to maintain DC balance in this example, a net voltage impulse of two positive voltage frames need to be applied. The desired (target) gray level could be achieved by using three scan frames of impulse; however, in doing so, the system would be left DC imbalanced by one frame. On the other hand, DC balance could be achieved by using two positive voltage scan frames instead of three, but the final optical state will deviate significantly from the target.

Figure 28:
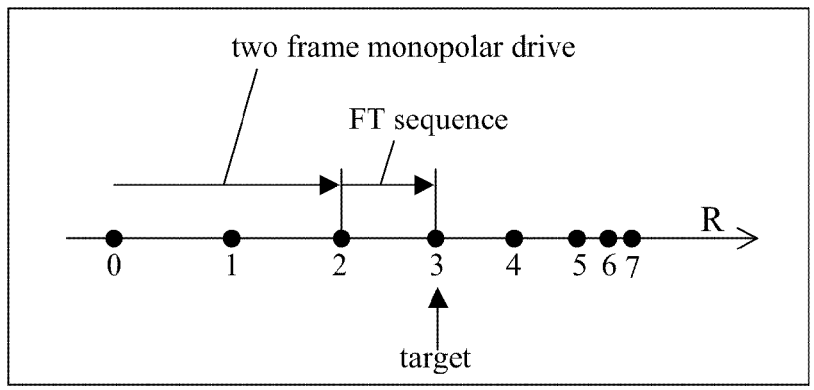
FIG. 28 illustrates one approach to solving the problem shown in FIG. 18 using a non-contiguous addressing method.

One way to achieve DC balance is to use two positive voltage frames to drive the electro-optic medium to the vicinity of the desired gray level, and also use a DC balanced FT sequence (an FT sequence that has zero net voltage impulse) to make the final adjustment sufficiently close to the target gray level, as illustrated symbolically in FIG. 28, in which the target gray level is achieved using two scan frames followed by an FT sequence of zero net voltage impulse chosen to give the proper change in optical state.

Figure 29:
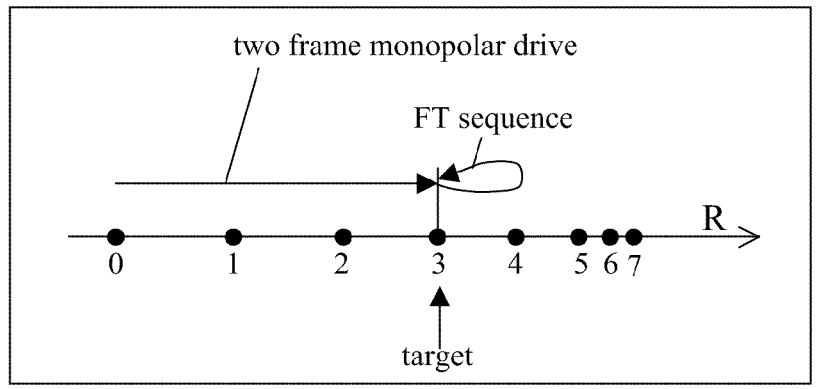
FIG. 29 illustrates a second approach to solving the problem shown in FIG. 18 using the non-contiguous addressing method.

Alternatively, one could use three positive voltage scan frames of monopolar drive to bring the reflectance to the target optical state, then use an FT sequence that has a net DC imbalance equivalent to one negative voltage scan frame. If one chooses an FT sequence that results in a substantially unchanged optical state, then the final optical state will remain correct and DC-balance will be restored. This example is shown in FIG. 29. It will be appreciated that typically use of FT sequences will involve some adjustment of optical state along with some effect on DC balance, and that the above two examples illustrate extreme cases.

The following Example is now given, though by way of illustration only, to show experimental uses of FT sequences in accordance with the present invention.

Example

Use of FT Sequences in Cyclic RSGS Waveform

This Example illustrates the use of FT sequences in improving the optical performance of a waveform designed at achieve 4 gray level (2-bit) addressing of a single pixel display. This display used an encapsulated electrophoretic medium and was constructed substantially as described in Paragraphs [0069] to [0076] of the aforementioned 2002/0180687. The single-pixel display was monitored by a photodiode.

Waveform voltages were applied to the pixel according to a transition matrix (look-up table), in order to achieve a sequence of gray levels within the 2-bit (4-state) grayscale. As already explained, a transition matrix or look-up table is simply a set of rules for applying voltages to the pixel in order to make a transition from one gray level to another within the gray scale.

The waveform was subject to voltage and timing constraints. Only three voltage levels, −15V, 0V and +15V were applied across the pixel. Also, in order to simulate an active matrix drive with 50 Hz frame rate, voltages were applied in 20 ms increments. Tuning algorithms were employed iteratively in order to optimize the waveform, i.e. to achieve a condition where the spread in the actual optical state for each of the four gray levels across a test sequence was minimized.

In an initial experiment, a cyclic rail-stabilized grayscale (cRSGS) waveform was optimized using simple saturation and set pulses. Consideration of prior states was limited to the initial (R2) and desired final (R1) gray levels in determining the transition matrix. The waveform was globally DC balanced. Because of the coarseness of the minimum impulse available for tuning (20 ms at 15 V), and the absence of states prior to R2 in the transition matrix, quite poor performance was anticipated from this waveform.

Figure 30:
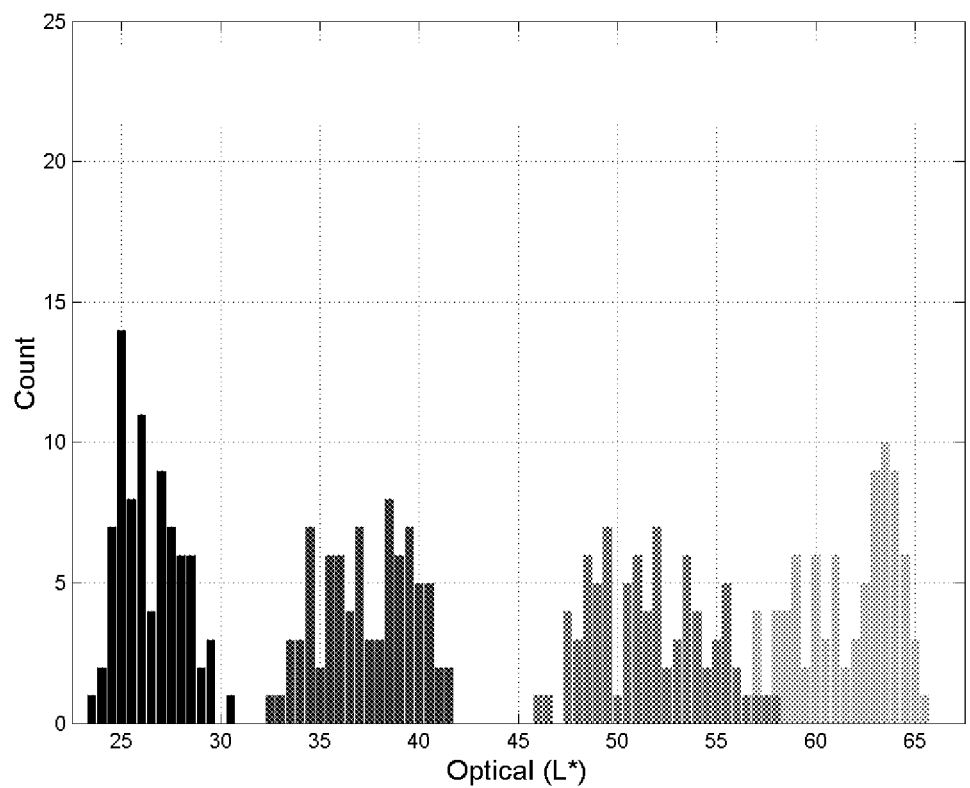
FIG. 30 illustrates the gray levels obtained in a nominally four gray level electro-optic display without using a non-contiguous addressing method, as described in the Example below.

The performance of the transition matrix was tested by switching the test pixel through a "pentad-complete" gray level sequence, which contained all gray level pentad sequences in a random arrangement. (Pentad sequence elements are sequences of five gray levels, such as 0-1-0-2-3 and 2-1-3-0-3, where 0, 1, 2 and 3 represent the four gray levels available.) For a perfect transition matrix, the reflectivity of each of the four gray levels is exactly the same for all occurrences of that gray level in the random sequence. The reflectivity of each of the gray levels will vary significantly for realistic transition matrices. The bar graph of FIG. 30 indeed shows the poor performance of the voltage and timing limited transition matrix. The measured reflectivity of the various occurrences of each of the target gray levels is highly variable. The cRSGS waveform optimized without FT sequences developed in this part of the experiment is hereinafter referred to as the base waveform.

FT sequences were then incorporated into the cRSGS waveform; in this experiment, the FT sequences were limited to five scan frames, and included only DC balanced FT sequences. The FT sequences were placed at the end of the base waveform for each transition, i.e., the waveform for each transition had one of the following forms:

set-N
sat-set-N
sat-sat'-set-N.

Successful incorporation of FT sequence elements into the waveform required two steps; first, ascertaining the effect of various FT sequences on the optical state at each gray level and second selecting FT sequences to append to the various waveform elements.

To ascertain the effect of various FT sequences on the optical state of each gray level, an "FT efficacy" experiment was performed. First, a consistent starting point was established by switching the electrophoretic medium repeatedly between black and white optical rails. Then, the film was taken to one of the four gray levels (0, 1, 2, or 3), here referred to as the optical state R2. Then, the base waveform appropriate to make the transition from R2 to one of the other gray levels (here called R1) with an appended FT sequence was applied. This step was repeated with all of the 51 DC balanced, 5-frame FT sequences. The final optical state was recorded for each of the FT sequences. The FT sequences were then ordered according to their associated final reflectivity. This process was repeated for all combinations of initial (R2) and final (R1) gray levels. The ordering of FT sequences for the final gray level 1 (R1=1) and the current gray level 0, 2 and 3 (R2=0, 2, 3) are shown in Tables 7-9, respectively, where the columns labeled "Frame 1" to "Frame 5" show the potential in volts applied during the five successive frames of the relevant FT sequence. The final optical states achieved for the waveform using the various FT sequences are plotted in FIG. 31. From this Figure, it will be seen that FT sequences can be used to affect a large change in the final optical state, and that the choices of five-scan-frame FT sequences afforded fine control over the final optical state, all with no net voltage impulse difference.

TABLE 7

Final optical states for gray level 0 to 1 for various FT sequences.

| Index Number | Optical (L*) | Frame 1 | Frame 2 | Frame 3 | Frame 4 | Frame 5 |
|---|---|---|---|---|---|---|
| 1 | 35.13 | 0 | 15 | 15 | −15 | −15 |
| 2 | 35.20 | 15 | 0 | 15 | −15 | −15 |
| 3 | 35.22 | 15 | 15 | 0 | −15 | −15 |
| 4 | 35.48 | 15 | 15 | −15 | −15 | 0 |
| 5 | 35.65 | 15 | 15 | −15 | 0 | −15 |
| 6 | 36.07 | 0 | 15 | −15 | 15 | −15 |
| 7 | 36.10 | 15 | −15 | 0 | 15 | −15 |
| 8 | 36.23 | 15 | 0 | −15 | 15 | −15 |
| 9 | 36.26 | 15 | −15 | 15 | 0 | −15 |
| 10 | 36.32 | 15 | −15 | 15 | −15 | 0 |
| 11 | 36.34 | −15 | 0 | 15 | 15 | −15 |
| 12 | 36.36 | −15 | 15 | 0 | 15 | −15 |
| 13 | 36.37 | 0 | 0 | 15 | 0 | −15 |
| 14 | 36.42 | 0 | 15 | 0 | 0 | −15 |
| 15 | 36.47 | 0 | 0 | 0 | 15 | −15 |
| 16 | 36.51 | −15 | 15 | 15 | 0 | −15 |
| 17 | 36.51 | 0 | 15 | 0 | −15 | 0 |
| 18 | 36.55 | 0 | 0 | 15 | −15 | 0 |
| 19 | 36.59 | −15 | 15 | 15 | −15 | 0 |
| 20 | 36.59 | 0 | 15 | −15 | 0 | 0 |
| 21 | 36.59 | 0 | −15 | 15 | 15 | −15 |
| 22 | 36.68 | 15 | 0 | 0 | 0 | −15 |
| 23 | 36.73 | 15 | −15 | −15 | 0 | 15 |
| 24 | 36.76 | 15 | 0 | 0 | −15 | 0 |
| 25 | 36.79 | 15 | 0 | −15 | 0 | 0 |
| 26 | 36.86 | 0 | 15 | −15 | −15 | 15 |
| 27 | 36.87 | 15 | −15 | 0 | 0 | 0 |
| 28 | 37.00 | 15 | 0 | −15 | −15 | 15 |
| 29 | 37.03 | −15 | 0 | 0 | 0 | 15 |

TABLE 7-continued

Final optical states for gray level 0 to 1 for various FT sequences.

| Index Number | Optical (L*) | Frame 1 | Frame 2 | Frame 3 | Frame 4 | Frame 5 |
|---|---|---|---|---|---|---|
| 30 | 37.05 | 15 | −15 | −15 | 15 | 0 |
| 31 | 37.11 | −15 | 0 | 0 | 15 | 0 |
| 32 | 37.19 | 15 | −15 | 0 | −15 | 15 |
| 33 | 37.19 | −15 | 15 | −15 | 0 | 15 |
| 34 | 37.22 | 0 | −15 | 0 | 0 | 15 |
| 35 | 37.24 | −15 | 0 | 15 | 0 | 0 |
| 36 | 37.26 | −15 | 0 | 15 | −15 | 15 |
| 37 | 37.33 | 0 | −15 | 0 | 15 | 0 |
| 38 | 37.43 | 0 | 0 | −15 | 0 | 15 |
| 39 | 37.43 | −15 | 15 | −15 | 15 | 0 |
| 40 | 37.49 | −15 | −15 | 15 | 0 | 15 |
| 41 | 37.50 | −15 | 15 | 0 | 0 | 0 |
| 42 | 37.53 | −15 | 15 | 0 | −15 | 15 |
| 43 | 37.55 | 0 | −15 | 15 | −15 | 15 |
| 44 | 37.58 | 0 | −15 | 15 | 0 | 0 |
| 45 | 37.61 | 0 | 0 | −15 | 15 | 0 |
| 46 | 37.62 | −15 | −15 | 0 | 15 | 15 |
| 47 | 37.69 | 0 | 0 | 0 | −15 | 15 |
| 48 | 37.72 | 0 | 0 | 0 | 0 | 0 |
| 49 | 37.85 | −15 | −15 | 15 | 15 | 0 |
| 50 | 37.96 | −15 | 0 | −15 | 15 | 15 |
| 51 | 37.99 | 0 | −15 | −15 | 15 | 15 |

TABLE 8

Final optical states for gray level 2 to 1 for various FT sequences.

| Index Number | Optical (L*) | Frame 1 | Frame 2 | Frame 3 | Frame 4 | Frame 5 |
|---|---|---|---|---|---|---|
| 1 | 34.85 | 0 | 15 | 15 | −15 | −15 |
| 2 | 34.91 | 15 | 0 | 15 | −15 | −15 |
| 3 | 35.07 | 15 | 15 | −15 | −15 | 0 |
| 4 | 35.15 | 15 | 15 | 0 | −15 | −15 |
| 5 | 35.35 | 15 | 15 | −15 | 0 | −15 |
| 6 | 35.43 | 0 | 15 | −15 | 15 | −15 |
| 7 | 35.46 | 15 | −15 | 0 | 15 | −15 |
| 8 | 35.51 | 0 | 0 | 15 | −15 | 0 |
| 9 | 35.52 | 0 | 15 | −15 | 0 | 0 |
| 10 | 35.52 | 0 | 0 | 0 | 15 | −15 |
| 11 | 35.61 | 15 | −15 | 15 | −15 | 0 |
| 12 | 35.62 | 0 | 0 | 15 | 0 | −15 |
| 13 | 35.63 | 15 | −15 | 0 | 0 | 0 |
| 14 | 35.65 | −15 | 15 | 0 | 15 | −15 |
| 15 | 35.67 | 0 | 15 | 0 | −15 | 0 |
| 16 | 35.70 | −15 | 0 | 15 | 15 | −15 |
| 17 | 35.75 | 15 | −15 | 15 | 0 | −15 |
| 18 | 35.76 | 0 | 15 | 0 | 0 | −15 |
| 19 | 35.77 | 15 | 0 | −15 | 0 | 0 |
| 20 | 35.78 | 15 | 0 | −15 | 15 | −15 |
| 21 | 35.80 | −15 | 15 | 15 | −15 | 0 |
| 22 | 35.97 | −15 | 15 | 15 | 0 | −15 |
| 23 | 35.98 | 15 | 0 | 0 | −15 | 0 |
| 24 | 36.00 | 0 | −15 | 15 | 15 | −15 |
| 25 | 36.06 | 0 | 0 | 0 | 0 | 0 |
| 26 | 36.09 | −15 | 0 | 0 | 15 | 0 |
| 27 | 36.10 | −15 | 0 | 0 | 0 | 15 |
| 28 | 36.10 | 15 | 0 | 0 | 0 | −15 |
| 29 | 36.14 | −15 | 0 | 0 | 15 | 0 |
| 30 | 36.28 | −15 | 15 | 0 | 0 | 0 |
| 31 | 36.38 | 15 | −15 | −15 | 0 | 15 |
| 32 | 36.40 | 0 | 15 | −15 | −15 | 15 |
| 33 | 36.41 | 0 | −15 | 0 | 0 | 15 |
| 34 | 36.44 | 0 | −15 | 0 | 15 | 0 |
| 35 | 36.45 | 15 | −15 | −15 | 15 | 0 |
| 36 | 36.49 | −15 | 15 | −15 | 0 | 15 |
| 37 | 36.49 | 0 | −15 | 15 | 0 | 0 |
| 38 | 36.55 | −15 | 0 | 15 | −15 | 15 |
| 39 | 36.57 | −15 | 15 | 15 | −15 | 0 |
| 40 | 36.59 | 0 | 0 | −15 | 0 | 15 |
| 41 | 36.63 | 0 | 0 | −15 | 15 | 0 |
| 42 | 36.72 | 15 | −15 | 0 | −15 | 15 |

TABLE 8-continued

Final optical states for gray level 2 to 1 for various FT sequences.

| Index Number | Optical (L*) | Frame 1 | Frame 2 | Frame 3 | Frame 4 | Frame 5 |
|---|---|---|---|---|---|---|
| 43 | 36.72 | 15 | 0 | −15 | −15 | 15 |
| 44 | 36.77 | 0 | 0 | 0 | −15 | 15 |
| 45 | 36.81 | −15 | 15 | 0 | −15 | 15 |
| 46 | 36.89 | 0 | −15 | 15 | −15 | 15 |
| 47 | 36.98 | −15 | −15 | 15 | 0 | 15 |
| 48 | 37.16 | −15 | −15 | 15 | 15 | 0 |
| 49 | 37.19 | −15 | −15 | 0 | 15 | 15 |
| 50 | 37.42 | −15 | 0 | −15 | 15 | 15 |
| 51 | 37.51 | 0 | −15 | −15 | 15 | 15 |

TABLE 9

Final optical states for gray level 3 to 1 for various FT sequences.

| Index Number | Optical (L*) | Frame 1 | Frame 2 | Frame 3 | Frame 4 | Frame 5 |
|---|---|---|---|---|---|---|
| 1 | 36.86 | 0 | 15 | 15 | −15 | −15 |
| 2 | 36.92 | 15 | 0 | 15 | −15 | −15 |
| 3 | 37.00 | 15 | 15 | −15 | −15 | 0 |
| 4 | 37.13 | 15 | 15 | 0 | −15 | −15 |
| 5 | 37.39 | 15 | 15 | −15 | 0 | −15 |
| 6 | 37.47 | 0 | 15 | −15 | 15 | −15 |
| 7 | 37.48 | 15 | −15 | 0 | 15 | −15 |
| 8 | 37.50 | 0 | 15 | −15 | 0 | 0 |
| 9 | 37.52 | 0 | 0 | 15 | −15 | 0 |
| 10 | 37.53 | 0 | 0 | 0 | 15 | −15 |
| 11 | 37.60 | 15 | −15 | 15 | −15 | 0 |
| 12 | 37.62 | 15 | −15 | 0 | 0 | 0 |
| 13 | 37.63 | 0 | 0 | 15 | 0 | −15 |
| 14 | 37.65 | 0 | 15 | 0 | −15 | 0 |
| 15 | 37.67 | −15 | 15 | 0 | 15 | −15 |
| 16 | 37.71 | −15 | 0 | 15 | 15 | −15 |
| 17 | 37.76 | 0 | 15 | 0 | 0 | −15 |
| 18 | 37.77 | 15 | −15 | 15 | 0 | −15 |
| 19 | 37.79 | 15 | 0 | −15 | 15 | −15 |
| 20 | 37.80 | 15 | 0 | −15 | 0 | 0 |
| 21 | 37.82 | −15 | 15 | 15 | −15 | 0 |
| 22 | 37.96 | 15 | 0 | 0 | −15 | 0 |
| 23 | 38.01 | −15 | 15 | 15 | 0 | −15 |
| 24 | 38.03 | 0 | −15 | 15 | 15 | −15 |
| 25 | 38.04 | 0 | 0 | 0 | 0 | 0 |
| 26 | 38.09 | −15 | 0 | 0 | 15 | 0 |
| 27 | 38.09 | 15 | 0 | 0 | 0 | −15 |
| 28 | 38.15 | −15 | 0 | 0 | 0 | 15 |
| 29 | 38.16 | −15 | 0 | 15 | 0 | 0 |
| 30 | 38.24 | −15 | 15 | 0 | 0 | 0 |
| 31 | 38.40 | 15 | −15 | −15 | 0 | 15 |
| 32 | 38.43 | 0 | −15 | 0 | 0 | 15 |
| 33 | 38.44 | 0 | −15 | 0 | 15 | 0 |
| 34 | 38.44 | 0 | 15 | −15 | −15 | 15 |
| 35 | 38.46 | 15 | −15 | −15 | 15 | 0 |
| 36 | 38.51 | −15 | 15 | 0 | 0 | 15 |
| 37 | 38.52 | 0 | −15 | 15 | 0 | 0 |
| 38 | 38.59 | −15 | 0 | 15 | −15 | 15 |
| 39 | 38.61 | −15 | 15 | −15 | 15 | 0 |
| 40 | 38.65 | 0 | 0 | −15 | 0 | 15 |
| 41 | 38.66 | 0 | 0 | 0 | 15 | 0 |
| 42 | 38.74 | 15 | 0 | −15 | −15 | 15 |
| 43 | 38.74 | 15 | −15 | 0 | −15 | 15 |
| 44 | 38.82 | 0 | 0 | 0 | −15 | 15 |
| 45 | 38.89 | −15 | 15 | 0 | −15 | 15 |
| 46 | 38.95 | 0 | −15 | 15 | −15 | 15 |
| 47 | 39.02 | −15 | −15 | 15 | 0 | 15 |
| 48 | 39.21 | −15 | −15 | 15 | 15 | 0 |
| 49 | 39.22 | −15 | −15 | 0 | 15 | 15 |
| 50 | 39.44 | −15 | 0 | −15 | 15 | 15 |
| 51 | 39.53 | 0 | −15 | −15 | 15 | 15 |

Figure 31:
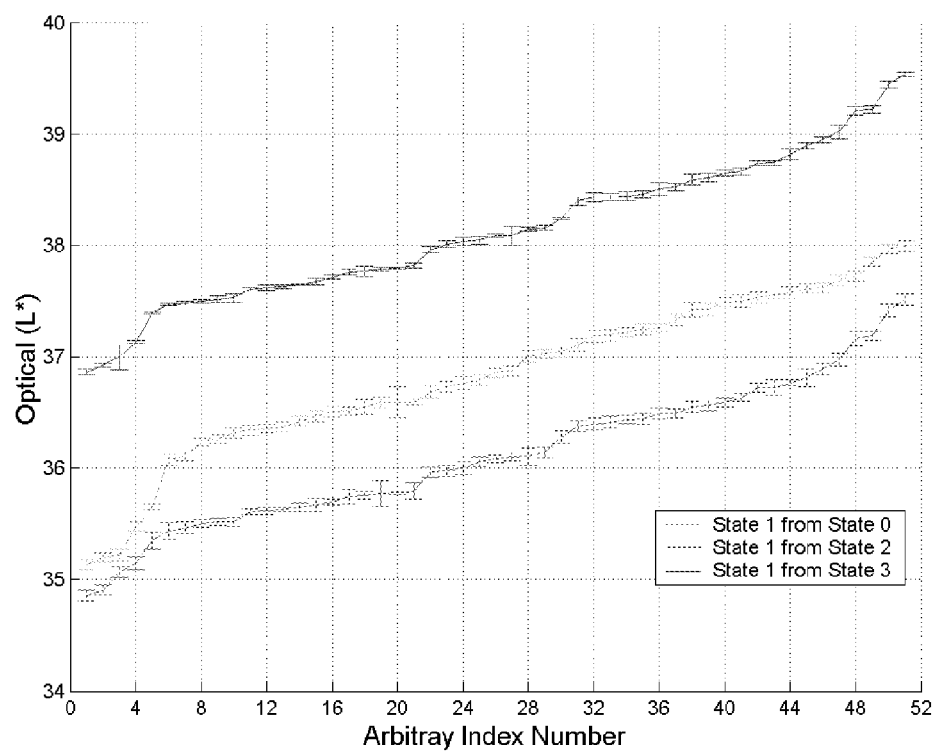
FIG. 31 illustrates the gray levels obtained from the same display as in FIG. 30 using various non-contiguous addressing sequences.

Next, a cRSGS waveform was constructed using FT sequences chosen using the results represented in Tables 7 to 9 and FIG. 31 (specifically Sequence 33 from Table 7, Sequence 49 from Table 8 and Sequence 4 from Table 9), and their analogs for the other final gray levels. It is noted that the region between 36.9 and 37.5 L* on the y-axis in FIG. 31 shows the overlap between optical reflectance of the same final (R1) state with different initial (R2) states made available by using DC balanced FT sequences. Therefore, a target gray level for R1=1 was chosen at 37.2 L*, and the FT sequence for each R2 that gave the final optical state closest to this target was selected. This process was repeated for the other final optical states (R1=0, 2 and 3).

Figure 32:
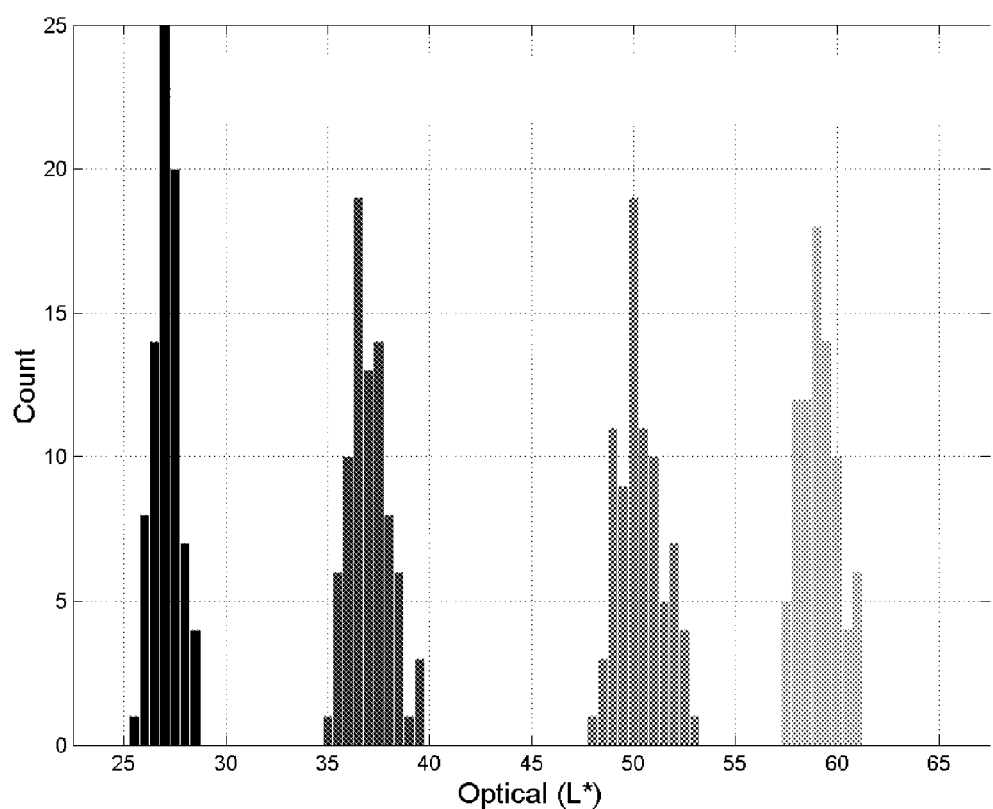
FIG. 32 illustrates the gray levels obtained from the same display as in FIG. 30 using a modified non-contiguous drive scheme.

Finally, the resultant waveform was tested using the pseudo-random sequence containing all five-deep state histories that was described earlier. This sequence contains 324 transitions of interest. The cRSGS waveform modified by the selected FT sequences was used to achieve all the transitions in this sequence, and the reflectivity of each of the optical states achieved was recorded. The optical states achieved are plotted in FIG. 32. It is apparent by comparing FIG. 32 with FIG. 30 that the spread in reflectivity of each of the gray levels was greatly reduced by incorporation of the FT sequences.

In summary, non-contiguous addressing provides FT sequences which either (i) allow changes in the optical state or (ii) allow a means of achieving DC balance, or at least a change in the degree of DC imbalance, of a waveform. As already noted, it is possible to give a rather mathematical definition of an FT sequence, for example, for the DC imbalanced variant of the method:

(a) Application of a DC imbalanced FT sequence that results in a change in optical state that is substantially different from the change in optical state of its DC reference pulse. The "DC reference pulse" is a pulse of voltage V0, where V0 is the voltage corresponding to the maximum voltage amplitude applied during the FT sequence but with the same sign as the net impulse of the FT sequence. The net impulse of a sequence is the area under the voltage versus time curve, and is denoted by the symbol G. The duration of the reference pulse is T=G/V0. This FT sequence is utilized to introduce a DC imbalance that differs significantly from the net DC imbalance of its reference pulse.

(b) Application of a DC imbalanced FT sequence that results in a change in optical state that is much smaller in magnitude than the optical change one would achieve with its time reference pulse. The "time-reference pulse" is defined as a single-signed-voltage pulse of the same duration as the FT sequence, but where the sign of the reference pulse is chosen to give the largest change in optical state. That is, when the electro-optic medium is near its white state, a negative voltage pulse may drive the electro-optic medium only slightly more white, whereas a positive voltage may drive the electro-optic medium strongly toward black. The sign of the reference pulse in this case is positive. The goal of this type of FT pulse is to adjust the net voltage impulse (for DC balancing, for example) while not strongly affecting the optical state.

Non-contiguous addressing also relates to the concept of using one or more FT sequences between or inserted into pulse elements of a transition waveform, and to the concept of using FT sequences to balance against the effect of prior gray levels and prior dwell times One specific example of the present invention is the use of zero voltage frames inserted in the middle of a pulse element of a waveform or in between pulse elements of a waveform to change the final optical state.

Non-contiguous addressing also allows fine tuning of waveforms to achieve desired gray levels with desired precision, and a means by which a waveform can be brought closer to DC balanced (that is, zero net voltage impulse for any cyclic excursion to various gray levels), using source drivers that do not permit fine tuning of the voltage, especially source drivers with only two or three voltage levels.

Part B: DC Balanced Addressing Method

The sawtooth (cRSGS) drive scheme described above with reference to FIGS. 11A and 11B is well adapted for use in DC balancing, in that this drive scheme ensures that only a limited number of transitions can elapse between successive passes of any given pixel though the black state, and indeed that on average a pixel will pass through the black state on one-half of its transitions.

However, DC balancing is not confined to balancing the aggregate of the impulses applied to the electro-optic medium during a succession of transitions, but also extends to making at least some of the transitions undergone by the pixels of the display "internally" DC balanced, as will now be described in detail.

DC balanced transitions are advantageous for driving encapsulated electrophoretic and other impulse-driven electro-optic media for display applications. Such transitions can be applied, for example, to an active-matrix display that has source drivers that can output only two or three voltages. Although other types of drivers can be used, most of the detailed description below will focus on examples using source drivers with three voltage outputs (positive, negative, and zero).

In the following description of a DC balanced addressing method, as in the preceding description of other aspects of the invention, the gray levels of an electro-optic medium will be denoted 1 to N, where 1 denotes the darkest state and N the lightest state. The intermediate states are numbered increasing from darker to lighter. A drive scheme for an impulse driven imaging medium makes use of a set of rules for achieving transitions from an initial gray level to a final gray level. The drive scheme can be expressed as a voltage as a function of time for each transition, as shown in Table 10 for each of the 16 possible transitions in a 2-bit (4 gray level) gray scale display.

TABLE 10

|  | final gray level | | | |
|---|---|---|---|---|
|  | 1 | 2 | 3 | 4 |
| initial gray level 1 | $V_{11}(t)$ | $V_{12}(t)$ | $V_{13}(t)$ | $V_{14}(t)$ |
| 2 | $V_{21}(t)$ | $V_{22}(t)$ | $V_{23}(t)$ | $V_{24}(t)$ |
| 3 | $V_{31}(t)$ | $V_{32}(t)$ | $V_{33}(t)$ | $V_{34}(t)$ |
| 4 | $V_{41}(t)$ | $V_{42}(t)$ | $V_{43}(t)$ | $V_{44}(t)$ |

In Table 10, $V_{ij}(t)$ denotes the waveform used to make the transition from gray level i to gray level j. DC-balanced transitions are ones where the time integral of the waveform $V_{ij}(t)$ is zero.

The term "optical rails" has already been defined above as meaning the extreme optical states of an electro-optic medium. The phrase "pushing the medium towards or into an optical rail" will be employed below. By "towards", is meant that a voltage is applied to move the optical state of the medium toward one of the optical rails. By "pushing", is meant that the voltage pulse is of sufficient duration and amplitude that the optical state of the electro-optic medium is brought substantially close to one of the optical rails. It is important to note that "pushing into an optical rail" does not mean that the optical rail state is necessarily achieved at the end of the pulse, but that an optical state substantially close to the final optical state is achieved at the end of the pulse. For example, consider an electro-optic medium with optical rails at 1% and 50% reflectivities. A 300 msec pulse was found to bring the final optical state (from 1% reflectivity) to 50% reflectivity. One may speak of a 200 msec pulse as pushing the display into the high-reflectivity optical rail even though it achieves a final reflectivity of only 45% reflectance. This 200 msec pulse is thought of as pushing the medium into one of the optical rails because the 200 msec duration is long compared to the time required to traverse a large fraction of the optical range, such as the middle third of the optical range (in this case, 200 msec is long compared to the pulse required to bring the medium across the middle third of the reflectivity range, in this case, from 17% to 34% reflectance).

Three different types of DC balanced transitions will now be described, together with a hybrid drive scheme using both DC balanced and DC imbalanced transitions. In the following description for convenience pulses will a denoted by a number, the magnitude of the number indicating the duration of the pulse. If the number is positive, the pulse is positive, and if the number is negative, the pulse is negative. Thus, for example, if the available voltages are +15V, 0V, and −15V, and the pulse duration is measured in milliseconds (msec), then a pulse characterized by x=300 indicates a 300 msec, 15V pulse, and x=−60 indicates a 60 msec, −15V pulse.

Figure 33:
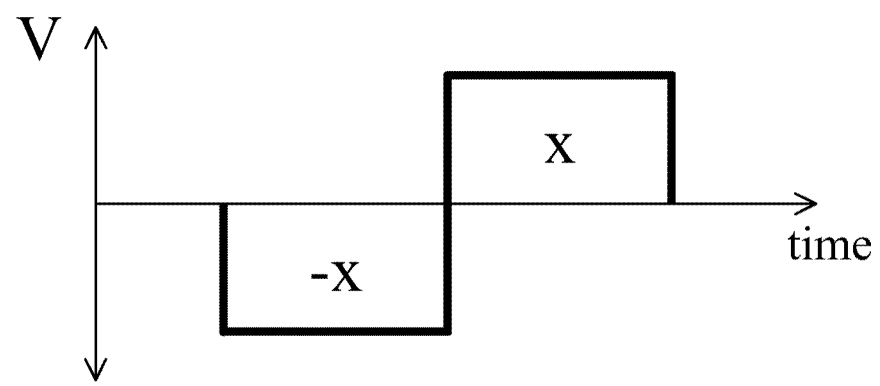
FIG. 33 illustrates a simple DC balanced waveform which may be used to drive an electro-optic display.

Type I:

In the first and simplest type of DC balanced transition, a voltage pulse ("x") is preceded by a pulse ("−x") of equal length but of opposite sign, as illustrated in FIG. 33. (Note that the value of x can itself be negative, so the positive and negative pulses may appear in the opposite order from that shown in FIG. 33.)

Figure 34:
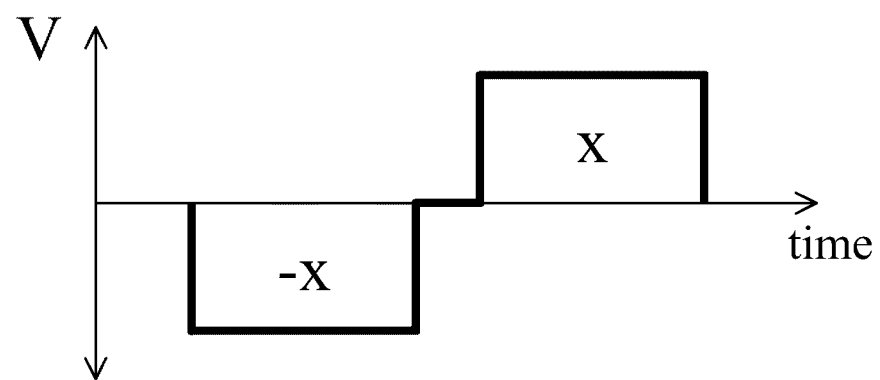
FIGS. 34 and 35 illustrate two modifications of the waveform shown in FIG. 33 to incorporate a period of zero voltage.
Figure 35:
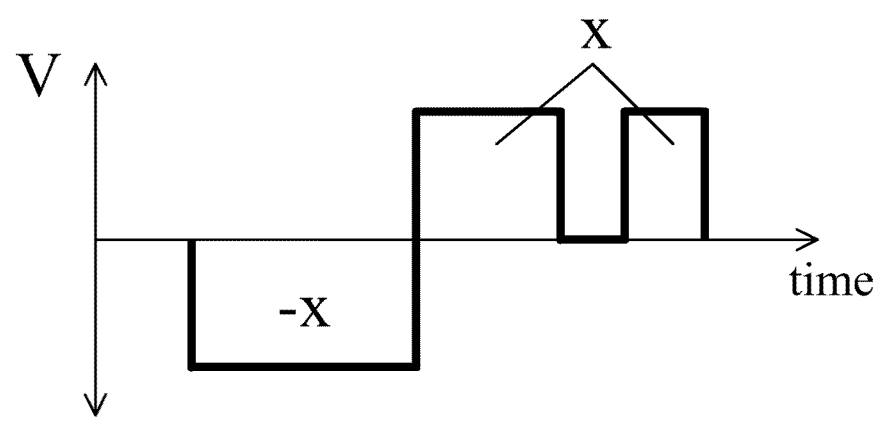

As mentioned above, it has been found that the effect of the waveform used to effect a transition is modified by the presence of a period of zero voltage (in effect a time delay) during or before any of the pulses in the waveform, in accordance with the non-contiguous addressing method of the present invention. FIGS. 34 and 35 illustrate modifications of the waveform of FIG. 33. In FIG. 34, a time delay is inserted between the two pulses of FIG. 33 while in FIG. 35 the time delay in inserted within the second pulse of FIG. 33, or, which amounts to the same thing, the second pulse of FIG. 33 is split into two separate pulses separated by the time delay. As already described, time delays can be incorporated into a waveform to achieve optical states not achievable without such delays. Time delays can also be used to fine-tune the final optical state. This fine-tuning ability is important, because in an active matrix drive, the time resolution of each pulse is defined by the scan rate of the display. The time resolution offered by the scan rate can be coarse enough that precise final optical states cannot be achieved without some additional means of fine tuning. While time delays offer a small degree of fine tuning of the final optical state, additional features such as those described below offer additional means of coarse and fine tuning of the final optical state.

Type II

Figure 36:
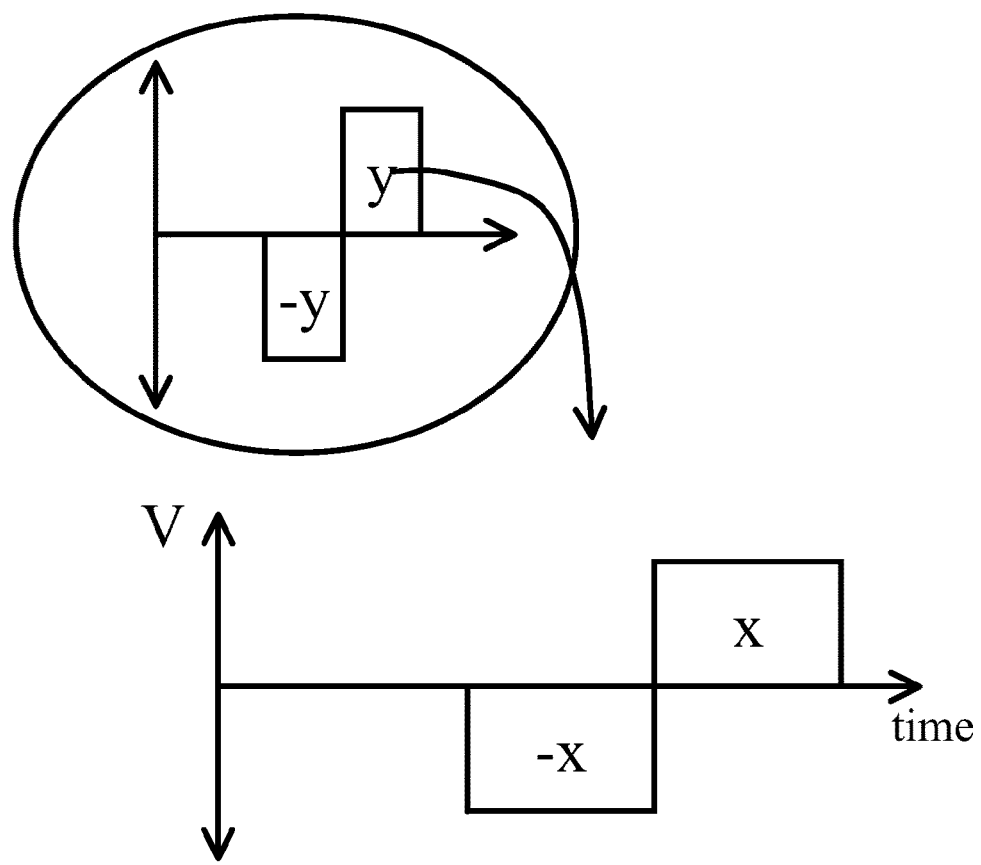
FIG. 36 illustrates schematically how the waveform shown in FIG. 33 may be modified to include an additional pair of drive pulses.

A Type II waveform consists of a Type I waveform as described above with the insertion of a positive and negative pulse pair (denoted "+y" and "−y" pulses) at some point into the Type I waveform, as indicated symbolically in FIG. 36. The +y and −y pulses do not have to be consecutive, but can be present at different places into the original waveform. There are two especially advantageous forms of the Type II waveform.

Figure 37:
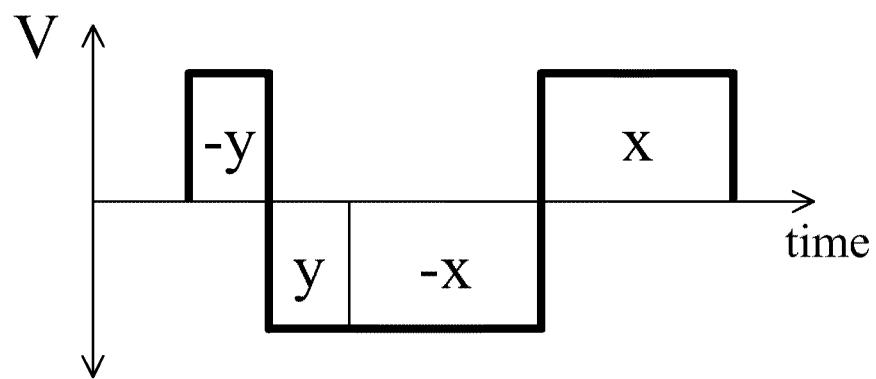
FIG. 37 illustrates one waveform produced by modifying the waveform of FIG. 33 in the manner illustrated in FIG. 36.

Type II: Special Case A:

In this special form, the "−y,+y" pulse pair is placed before the "−x,+x" pulse pair. It has been found that, when y and x are of opposite sign, as illustrated in FIG. 37, the final optical state can be finely tuned by even moderately coarse adjustment of the duration y. Thus, the value of x can be adjusted for coarse control and the value of y for final control of the final optical state of the electro-optic medium. This is believed to happen because the y pulse augments the −x pulse, thus changing the degree to which the electro-optic medium is pushed into one of its optical rails. The degree of pushing into one of the optical rails is known to give fine adjustment of the final optical state after a pulse away from that optical rail (in this case, provided by the x pulse).

Figure 38:
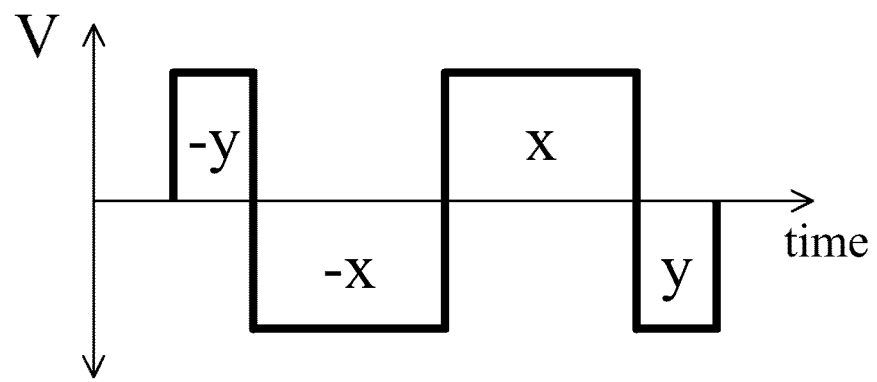
FIG. 38 illustrates a second waveform produced by modifying the waveform of FIG. 33 in the manner illustrated in FIG. 36.

Type II: Special Case B:

For reasons indicated above, it has been found advantageous to use waveforms with at least one pulse element long enough to drive the electro-optic medium substantially into one optical rail. Also, for a more visually pleasing transition, it is desirable to arrive to the final optical state from the nearer optical rail, since achieving gray levels near an optical rail requires only a short final pulse. Waveforms of this type require at least one long pulse for driving into an optical rail and a short pulse to achieve the final optical state near that optical rail, and hence cannot have the Type I structure described above. However, special cases of the Type II waveform can achieve this type of waveform. FIG. 38 shows one example of such a waveform, where the +y pulse is placed after the −x,+x pulse pair and the −y pulse is placed before the −x,+x pulse pair. In this type of waveform, the final +y pulse provides coarse tuning because the final optical state is very sensitive to the magnitude of y. The +x pulse provides a finer tuning, since the final optical state typically does not depend as strongly on the magnitude of the drive into the optical rail.

Figure 39:
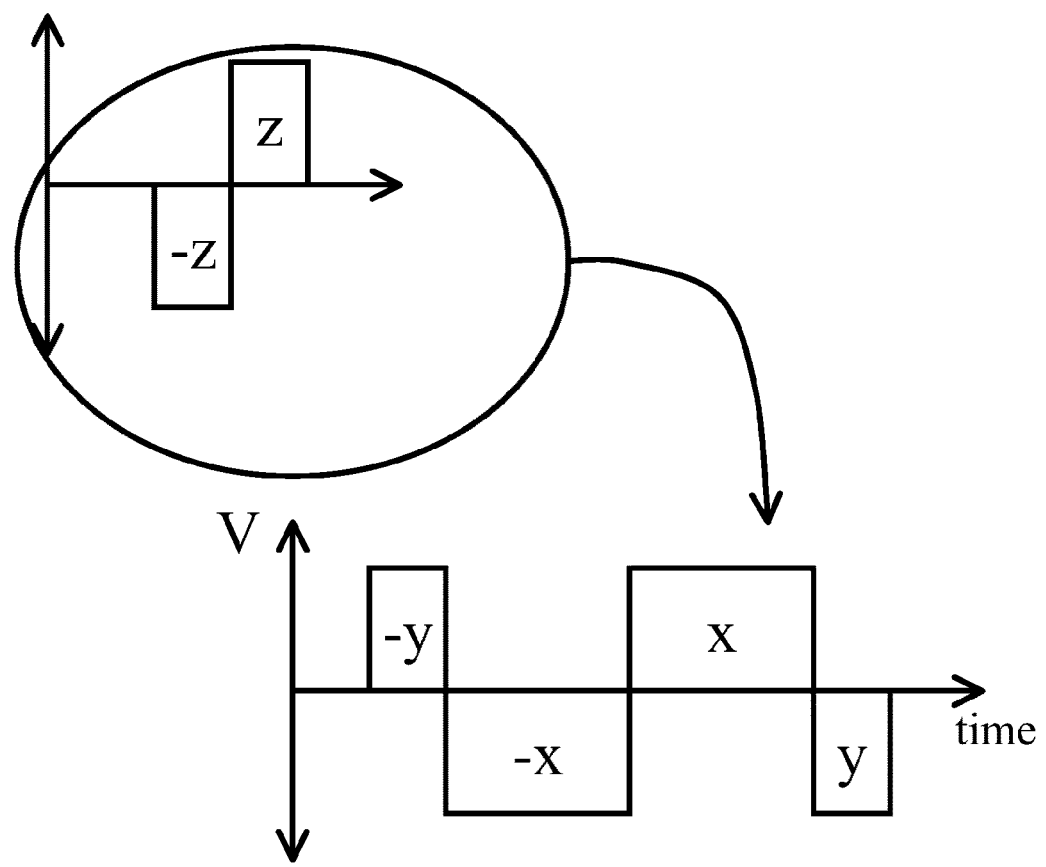
FIG. 39 illustrates schematically how the waveform shown in FIG. 38 may be further modified to include a third pair of drive pulses.
Figure 40:
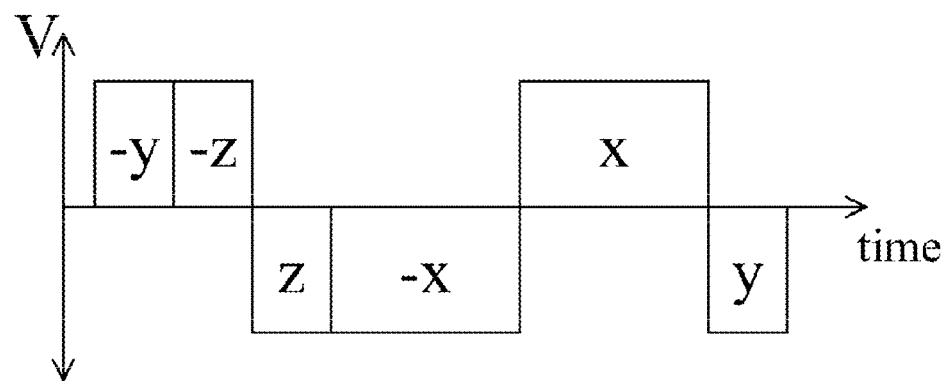
FIG. 40 illustrates one waveform produced by modifying the waveform of FIG. 38 in the manner illustrated in FIG. 39.

Type III:

A third type (Type III) of DC balanced transition introduces yet another DC-balanced pulse pair (denoted "−z", "+z") into the waveform, as shown schematically in FIG. 39. A preferred example of such a Type III waveform is shown in FIG. 40; this type of waveform is useful for fine tuning of the final optical state, for the following reasons. Consider the situation without the +z and −z pulses (i.e. the Type II waveform discussed above). The x pulse element is used for fine tuning, and the final optical state can be decreased by increasing x and increased by decreasing x. However, it is undesirable to decrease x beyond a certain point because then the electro-optic medium is not brought sufficiently close to an optical rail, as required for stability of the waveform. To avoid this problem, instead of decreasing x, one can (in effect) increase the −x pulse without changing the x pulse by adding the −z,+z pulse pair as shown in FIG. 40, with z having the opposite sign from x. The z pulse augments the −x pulse, while the −z pulse maintains the transition at zero net impulse, i.e., maintains a DC-balanced transition.

The Type I, II and III waveforms discussed above can of course be modified in various ways. Additional pairs of pulses can be added to the waveform to achieve more general structures. The advantage of such additional pairs diminishes with increasing number of pulse elements, but such waveforms are a natural extension of the Type I, II and III waveforms. Also, as already discussed, one or more time delays can be inserted in various places in any of the waveforms, in the same manner as illustrated in FIGS. 34 and 35. As mentioned earlier, time delays in pulses affect the final optical state achieved, and are thus useful for fine tuning. Also, the placement of time delays can change the visual appearance of transitions by changing the position of transition elements relative to other elements in the same transition as well as relative to transition elements of other transitions. Time delays can also be used to align certain waveform transition elements, and this may be advantageous for some display modules with certain controller capabilities. Also, in recognition of the fact that small changes in the ordering of the applied pulses may substantially change the optical state following the pulses, the output signal may also be formed by transposing all or part of one of the above-described pulse sequences, or by repeated transpositions of all or part of one of the above described sequences, or by the insertion of one or more 0 V periods at any location within one of the above-described sequences. In addition, these transposition and insertion operators can be combined in any order (e.g., insert 0 V section, then transpose, then insert 0 V section). It is important to note that all such pulse sequences formed by these transformations retain the essential character of having zero net impulse.

Finally, DC balanced transitions can be combined with DC imbalanced transitions to form a complete drive scheme. For example, the −x/)IP/x waveform described above and illustrated in FIG. 12, while satisfactory for transitions between differing optical states, is less satisfactory for zero transitions in which the initial and final optical states are the same. For these zero transitions there is used, in this example, a Type II waveform such as the ones shown in FIGS. 37 and 38. This complete waveform is shown symbolically in Table 11, from which it will be seen that the −x/ΔIP/x waveform is used for non-zero transitions and the Type II waveform for zero transitions.

TABLE 11

| | | final gray level | | | |
|---|---|---|---|---|---|
| | | 1 | 2 | 3 | 4 |
| initial gray level | 1 | Type II | −x/ΔIP/x | −x/ΔIP/x | −x/ΔIP/x |
| | 2 | −x/ΔIP/x | Type II | −x/ΔIP/x | −x/ΔIP/x |
| | 3 | −x/ΔIP/x | −x/ΔIP/x | Type II | −x/ΔIP/x |
| | 4 | −x/ΔIP/x | −x/ΔIP/x | −x/ΔIP/x | Type II |

The use of DC balanced transitions is not of course confined to transition matrices of this type, in which DC balanced transitions are confined to the "leading diagonal" transitions, in which the initial and final gray levels are the same; to produce the maximum improvement in control of gray levels, it is generally desirable to maximize the number of transitions which are DC balanced. However, depending upon the specific electro-optic medium being used, it may be difficult to DC balance transitions involving transitions to or from extreme gray levels, for example to or from black and white, gray levels 1 and 4 respectively. Furthermore, in choosing which transitions are to be DC balanced, it is important not to imbalance the overall transition matrix, i.e., to produce a transition matrix in which a closed loop beginning and ending at the same gray level is DC imbalanced. For example, a rule that transitions involving only a change of 0 or 1 unit in gray level are DC balanced but other transitions are DC imbalanced is not desirable, since this would imbalance the entire transition matrix, as shown by the following example; a pixel undergoing the sequence of gray levels 2-4-3-2 would experience transitions 2-4 (DC imbalanced), 4-3 (balanced) and 3-2 (balanced), so that the entire loop would be imbalanced. A practical compromise between these two conflicting desires may be to use DC balanced transitions in cases where only mid gray levels (levels 2 and 3) are involved and DC imbalanced transitions where the transition begins or ends at an extreme gray level (level 1 or 4). Obviously, the mid gray levels chosen for such a rule may vary with the specific electro-optic medium and controller used; for example, in three-bit (8 gray level) display it might be possible to use DC balanced transitions in all transitions beginning or ending at gray levels 2-7 (or perhaps 3-6) and DC imbalanced transitions in all transitions beginning or ending at gray levels 1 and 8 (or 1, 2, 7 and 8).

From the foregoing, it will be seen that the use of DC balanced transitions allows fine tuning of waveforms to achieve desired gray levels with high precision, and provides a means by which a waveform transition can have zero net voltage, using source drivers that do not permit fine tuning of the voltage, especially source drivers with only two or three voltage levels. It is believed that DC balanced waveform transitions offer better performance than DC imbalanced waveforms. This invention applies to displays in general, and especially, although not exclusively, to active-matrix display modules with source drivers that offer only two or three voltages. This invention also applies to active-matrix display modules with source drivers that offer more voltage levels.

The use of DC balanced transitions can provide certain additional advantages. As noted above, in some driving methods of the invention, the transition matrix is a function of variables other than prior optical state, for example the length of time since the last update, or the temperature of the display medium. It is quite difficult to maintain DC balance in these cases with non-balanced transitions. For example, consider a display that repeatedly transitions from white to black at 25° C. and then from black to white at 0° C. The slower response at low temperature will typically dictate using a longer pulse length. As a result, the display will experience a net DC imbalance towards white. On the other hand, if all transitions are internally balanced, then different transition matrices can be freely mixed without introducing DC imbalance.

Part C: Defined Region Method

The objectionable effects of reset steps, as described above, may be further reduced by using local rather than global updating, i.e., by rewriting only those portions of the display which change between successive images, the portions to be rewritten being chosen on either a "local area" or a pixel-by-pixel basis. For example, it is not uncommon to find a series of images in which relatively small objects move across a larger static background, as for example in diagrams illustrating parts in mechanical devices or diagrams used in accident reconstruction. To use local updating, the display controller needs to compare the final image with the initial image and determine which area(s) differ between the two images and thus need to be rewritten. The controller may identify one or more local areas, typically rectangular areas having axes aligned with the pixel grid, which contain pixels which need to be updated, or may simply identify individual pixels which need to be updated. Any of the drive schemes already described may then be applied to update only the local areas or individual pixels thus identified as needing rewriting. Such a local updating scheme can substantially reduce the energy consumption of a display.

Use of a "defined region" updating method of this type permits updating of a bistable electro-optic display using different updating methods in different regions of the display.

Electro-optic displays are known in which the entire display can be driven in a one-bit or in a grayscale mode. When the display is in one-bit mode, updates are effected using a one-bit general image flow (GIF) waveform, whereas when the display is in grayscale mode, updates are effected using a multi-prepulse slide show waveform, or some other slow waveform, even if, in a specific area of the display, only one-bit information is being updated.

Such an electro-optic display may be modified to carry out a defined region updating method by defining two additional commands in the controller, namely a "DEFINE REGION" command and a "CLEAR ALL REGIONS" command. The DEFINE REGION command typically takes as arguments locations sufficient to define completely a rectangular area of the display, for example the locations of the upper right and lower left corners of the defined region; this command may also have an additional argument specifying the bit depth to which the defined region is set, although this last argument is not necessary in simple forms of the defined region method in which the defined region is always monochrome. The bit depth set by the last argument of course overrides any bit depth previously set for the defined region. Alternatively, the DEFINE REGION command could specify a series of points defining the vertices of a polygon. The CLEAR ALL REGIONS command may take no arguments and simply reset the entire display to a single predefined bit depth, or might take a single argument specifying which of various possible bit depths is to be adopted by the entire display after the clearing operation.

It will be appreciated that a defined region method is not restricted to the use of only two regions and more regions could be provided if desired. For example, in an image editing program it might be helpful to have a main region showing the image being edited at full bit depth, and both an information display region (for example, a box showing present cursor position) and a dialog box region (providing a dialog box for entry of text by the user) running in one-bit mode. The defined region method will primarily be described below in a two-region version, since the necessary modifications to enable use of more than two regions will readily be apparent to those skilled in the construction of display controllers.

In order to keep track of the depths of the different regions, the controller may keep an array of storage elements, one element being associated with each pixel in the display, and each element storing a value representing the current bit depth for the associated pixel. For example, an SVGA (800×600) display capable of operating in either 1-bit or 2-bit mode could use an 800×600 array of 1-bit elements (each containing 0 for 1-bit mode, 1 for 2-bit mode). In such a controller, the DEFINE REGION command would set the elements within the defined region of the display to the requested bit depth, while the CLEAR ALL REGIONS command would reset all elements of the array to the same value (either a predetermined value or one defined by the argument of the command).

Optionally, when a region is defined or cleared, the controller could execute an update sequence on the pixels within that region to transfer the display from one mode to the other, in order to ensure DC balancing or to adjust the optical states of the relevant pixels, for example by using an FT sequence as described above.

When a display is operating in defined region mode, a new image is sent to the controller, and the display must be redrawn, there are three possible cases:
 1. Only pixels within the defined (say) one-bit region have changed. In this case, a one-bit (fast) waveform can be used to update the display;
 2. Only pixels within the non-defined (grayscale) regions have changed. In this case, a grayscale (slow) waveform must be used to update the display (note that since by definition not pixels are changed within the defined region, the legibility of the defined region, for example a dialog box, during the redrawing is not a problem); and
 3. Pixels in both the defined and non-defined regions have changed. In this case, the grayscale pixels are updated using the grayscale waveform, and the one-bit pixels are updated using the one-bit waveform (the shorter one-bit waveforms must be zero-padded appropriately to match the length of the grayscale update).

The controller may determine, before scanning the display, which of these cases exists by performing the following logical tests (assuming a one-bit value associated with each pixel and storing the pixel mode, as defined above):

(Old_image XOR new_image)>0: pixels are changed in the display (Old_image XOR new_image) AND mode_array>0: grayscale pixels are changed (Old_image XOR new_image) AND (NOT mode_array)>0: monochrome pixels are changed As the controller scans the display, for case 1 or case 2 it can use one waveform look-up table for all pixels, since the unchanged pixels will receive 0 V, assuming that a null transition in one-bit mode is the same as in grayscale mode (in other words, that both waveforms are local-update). If instead the grayscale waveform is global-update (all pixels are updated whenever the display is updated), then the controller will need to test to see if a pixel is within the appropriate region to determine whether to apply the global-update waveform or not. For Case 3, the controller must check the value of the mode bit array for each pixel as it scans to determine which waveform to use.

Optionally, if the lightness values of the black and white states achieved in one-bit mode are identical to those achieved in grayscale mode, in Case 3 above the grayscale waveform can be used for all pixels in the display, thus eliminating the need for transfer functions between the one-bit and grayscale waveforms.

The defined region method may make use of any of the optional features of the basic look-up table method, as described above.

The primary advantage of the defined region method is that it enables the use of a fast one-bit waveform on a display that is displaying a previously written grayscale image. Prior art display controllers typically only allow the display to be in either grayscale or one-bit mode at any one time. While it is possible to write one-bit images in grayscale mode, the relevant waveforms are quite slow. In addition, the defined region method is essentially transparent to the host system (the system, typically a computer) which supplies images to the controller, since the host system does not have to advise the controller which waveform to use. Finally, the defined region method allows both one-bit and grayscale waveforms to be used on the display at the same time, whereas other solutions require two separate update events if both kinds of waveforms are being used.

The aforementioned drive schemes may be varied in numerous ways depending upon the characteristics of the specific electro-optic display used. For example, in some cases it may be possible to eliminate many of the reset steps in the drives schemes described above. For example, if the electro-optic medium used is bistable for long periods (i.e., the gray levels of written pixels change only very slowly with time) and the impulse needed for a specific transition does not vary greatly with the period for which the pixel has been in its initial gray state, a look-up table may be arranged to effect gray state to gray state transitions directly without any intervening return to a black or white state, resetting of the display being effected only when, after a substantial period has elapsed, the gradual "drift" of pixels from their nominal gray levels has caused noticeable errors in the image presented. Thus, for example, if a user was using a display of the present invention as an electronic book reader, it might be possible to display numerous screens of information before resetting of the display were necessary; empirically, it has been found that with appropriate waveforms and drivers, as many as 1000 screens of information can be displayed before resetting is necessary, so that in practice resetting would not be necessary during a typical reading session of an electronic book reader.

It will readily be apparent to those skilled in display technology that a single apparatus of the present invention could usefully be provided with a plurality of different drive schemes for use under differing conditions. For example, since in the drive schemes shown in FIGS. 9 and 10, the reset pulses consume a substantial fraction of the total energy consumption of the display, a controller might be provided with a first drive scheme which resets the display at frequent intervals, thus minimizing gray scale errors, and a second scheme which resets the display only at longer intervals, thus tolerating greater gray scale errors but reduce energy consumption. Switching between the two schemes can be effected either manually or dependent upon external parameters; for example, if the display were being used in a laptop computer, the first drive scheme could be used when the computer is running on mains electricity, while the second could be used while the computer was running on internal battery power.

Part D: Compensation Voltage Method

The methods of the present invention can be used in combination with a "compensation voltage" method and apparatus, which will now be described in detail.

The compensation voltage method and apparatus seek to achieve results similar to the basic look-up table methods described above without the need to store very large look-up tables. The size of a look-up table grows rapidly with the number of prior states with regard to which the look-up table is indexed. For this reason, as already discussed, there is a practical limitation and cost consideration to increasing the number of prior states used in choosing an impulse for achieving a desired transition in a bistable electro-optic display.

In the compensation voltage method and apparatus, the size of the look-up table needed is reduced, and compensation voltage data is stored for each pixel of the display, this compensation voltage data being calculated dependent upon at least one impulse previously applied to the relevant pixel. The voltage finally applied to the pixel is the sum of a drive voltage, chosen in the usual way from the look-up table, and a compensation voltage determined from the compensation voltage data for the relevant pixel. In effect, the compensation voltage data applies to the pixel a "correction" such as would otherwise be applied by indexing the look-up table for one or more additional prior states.

The look-up table used in the compensation voltage method may be of any of the types described above. Thus, the look-up table may be a simple two-dimensional table which allows only for the initial and final states of the pixel during the relevant transition. Alternatively, the look-up table may take account of one or more temporal and/or gray level prior states. The compensation voltage may also take into account only the compensation voltage data stored for the relevant pixel but may optionally also take into account of one or more temporal and/or gray level prior states. The compensation voltage may be applied to the relevant pixel not only during the period for which the drive voltage is applied to the pixel but also during so-called "hold" states when no drive voltage is being applied to the pixel.

The exact manner in which the compensation voltage data is determined may vary widely with the characteristics of the bistable electro-optic medium used. Typically, the compensation voltage data will periodically be modified in a manner which is determined by the drive voltage applied to the pixel during the present and/or one or more scan frames. In preferred forms of the invention, the compensation voltage data consists of a single numerical (register) value associated with each pixel of the display.

In a preferred embodiment, scan frames are grouped into superframes in the manner already described so that a display update can be initiated only at the beginning of a superframe. A superframe may, for example, consist of ten display scan frames, so that for a display with a 50 Hz scan rate, a display scan is 20 ms long and a superframe 200 ms long. During each superframe while the display is being rewritten, the compensation voltage data associated with each pixel is updated. The updating consists of two parts in the following order:

(1) Modifying the previous value using a fixed algorithm independent of the pulse applied during the relevant superframe; and
(2) Increasing the value from step (1) by an amount determined by the impulse applied during the relevant superframe.

In a particularly preferred embodiment, steps (1) and (2) are carried out as follows:

(1) Dividing the previous value by a fixed constant, which is conveniently two; and
(2) Increasing the value from step (1) by an amount proportional to the total area under the voltage/time curve applied to the electro-optic medium during the relevant superframe.

In step (2), the increase may be exactly or only approximately proportional to the area under the voltage/time curve during the relevant superframe. For example, as described in detail below with reference to FIG. 41, the increase may be "quantized" to a finite set of classes for all possible applied waveforms, each class including all waveforms with a total area between two bounds, and the increase in step (2) determined by the class to which the applied waveform belongs.

The following example is now given. The display used was a two-bit gray scale encapsulated electrophoretic display, and the drive method employed used a two-dimensional look-up table as shown in Table 12 below, which takes account only of the initial and final states of the desired transition; in this Table, the column headings represent the desired final state of the display and the row headings represent the initial state, while the numbers in individual cells represent the voltage in volts to be applied to the pixel for a predetermined period.

TABLE 12

|        |   | to: 0 | to: 1 | to: 2 | to: 3 |
|--------|---|-------|-------|-------|-------|
| from:  | 0 | 0     | +6    | +9    | +15   |
| from:  | 1 | −6    | 0     | +6    | +9    |
| from:  | 2 | −9    | −6    | 0     | +6    |
| from:  | 3 | −15   | −9    | −6    | 0     |

To allow for practice of the compensation voltage method, a single numerical register was associated with each pixel of the display. The various impulses shown in Table 12 were classified and a pulse class was associated with each impulse, as shown in Table 13 below.

TABLE 13

| | pulse voltage (V) | | | | | | |
|---|---|---|---|---|---|---|---|
| | −15 | −9 | −6 | 0 | +6 | +9 | +15 |
| pulse class | −30 | −18 | −12 | 0 | 12 | 18 | 30 |

During each superframe, the numerical register associated with each pixel was divided by 2, and then increased by the numerical value shown in Table 13 for the pulse being applied to the relevant pixel during the same superframe. The voltage applied to each pixel during the superframe was the sum of the drive voltage, as shown in Table 12 and a compensation voltage, $V_{comp}$, given by the formula:

$$V_{comp} = A*(\text{pixel register})$$

where the pixel register value is read from the register associated with the relevant pixel and "A" is a pre-defined constant.

Figure 41:
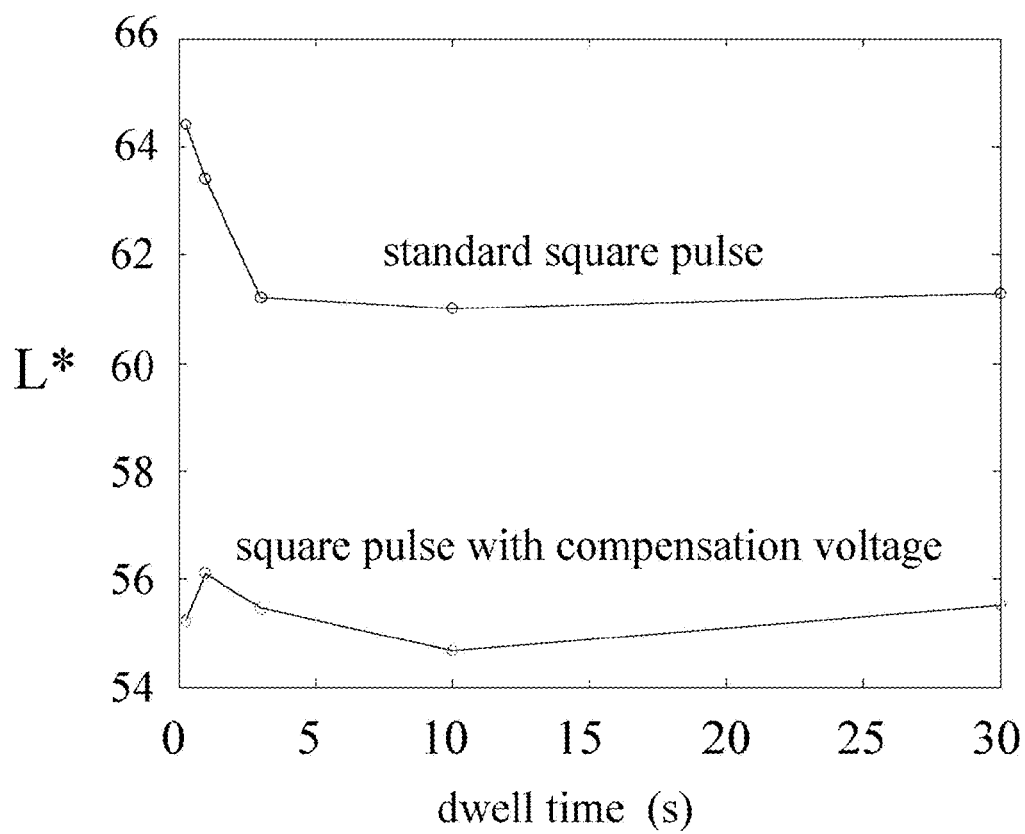
FIG. 41 is a graph illustrating the reduced dwell time dependency which can be achieved by a compensation voltage method.

In a laboratory demonstration of this preferred compensation voltage method, single pixel displays using an encapsulated electrophoretic medium sandwiched between parallel electrodes, the front one of which was formed of ITO and light-transmissive, were driven by 300 millisecond±15V square wave pulses between their black and white states. The display started in its white state, was driven black, then back to white after a dwell time. It was found that the lightness of the final white state was a function of dwell time, as shown in FIG. 41 of the accompanying drawings. Thus, this encapsulated electrophoretic medium was sensitive to dwell time, with the L* of the white state varying by about 3 units depending upon dwell time.

To show the effect of the compensation voltage method, the experiment was repeated, except that a compensation voltage, consisting of an exponentially decaying voltage starting at the end of each drive pulse, was appended to each pulse. The applied voltage was the sum of the drive voltage and the compensation voltage. As shown in FIG. 41, the white state for various dwell times in the case with the compensation voltage was much more uniform than for the uncompensated pulses. Thus, this experiment demonstrated that use of such compensation pulses in accordance with the present invention can greatly reduce the dwell time sensitivity of an encapsulated electrophoretic medium.

The compensation voltage method of the present invention may make use of any of the optional features of the basic look-up table method described above.

From the foregoing description, it will be seen that the present invention provides methods for controlling the operation of electro-optic displays which allow accurate control of gray scale without requiring inconvenient flashing of the whole display to one of its extreme states at frequent intervals. The present invention also allows for accurate control of the display despite changes in the temperature and operating time thereof, while lowering the power consumption of the display. These advantages can be achieved inexpensively, since the necessary controllers can be constructed from commercially available components.

Part E: DTD Integral Reduction Method

As mentioned above, it has been found that, at least in some cases, the impulse necessary for a given transition in a bistable electro-optic display varies with the residence time of a pixel in its optical state, this phenomenon, which does not appear to have previously been discussed in the literature, hereinafter being referred to as "dwell time dependence" or "DTD". Thus, it may be desirable or even in some cases in practice necessary to vary the impulse applied for a given transition as a function of the residence time of the pixel in its initial optical state.

Figure 42:
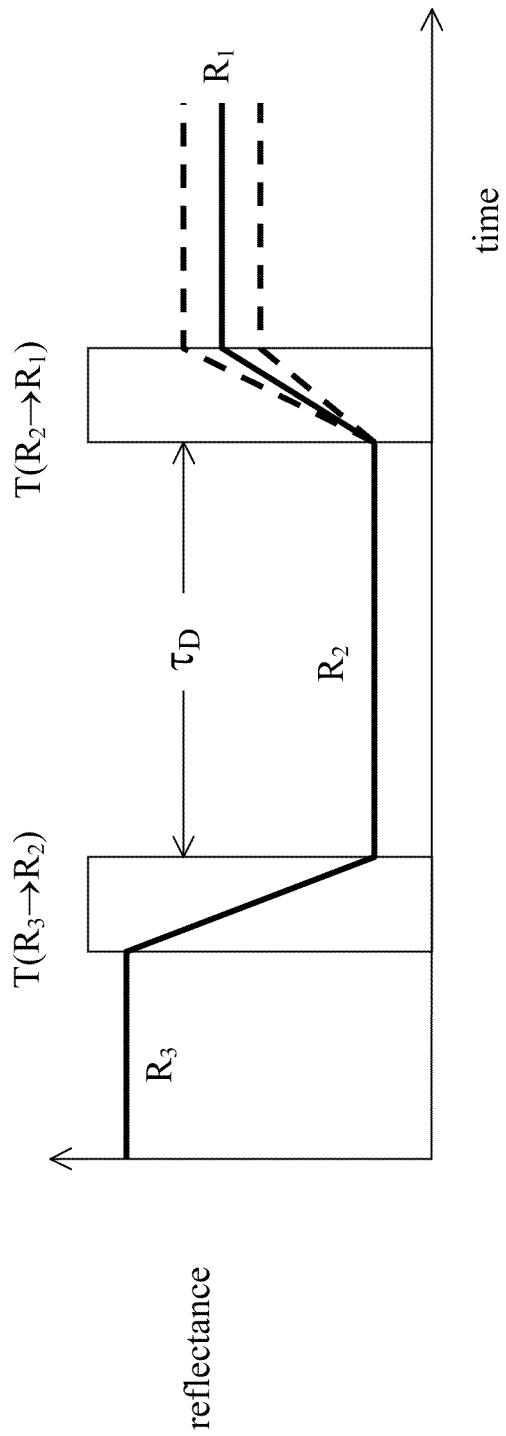
FIG. 42 is a graph illustrating the effect of dwell time dependence in an electro-optic display.

The phenomenon of dwell time dependence will now be explained in more detail with reference to FIG. 42 of the accompanying drawings, which shows the reflectance of a pixel a function of time for a sequence of transitions denoted R3→R2→R1, where each of the Rk terms indicates a gray level in a sequence of gray levels, with R's with larger indices occurring before R's with smaller indices. The transitions between R3 and R2 and between R2 and R1 are also indicated. DTD is the variation of the final optical state R1 caused by variation in the time spent in the optical state R2, referred to as the dwell time. The DTD integral reduction method provides a method for reducing dwell time dependence when driving bistable electro-optic displays.

Although the invention is in no way limited by any theory as to its origin, DTD appears to be, in large part, caused by remnant electric fields experienced by the electro-optic medium. These remnant electric fields are residues of drive pulses applied to the medium. It is common practice to speak of remnant voltages resulting from applied pulses, and the remnant voltage is simply the scalar potential corresponding to remnant electric fields in the usual manner appropriate to electrostatic theory. These remnant voltages can cause the optical state of a display film to drift with time. They also can change the efficacy of a subsequent drive voltage, thus changing the final optical state achieved after that subsequent pulse. In this manner, the remnant voltage from one transition waveform can cause the final state after a subsequent waveform to be different from what it would be if the two transitions were very separate from each other. By "very separate" is meant sufficiently separated in time so that the remnant voltage from the first transition waveform has substantially decayed before the second transition waveform is applied.

Measurements of remnant voltages resulting from transition waveforms and other simple pulses applied to an electro-optic medium indicate that the remnant voltage decays with time. The decay appears monotonic, but not simply exponential. However, as a first approximation, the decay can be approximated as exponential, with a decay time constant, in the case of most encapsulated electrophoretic media tested, of the order of one second, and other bistable electro-optic media are expected to display similar decay times.

Accordingly, the DTD integral reduction method provides a method of driving a bistable electro-optic display having at least one pixel which comprises applying to the pixel a waveform V(t) such that:

$$J = \int_0^T V(t) M(T-t) dt \quad (1)$$

(where T is the length of the waveform, the integral is over the duration of the waveform, V(t) is the waveform voltage as a function of time t, and M(t) is a memory function that characterizes the reduction in efficacy of the remnant voltage to induce dwell-time-dependence arising from a short pulse at time zero) is less than about 1 volt sec. Desirably J is less than about 0.5 volt sec., and most desirably less than about 0.1 volt sec. In fact J should be arranged to be as small as possible, ideally zero.

Waveforms can be designed that give very low values of J and hence very small DTD, by generating compound pulses. For example, a long negative voltage pulse preceding a shorter positive voltage pulse (with a voltage amplitude of the same magnitude but of opposite sign) can result in a much-reduced DTD. It is believed that the two pulses provide remnant voltages with opposite signs. When the ratio of the lengths of the two pulses are correctly set, the remnant voltages from the two pulses can be caused to largely cancel each other. The proper ratio of the length of the two pulses can be determined by the memory function for the remnant voltage.

In a presently preferred embodiment, J is calculated by:

$$J = \int_0^T V(t) \exp\left(-\frac{T-t}{\tau}\right) dt \quad (2)$$

where $\tau$ is a decay (relaxation) time best determined empirically.

For some encapsulated electrophoretic media, it has been found experimentally that waveforms that give rise to small J values also give rise to particularly low DTD, while waveforms with particularly large J values give rise to large DTD. In fact, good correlation has been found between J values calculated by Equation (2) above with $\tau$ set to one second, roughly equal to the measured decay time of the remnant voltage after an applied voltage pulse.

Thus, it is advantageous to use waveforms where each transition (or at least most of the transitions in the look-up table) from one gray level to another is achieved with a waveform that gives a small value of J. This J value is preferably zero, but empirically it has been found that, at least for the encapsulated electrophoretic media described in the aforementioned patents and application, as long as J had a magnitude less than about 1 volt sec. at ambient temperature, the resulting dwell time dependence is quite small.

Thus, one can provide a waveform for achieving transitions between a set of optical states, where, for every transition, a calculated value for J has a small magnitude. The J is calculated by a memory function that is presumably monotonically decreasing. This memory function is not arbitrary but can be estimated by observing the dwell time dependence of the display film to simple voltage pulse or compound voltage pulses. As an example, one can apply a voltage pulse to the display film to achieve a transition from a first to a second optical state, wait a dwell time, then apply a second voltage pulse to achieve a transition from the second to a third voltage pulse. By monitoring the shift in the third optical state as a function of the dwell time, one can determine an approximate shape of the memory function. The memory function has a shape approximately similar to the difference in the third optical state from its value for long dwell times, as a function of the dwell time. The memory function would then be given this shape, and would have amplitude of unity when its argument is zero. This method yields only an approximation of the memory function, and for various final optical states, the measured shape of the memory function is expected to change somewhat. However, the gross features, such as the characteristic time of decay of the memory function, should be similar for various optical states. However, if there are significant differences in shape with final optical state, then the best memory function shape to adopt is one gained when the third optical state is in the middle third of the optical range of the display medium. The gross features of the memory function should also be estimable by measuring the decay of the remnant voltage after an applied voltage pulse.

Although, the methods discussed here for estimating the memory function are not exact, it has been found that J values calculated from even an approximate memory are a good guide to waveforms having low DTD. A useful memory function expresses the gross features of the time dependence of the DTD as described above. For example, a memory function that is exponential with a decay time of one second has been found to work well in predicting waveforms that gave low DTD. Changing the decay time to 0.7 or 1.3 second does not destroy the effectiveness of the resulting J values as predictors of low DTD waveforms. However, a memory function that does not decay, but remains at unity indefinitely, is noticeably less useful as a predictor, and a memory function with a very short decay time, such as 0.05 second, was not a good predictor of low DTD waveforms.

An example of a waveform that gives a small J value is the waveform shown in FIGS. 39 and 40 described above, where the x, y, and z pulses are all of durations much smaller than the characteristic decay time of the memory function. This waveform functions well when this condition is met because this waveform is composed of sequential opposing pulse elements whose remnant voltages tend to approximately cancel. For x and y values that are not much smaller than the characteristic decay time of the memory function but not larger than this decay time, it is found that that waveforms where x and y are of opposite sign tend to give lower J values, and x and y pulse durations can be found that actually permit very small J values because the various pulse elements give remnant voltages that cancel each other out after the waveform is applied, or at least largely cancel each other out.

It will be appreciated that the J value of a given waveform can be manipulated by inserting periods of zero voltage into the waveform, or adjusting the lengths of any periods of zero voltage already present in the waveform. Thus a wide variety of waveforms can be used while still maintaining a J value close to zero.

The DTD integral reduction method has general applicability. A waveform structure can be devised described by parameters, its J values calculated for various values of these parameters, and appropriate parameter values chosen to minimize the J value, thus reducing the DTD of the waveform.

Part F: Remnant Voltage Method

It has been found that the extent of DC imbalance in an electrophoretic medium used in a display can be ascertained by measuring the open-circuit electrochemical potential (hereinafter for convenience called the "remnant voltage" of the medium. When the remnant voltage of a pixel is zero, it has been perfectly DC balanced. If its remnant voltage is positive, it has been DC unbalanced in the positive direction. If its remnant voltage is negative, it has been DC unbalanced in the negative direction. Remnant voltage data may be used to maintain long-term DC balancing of the display.

In such a remnant voltage method, measurement of a remnant voltage is desirably effected by a high impedance voltage measurement device, for example a metal oxide semiconductor (MOS) comparator. When the display is one having small pixels, for example a 100 dots per inch (DPI) matrix display, in which each pixel has an area of $10^{-4}$ square inch or about $6 \times 10^{-2}$ mm$^2$, the comparator needs to have an ultra-low input current, as the resistance of such a single pixel is of the order of $10^{12}$ ohm. However, suitable comparators are readily available commercially; for example, the Texas Instruments INA111 chip is suitable, as it has an input current on only about 20 pA. (Technically, this integrated circuit is an instrumentation amplifier, but if its output is routed into a Schmitt trigger, it acts as a comparator.) For displays having large single pixels, such as large direct-drive displays (defined below) used in signage, where the individual pixels may have areas of several square centimeters, the requirements for the comparator are much less stringent, and almost any commercial FET input comparator may be used, for example the LF311 comparator from National Semiconductor Corporation.

It will readily be apparent to those skilled in the art of electronic displays that, for cost and other reasons, mass-produced electronic displays will normally have drivers in the form of application specific integrated circuits (ASIC's), and in this type of display the comparator would typically be provided as part of the ASIC. Although this approach would require provision of feedback circuitry within the ASIC, it would have the advantage of making the power supply and oscillator sections of the ASIC simpler and smaller in area. If tri-level general image flow drive is required, this approach would also make the driver section of the ASIC simpler and smaller in area. Thus, this approach would typically reduce the cost of the ASIC.

Conveniently, a driver which can apply a driving voltage, electronically short or float the pixel, is used to apply the driving pulses. When using such a driver, on each addressing cycle where DC balance correction is to be effected, the pixel is addressed, electronically shorted, then floated. (The term "addressing cycle" is used herein in its conventional meaning in the art of electro-optic displays to refer to the total cycle needed to change from a first to a second image on the display. As noted above, because of the relatively low switching speeds of electrophoretic displays, which are typically of the order of tens to hundreds of milliseconds, a single addressing cycle may comprise a plurality of scans of the entire display.) After a short delay time, the comparator is used to measure the remnant voltage across the pixel, and to determine whether it is positive or negative in sign. If the remnant voltage is positive, the controller may slightly extend the duration of (or slightly increase the voltage of) negative-going addressing pulses on the next addressing cycle. If, however, the remnant voltage is negative, the controller may slightly extend the duration of (or slightly increase the voltage of) positive-going voltage pulses on the next addressing cycle.

Thus, the remnant voltage method places the electro-optic medium into a bang-bang feedback loop, adjusting the length of the addressing pulses to drive the remnant voltage toward zero. When the remnant voltage is near zero, the medium exhibits ideal performance and improved lifetime. In particular, use of the present invention may allow improved control of gray scale. As noted earlier, it has been observed that the gray scale level obtained in electro-optic displays is a function not only of the starting gray scale level and the impulse applied, but also of the previous states of the display. It is believed that one of the reasons for this "history" effect on gray scale level is that the remnant voltage affects the electric field experienced by the electro-optic medium; the actual electric field influencing the behavior of the medium is the sum of the voltage actually applied via the electrodes and the remnant voltage. Thus, controlling the remnant voltage ensures that the electric field experienced by the electro-optic medium accurately corresponds to that applied via the electrodes, thus permitting improved control of gray scale.

The remnant voltage method is especially useful in displays of the so-called "direct drive" type, which are divided into a series of pixels each of which is provided with a separate electrode, the display further comprising switching means arranged to control independently the voltage applied to each separate electrode. Such direct drive displays are useful for the display of text or other limited character sets, for example numerical digits, and are described in, inter alia, the aforementioned International Application Publication No. 00/05704. However, the remnant voltage method can also be used with other types of displays, for example active matrix displays which use an array of transistors, at least one of which is associated with each pixel of the display. Activating the gate line of a thin film transistor (TFT) used in such an active matrix display connects the pixel electrode to the source electrode. The remnant voltage is small compared to the gate voltage (the absolute value of the remnant voltage typically does not exceed about 0.5 V), so the gate drive voltage will still turn the TFT on. The source line can then be electronically floated and connected to a MOS comparator, thus allowing reading the remnant voltage of each individual pixel of the active matrix display.

It should be noted that, although the remnant voltage on a pixel of an electrophoretic display does closely correlate with the extent to which the current flow through that pixel has been DC balanced, zero remnant voltage does not necessarily imply perfect DC balance. However, from the practical point of view, this makes little difference, since it appears to be the remnant voltage itself rather than the DC balance history which is responsible for the adverse effects noted herein.

It will readily be apparent to those skilled in the display art that, since the purpose of the remnant voltage method is to reduce remnant voltage and DC imbalance, this method need not be applied on every addressing cycle of a display, provided it is applied with sufficient frequency to prevent a long-term build-up of DC imbalance at a particular pixel. For example, if the display is one which requires use of a "refresh" or "blanking" pulse at intervals, such that during the refresh or blanking pulse all of the pixels are driven to the same display state, normally one of the extreme display states (or, more commonly, all of the pixels are first driven to one extreme display state, and then to the other extreme display state), the remnant voltage method might be practiced only during the refresh or blanking pulses.

Although the remnant voltage method has primarily been described in its application to encapsulated electrophoretic displays, this method may be also be used with unencapsulated electrophoretic displays, and with other types of display, for example electrochromic displays, which display a remnant voltage.

From the foregoing description, it will be seen that the remnant voltage method provides a method for driving electrophoretic and other electro-optic displays which reduces the cost of the equipment needed to ensure DC balancing of the pixels of the display, while providing increasing display lifetime, operating window and long-term display optical performance.

As already indicated, a preferred type of electro-optic medium for use in present invention is an encapsulated particle-based electrophoretic medium. Such electrophoretic media used in the methods of the present invention may employ the same components and manufacturing techniques as in the aforementioned E Ink and MIT patents and applications, to which the reader is referred for further information.

Numerous changes and modifications can be made in the preferred embodiments of the present invention already described without departing from the spirit and skill of the invention. Accordingly, the foregoing description is to be construed in an illustrative and not in a limitative sense.

The invention claimed is:

1. A method for driving an electro-optic display having at least one pixel capable of achieving any one of at least four different gray levels including two extreme optical states, the method comprising:
    displaying a first image on the display; and
    rewriting the display to display a second image thereon,
    the method permitting any pixel to undergo at least two transitions without touching an extreme optical state, but being such that during the rewriting of the display any pixel which has undergone a number of transitions exceeding a predetermined value, the predetermined value being at least two, without touching an extreme optical state, is driven to at least one extreme optical state before driving that pixel to its final optical state in the second image, wherein the rewriting of the display is effected such that, once a pixel has been driven from one extreme optical state to a gray level, which is not one of the two extreme optical states, in the direction of the other extreme optical state by a pulse of one polarity, the pixel does not receive a pulse of the opposed polarity until it has reached the opposed extreme optical state.

2. A method for driving an electro-optic display having at least one pixel capable of achieving any one of at least four different gray levels including two extreme optical states, the method comprising:
    displaying a first image on the display; and
    rewriting the display to display a second image thereon,
    the method permitting any pixel to undergo at least two transitions without touching an extreme optical state, but being such that during the rewriting of the display any pixel which has undergone a number of transitions exceeding a predetermined value, the predetermined value being at least two, without touching an extreme optical state, is driven to at least one extreme optical state before driving that pixel to its final optical state in the second image, wherein said predetermined value is not greater than N/2, where N is the total number of gray levels capable of being displayed by a pixel.

3. A method according to claim 2 wherein the rewriting of the display is effected by applying to the or each pixel any one or more of voltages −V, 0 and +V.

4. A method according to claim 2 wherein the rewriting of the display is effected such that, for any series of transitions undergone by a pixel, the integral of the applied voltage with time is bounded.

5. A method according to claim 2 wherein the rewriting of the display is effected such that the impulse applied to a pixel during a transition depends only upon the initial and final gray levels of that transition.

* * * * *